(12) United States Patent
Furuichi

(10) Patent No.: US 12,167,249 B2
(45) Date of Patent: Dec. 10, 2024

(54) COMMUNICATION CONTROL DEVICE, A COMMUNICATION DEVICE, AND A COMMUNICATION CONTROL METHOD CAPABLE OF REALIZING EFFECTIVE USE OF THE RADIO WAVE RESOURCES

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 284 days.

(21) Appl. No.: 17/620,962

(22) PCT Filed: Jun. 19, 2020

(86) PCT No.: PCT/JP2020/024266
§ 371 (c)(1),
(2) Date: Dec. 20, 2021

(87) PCT Pub. No.: WO2020/262266
PCT Pub. Date: Dec. 30, 2020

(65) Prior Publication Data
US 2022/0360997 A1     Nov. 10, 2022

(30) Foreign Application Priority Data

Jun. 28, 2019 (JP) .................. 2019-122237

(51) Int. Cl.
*H04W 16/14* (2009.01)
*H04W 12/02* (2009.01)
*H04W 28/16* (2009.01)

(52) U.S. Cl.
CPC ........... *H04W 16/14* (2013.01); *H04W 12/02* (2013.01); *H04W 28/16* (2013.01)

(58) Field of Classification Search
CPC . H04W 16/14; H04W 72/0453; H04W 24/08; H04W 72/541; H04W 72/51;
(Continued)

(56) References Cited

U.S. PATENT DOCUMENTS 10,103,756 B1 * 10/2018 Peroulas ............... H04W 24/02
2014/0341150 A1    11/2014 Kimura et al.
(Continued)

FOREIGN PATENT DOCUMENTS

JP    2016508694 A    3/2016
JP    2016-123110 A   7/2016

OTHER PUBLICATIONS

International Search Report and Written Opinion of PCT Application No. PCT/JP2020/024266, issued on Sep. 24, 2020, 08 pages of ISRWO.

(Continued)

*Primary Examiner* — Golam Sorowar
(74) *Attorney, Agent, or Firm* — CHIP LAW GROUP

(57) ABSTRACT

A communication control device includes an acquisition unit that acquires range information about privacy protection of a first radio system, a determination unit that determines a communication parameter of a second radio system that shares and uses the radio wave used by the first radio system based on a method associated with a range identified based on the range information, and a notification unit that notifies the second radio system of the determined communication parameter.

19 Claims, 28 Drawing Sheets

(58) Field of Classification Search
CPC ..... H04W 24/02; H04W 72/56; H04W 28/16; H04W 52/242; H04W 16/20; H04W 76/14; H04W 16/10; H04W 88/06; H04W 72/542; H04W 4/46; H04W 4/021; H04W 4/44; H04W 4/80; H04W 72/23; H04W 8/005; H04B 7/0617; H04B 7/18517; H04B 7/18519; H04B 7/0413; H04B 17/3913; H04B 7/0695; H04B 1/7136; H04B 1/7176; H04B 2001/71362; H04B 2001/7154; H04B 7/0465; H04B 7/088; H04B 7/18513; H04B 17/354; H04B 7/0456; H04B 1/1027; H04B 1/18; H04B 1/3838; H04B 1/3888
See application file for complete search history.

(56) References Cited

U.S. PATENT DOCUMENTS

| | | | | |
|---|---|---|---|---|
| 2017/0318470 | A1* | 11/2017 | Srikanteswara | H04W 52/367 |
| 2018/0192295 | A1* | 7/2018 | Mueck | H04W 16/14 |
| 2019/0215698 | A1* | 7/2019 | Balachandran | H04W 88/12 |
| 2021/0153029 | A1* | 5/2021 | Mueck | H04W 16/14 |

OTHER PUBLICATIONS

"CBRS Certified Professional Installer Accreditation Technical Specification", WINNF-TS-0247, V1.2.0, Wireless Innovation Forum, May 6, 2019, 19 pages.

"Signaling Protocols and Procedures for Citizens Broadband Radio Service (CBRS): Spectrum Access System (SAS)—Citizens Broadband Radio Service Device (CBSD) Interface Technical Specification", WINNF-TS-0016, Version V1.2.3, Wireless Innovation Forum, Oct. 13, 2018, 60 pages.

"Technical and operational requirements for the operation of white space devices under geo-location approach", ECC Report 186, CEPT Electronic Communication Committee, Jan. 2013, 181 pages.

"White Space Database Provider (WSDB) Contract", The office of communications and operator, URL: https://www.pfcom.org.uk/_data/assets/pdf_file/0026/84077/white_space_database_contract_for_operational_use_of_wsds.pdf, 2015, 125 pages.

"Signaling Protocols and Procedures for Citizens Broadband Radio Service (CBRS): Spectrum Access System (SAS)—SAS Interface Technical Specification", Wireless Innovation Forum, WINNF-TS-0096-V1.3.1, Jan. 29, 2019, 44 pages.

"Requirements for Commercial Operation in the U.S. 3550-3700 MHz Citizens Broadband Radio Service Band", Wireless Innovation Forum, WINNF-TS-0112, V1.7.0, May 6, 2019, 81 pages.

"IEEE Standard for Information technology—Telecommunications and information exchange between systems—Local and metropolitan area networks—Specific requirements—Part 19: TV White Space Coexistence Methods—Amendment 1: Coexistence Methods for Geo-location Capable Devices Operating under General Authorization", IEEE 802.19.1a-2017, IEEE, Dec. 11, 2017.

"Part 96 Citizens Broadband Radio Service", Federal Communications Commission, Jun. 23, 2015, pp. 596-613.

"Operations for Citizens Broadband Radio Service (CBRS): Priority Access License (PAL) Database Technical Specification", Wireless Innovation Forum, WINNF-TS-0245, V1.0.0, Jul. 26, 2017, 11 pages.

"Prediction procedure for the evaluation of microwave interference between stations on the surface of the Earth at frequencies above about 0.7 GHz", ITU-R P.452-11, International Telecommunication Union, Oct. 20, 1995, 37 pages.

"Test and Certification for Citizens Broadband Radio Service (CBRS); Conformance and Performance Test Technical Specification; SAS as Unit Under Test (UUT)", WINNF-TS-0061-V1.5.0, Wireless Innovation Forum, Oct. 7, 2019.

"Spectrum Sharing Committee Policy and Procedure Coordinated Periodic Activities Policy", Wireless Innovation Forum, WINNF-SSC-0008-V1.3.0, 2018, 03 pages.

"Operations for Citizens Broadband Radio Service (CBRS); GAA Spectrum Coordination—Approach 2", Wireless Innovation Forum, WINNF-TR-2004-V1.0.0, May 16, 2019, 20 pages.

* cited by examiner

COMMUNICATION CONTROL DEVICE, A COMMUNICATION DEVICE, AND A COMMUNICATION CONTROL METHOD CAPABLE OF REALIZING EFFECTIVE USE OF THE RADIO WAVE RESOURCES

CROSS REFERENCE TO RELATED APPLICATIONS

This application is a U.S. National Phase of International Patent Application No. PCT/JP2020/024266 filed on Jun. 19, 2020, which claims priority benefit of Japanese Patent Application No. JP 2019-122237 filed in the Japan Patent Office on Jun. 28, 2019. Each of the above-referenced applications is hereby incorporated herein by reference in its entirety.

FIELD

The present disclosure relates to a communication control device, a communication device, and a communication control method.

BACKGROUND

A problem of exhaustion of radio wave resources (radio resources) that can be allocated to a radio system (radio device) has emerged. Since all radio bands are already used by existing radio systems (radio devices), it is difficult to newly allocate the radio wave resources to the radio system. Therefore, in recent years, more effective use of the radio wave resources by utilization of a cognitive radio technology has begun to attract attention. In the cognitive radio technology, the radio wave resources are generated by using the temporally and spatially vacant radio wave (white space) of an existing radio system.

CITATION LIST

Non Patent Literature

Non Patent Literature 1: WINNF-TS-0247-V1.2.0 CBRS Certified Professional Installer Accreditation Technical Specification
Non Patent Literature 2: WINNF-TS-0016-V1.2.3 Signaling Protocols and Procedures for Citizens Broadband Radio Service (CBRS): Spectrum Access System (SAS)—Citizens Broadband Radio Service Device (CBSD) Interface Technical Specification
Non Patent Literature 3: ECC Report 186, Technical and operational requirements for the operation of white space devices under geo-location approach, CEPT ECC, 2013 January
Non Patent Literature 4: White Space Database Provider (WSDB) Contract, available at https://www.ofcom.org.uk/_data/assets/pdf_file/0026/84077/white_space_database_contract_for_operational_use_of_wsds.pdf
Non Patent Literature 5: WINNF-TS-0096-V1.3.1 Signaling Protocols and Procedures for Citizens Broadband Radio Service (CBRS): Spectrum Access System (SAS)—SAS Interface Technical Specification
Non Patent Literature 6: WINNF-TS-0112-V1.7.0 Requirements for Commercial Operation in the U.S. 3550-3700 MHz Citizens Broadband Radio Service Band
Non Patent Literature 7: IEEE Std 802.19.1aTM-2017 "Coexistence Methods for Geo-location Capable Devices Operating under General Authorization"
Non Patent Literature 8: 47 C.F.R Part 96 Citizens Broadband Radio Service, https://www.ecfr.gov/cgi-bin/text-idx?node=pt47.5.96 #se47.5.96
Non Patent Literature 9: WINNF-TS-0245-V1.0.0 Operations for Citizens Broadband Radio Service (CBRS): Priority Access License (PAL) Database Technical Specification
Non Patent Literature 10: WINNF-TS-0061-V1.5.0 Test and Certification for Citizens Broadband Radio Service (CBRS); Conformance and Performance Test Technical Specification; SAS as Unit Under Test (UUT)
Non Patent Literature 11: WINNF-SSC-0008 Spectrum Sharing Committee Policy and Procedure Coordinated Periodic Activities Policy
Non Patent Literature 12: ITU-R P.452-11, "Prediction procedure for the evaluation of microwave interference between stations on the surface of the Earth at frequencies above about 0.7 GHz", https://www.itu.int/dms_pubrec/itu-r/rec/p/R-REC-P.452-11-200304-S!!PDF-E.pdf
Non Patent Literature 13: WINNF-TR-2004-V1.0.0 Operations for Citizens Broadband Radio Service (CBRS); GAA Spectrum Coordination—Approach 2

SUMMARY

Technical Problem

However, with diversification of radio wave use modes expected in the future, it is assumed that various users are mixed in the world of a cognitive radio technology. For example, it is assumed that operators having different privacy protection requirements (also referred to as security requirements) of information used for spectrum access are mixed. In order to enable effective use of the radio wave resources using the cognitive radio technology, it is desirable to know information about a user who uses the radio wave in detail. However, this is assumed to have at least some users hesitate to use the cognitive radio technology. In this case, it is assumed that the use of the cognitive radio technology does not proceed, and as a result, effective use of the radio wave resources is not realized.

Therefore, the present disclosure proposes a communication control device, a communication device, and a communication control method capable of realizing effective use of the radio wave resources.

Solution to Problem

To solve the above problem, a communication control device according to the present disclosure includes: an acquisition unit that acquires range information about privacy protection of a first radio system; a determination unit that determines a communication parameter of a second radio system that shares and uses a radio wave used by the first radio system based on a method associated with a range identified based on the range information; and a notification unit that notifies the second radio system of the determined communication parameter.

DESCRIPTION OF EMBODIMENTS

Figure 1:
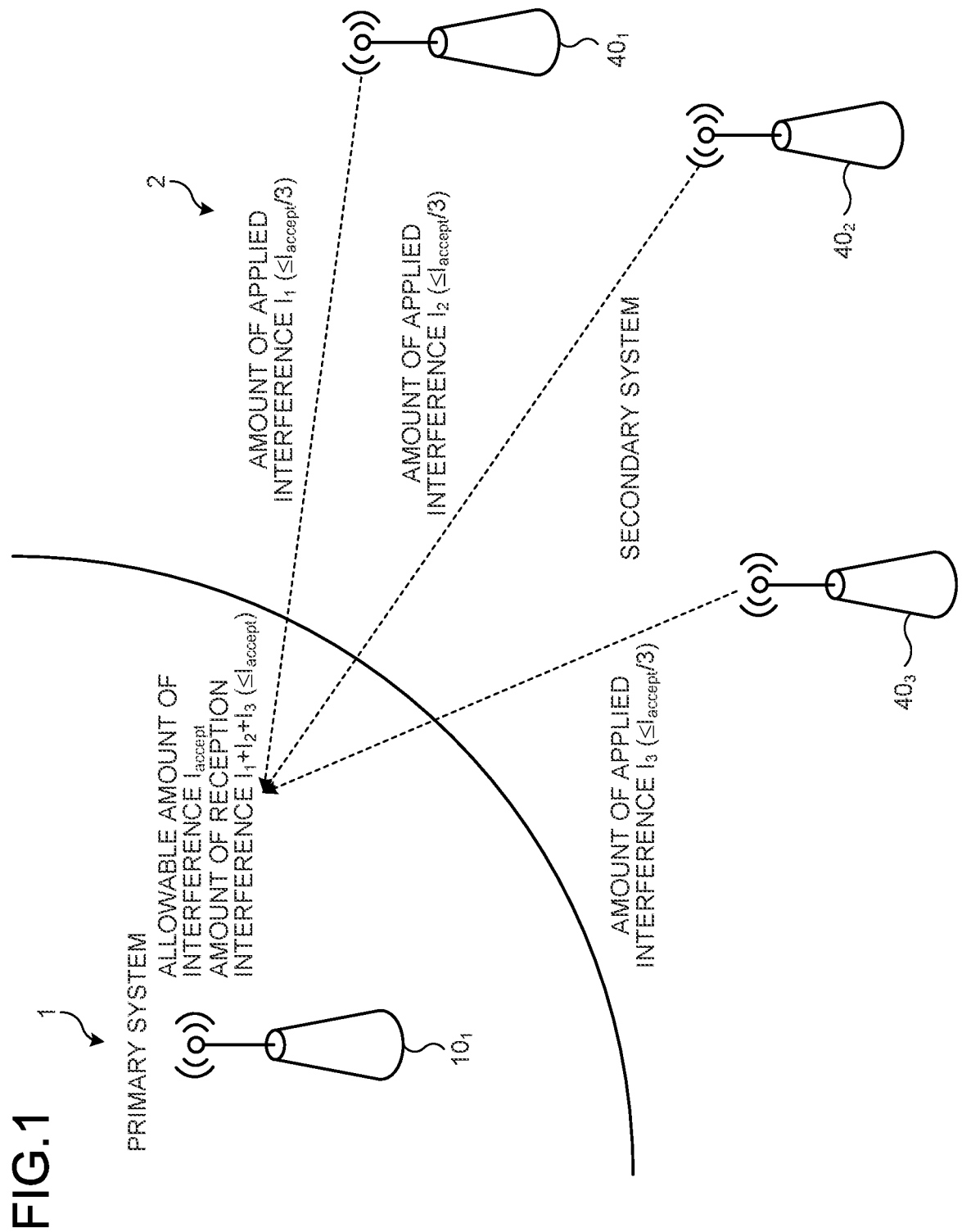
FIG. 1 is an explanatory diagram illustrating an example of allocation of an interference margin to each communication device constituting a secondary system.

Hereinafter, the embodiments of the present disclosure will be described in detail with reference to the drawings. In the following embodiments, the same parts are denoted by the same reference signs, and a duplicate description will be omitted.

Further, in the present specification and drawings, a plurality of components having substantially the same functional configurations may be distinguished by adding different numerals or alphabets after the same references. For example, a plurality of configurations having substantially the same functional configuration are distinguished as communication control devices $60_1$ and $60_2$ as required. Further, a plurality of configurations having substantially the same functional configuration are distinguished as communication systems 2A and 2B as required. However, when it is not necessary to distinguish each of the plurality of components having substantially the same functional configurations, only the same reference signs are given. For example, in a case where it is not necessary to particularly distinguish the communication control devices $60_1$ and $60_2$, the communication control devices $60_1$ and $60_2$ are simply referred to as a communication control device 60. Furthermore, in a case where it is not necessary to particularly distinguish the communication systems 2A and 2B, the communication systems 2A and 2B are simply referred to as a communication system 2.

Further, the present disclosure will be described in the order of the following items.

1. Introduction
  1-1. Control of radio system for realizing spectrum access
  1-2. Outline of the present embodiment
  1-3. Terms of spectrum and access
2. Configuration of communication system
  2-1. Overall configuration of communication system
  2-2. Configuration of radio wave utilization device
  2-3. Configuration of management device
  2-4. Configuration of terminal device
  2-5. Configuration of base station device
  2-6. Configuration of intermediate device
  2-7. Configuration of communication control device
  2-8. Configuration of external device
3. Interference model
4. Primary system protection method
  4-1. Interference margin simultaneous allocation type
  4-2. Interference margin iterative allocation type
5. Description of various procedures
  5-1. Registration procedure
  5-2. Available spectrum query procedure
  5-3. Spectrum use grant procedure
  5-4. Spectrum use notification
  5-5. Supplement to various procedures
  5-6. Various procedures for terminal device 5-7. Procedure occurring between communication control devices
5-8. Acquisition of information about communication control
5-9. Representative operation flow
6. Operation related to privacy protection
6-1. Privacy protection information
6-2. Communication control process
7. Modifications
7-1. Modification related to permission or non-permission of radio wave use
7-2. Modification related to application of embodiment
7-3. Modification related to system configuration
7-4. Other modifications
8. Conclusion 1. Introduction Due to a radio environment in which various radio systems are mixed in recent years and an increase and diversification of a content amount via radio, a problem that the radio wave resources that can be allocated to the radio systems (for example, a spectrum) is depleted has emerged. However, since all radio bands are already used by existing radio systems, it is difficult to allocate new radio wave resources. Therefore, in recent years, more effective use of the radio wave resources by utilization of a cognitive radio technology has begun to attract attention.

In a cognitive radio technology, the radio wave resources are generated by utilizing (for example, dynamic spectrum access (DSA)) the temporally and spatially vacant radio wave (white space) of an existing radio system. For example, in the United States, with the aim of opening a federal use band (3.55-3.70 GHz), which overlaps with frequency bands that are 3 GPP bands 42 and 43 globally, to the general public, the legalization and standardization of a citizens broadband radio service (CBRS) utilizing a spectrum access technology are accelerating.

Note that the cognitive radio technology contributes not only to dynamic spectrum access but also to improvement in spectrum use efficiency by the radio system. For example, in ETSI EN 303 387 and IEEE 802.19.1-2014, a technology of coexistence between radio systems using the vacant radio wave is specified.

<1-1. Control of Radio System for Realizing Spectrum Access>

In general, in the spectrum access, by the national regulatory authority (NRA) of each country/region, it is required to protect the radio system (primary system) of the primary user who is licensed or authorized for use of the frequency band. Typically, an allowable interference reference value of the primary system is provided by the NRA, and the radio system (secondary system) of the secondary user is required to cause applied interference generated by sharing to fall below the allowable interference reference value.

In the following description, a "system" means a set of a plurality of components (devices, modules (parts), etc). At this time, it does not matter whether all the components are in the same housing. For example, a plurality of devices housed in separate housings and connected via a network or the like, and one device in which a plurality of modules are housed in one housing are each the "system". That is, each of the radio systems such as the primary system and the secondary system may be configured by a plurality of devices or may be configured by one device.

In order to realize the spectrum access, for example, a communication control device (for example, the frequency management database) controls communication of the secondary system so as not to give fatal interference to the primary system. The communication control device is a device that manages communication and the like of the communication device. For example, the communication control device is a system that manages the radio wave resources (for example, the frequency) such as a geolocation database (GLDB) and a spectrum access system (SAS). In the case of the present embodiment, the communication control device corresponds to a communication control device 60 to be described later. The communication control device 60 will be described in detail later.

Here, the primary system is, for example, a system (for example, an existing system) that preferentially uses a predetermined frequency band over another system such as a secondary system. In addition, the secondary system is, for example, a system that secondarily uses (for example, dynamic spectrum access) a frequency band used by the primary system. The primary system and the secondary system may be configured by a plurality of respective communication devices or may be configured by one communication device. The communication control device allocates an allowable interference amount to one or a plurality of communication devices so that an interference aggregation of one or a plurality of communication devices constituting a secondary system to a primary system does not exceed the allowable interference amount (also referred to as an interference margin) of the primary system. At this time, the allowable interference amount may be an amount of interference determined in advance by an operator of the primary system, a public institution that manages the radio wave, or the like. In the following description, the interference margin refers to an allowable interference amount. In addition, accumulation of interference may be referred to as accumulated applied interference power.

FIG. 1 is an explanatory diagram illustrating an example of allocation of an interference margin given to each communication device constituting a secondary system. In the example of FIG. 1, a communication system 1 is a primary system, and a communication system 2 is a secondary system. The communication system 1 includes a radio wave utilization device 101 and the like. Furthermore, the communication system 2 includes base station devices $40_1$, $40_2$, $40_3$, and the like. In the example of FIG. 1, the communication system 1 includes only one radio wave utilization device 10, but the communication system 1 may include the plurality of radio wave utilization devices 10. Further, in the example of FIG. 1, the communication system 2 includes three base station devices 40, but the number of base station devices 40 included in the communication system 2 may be less or more than three. In addition, the radio communication device included in the communication system 2 is not necessarily a base station device. Although only one primary system (the communication system 1 in the example of FIG. 1) and only one secondary system (the communication system 2 in the example of FIG. 1) are illustrated in the example of FIG. 1, a plurality of primary systems and a plurality of secondary systems may be provided.

Each of the radio wave utilization device 101 and the base station devices $40_1$, $40_2$, and $40_3$ can transmit and receive the radio wave. The amount of interference allowed by the radio wave utilization device 101 is $I_{accept}$. In addition, the amounts of interference given to a predetermined protection point of the communication system 1 (primary system) by the base station devices $40_1$, $40_2$, and $40_3$ are the amounts of applied interference $I_1$, $I_2$, and $I_3$, respectively. Here, the protection point is an interference calculation reference point for protection of the communication system 1.

The communication control device allocates the interference margin $I_{accept}$ to the plurality of base station devices 40 so that accumulation of interference to a predetermined protection point of the communication system 1 (amount of reception interference $I_1+I_2+I_3$ illustrated in FIG. 1) does not exceed the interference margin $I_{accept}$. For example, the communication control device allocates the interference margin $I_{accept}$ to each base station device 40 so that the amounts of applied interference $I_1$, $I_2$, and $I_3$ are each $I_{accept}/3$. Alternatively, the communication control device allocates the interference margin $I_{accept}$ to each base station device 40 so that the amounts of applied interference $I_1$, $I_2$, and $I_3$ are each $I_{accept}/3$ or less. Of course, the method of allocating the interference margin is not limited to this example.

The communication control device calculates the maximum transmission power (hereinafter, referred to as maximum allowable transmission power) allowed for each base station device 40 based on the allocated amount of interference (hereinafter, referred to as an allocation amount of interference). For example, the communication control device calculates the maximum allowable transmission power of each base station device 40 by calculating back from the allocation amount of interference based on the propagation loss, the antenna gain, and the like. Then, the communication control device notifies each base station device 40 of information about the calculated maximum allowable transmission power.

<1-2. Outline of the Present Embodiment>

In recent years, the degree of attention on the 5G NR has rapidly increased. Features of the 5G NR include enhanced mobile broadband (eMBB), massive machine type communications (mMTC), and ultra reliable and low latency communications (URLLC) on a radio access network (RAN) side. In addition, as a feature of the 5G NR, "virtualization" represented by network slicing and the like can be cited on the core network side. With these features, after the spread of the 5G NR, it is expected that the conventional mobile broadband centered radio wave use mode will be completely changed, and various use forms will appear.

On the other hand, it is expected that the demand for use of the Sub-6 GHz band will also increase as the use of millimeter waves increases. Therefore, it is considered that frequency tightness will continue in the future, and spectrum access will accelerate.

In the related art, in spectrum access, a database manages position information and operational parameter information (transmission power, frequency, etc) of a radio system regardless of a primary system (or a user operator) and a secondary system (or a user operator). However, with the diversification of radio wave use modes assumed in the future, it is expected that there will be a mixture of operators having different privacy requirements of information conventionally used for spectrum access. In fact, taking the CBRS as an example, since the on-board radar of the Department of Defense exists as a primary system, a dedicated requirement standard (WINNF-TS-0071) related to the on-board radar protection has been issued.

With diversification of radio wave use modes expected in the future, it is assumed that various users are mixed in the world of the cognitive radio technology. However, in the current spectrum access law, a protection method and the like are defined in a systemwise manner, but a user-wise method is not studied. For example, in the future, with diversification of radio wave use modes, it is assumed that there will be a mixture of operators having different privacy protection requirements (also referred to as security requirements) of information used for spectrum access, but a protection method according to the privacy protection requirements has not been studied.

In order to enable effective use of the radio wave resources using the cognitive radio technology, it is desirable to know information about a user who uses the radio wave in detail. However, this is assumed to have at least some users (for example, a user who handles a high security level of information) hesitate to use the cognitive radio technology. In this case, it is assumed that the use of the cognitive radio technology does not proceed, and as a result, effective use of the radio wave resources is not realized.

Therefore, in the present embodiment, the spectrum use can be managed according to the privacy protection requirements (for example, a desired privacy level) different for each user.

For example, the communication control device of the present embodiment acquires range information (privacy protection information) related to privacy protection of the primary system from a user or the like of the primary system. Then, the communication control device determines the communication parameter of the secondary system based on a method associated with the range identified based on the acquired range information. For example, the communication control device irregularly determines permission or non-permission of the radio wave use by the secondary system outside the limited range (outside the radio wave use limited range) related to privacy protection, and determines the communication parameter based on the determination result. Then, the communication control device notifies the secondary system of the determined communication parameter.

This makes it difficult to estimate the privacy protection information of the primary system. For example, when the use of the radio wave is not permitted at all within the limited range related to privacy protection and the use of the radio wave is permitted 100% outside the limited range related to privacy protection, the limited range is easily estimated by the secondary system side. This may have the primary system user hesitate to use the cognitive radio technology when the limited range is high security level information that is not desired to be known to others. However, in the present embodiment, for example, by irregularly (for example, randomly) prohibiting the use of the radio wave even outside the limited range, it is difficult to estimate information about the limited range. As a result, it is expected that the user will not hesitate to use the cognitive radio technology, and effective use of the radio wave resources is realized.

<1-3. Terms Related to Frequency and Sharing>

Although the outline of the present embodiment is described above, the present embodiment will be described in detail below. Before describing the present embodiment in detail, terms of spectrum and access used in the present embodiment will be organized in order to facilitate understanding of the present embodiment.

In the present embodiment, it is assumed that the primary system (for example, the communication system 1) and the secondary system (for example, the communication system 2) are in a dynamic spectrum access environment. Hereinafter, terms related to frequency and sharing will be described by taking, as an example, a citizens broadband radio service (CBRS) legally developed by the United States Federal Communications Commission (FCC). Note that the communication system 1 and the communication system 2 of the present embodiment are not limited to systems in the CBRS.

Figure 2:
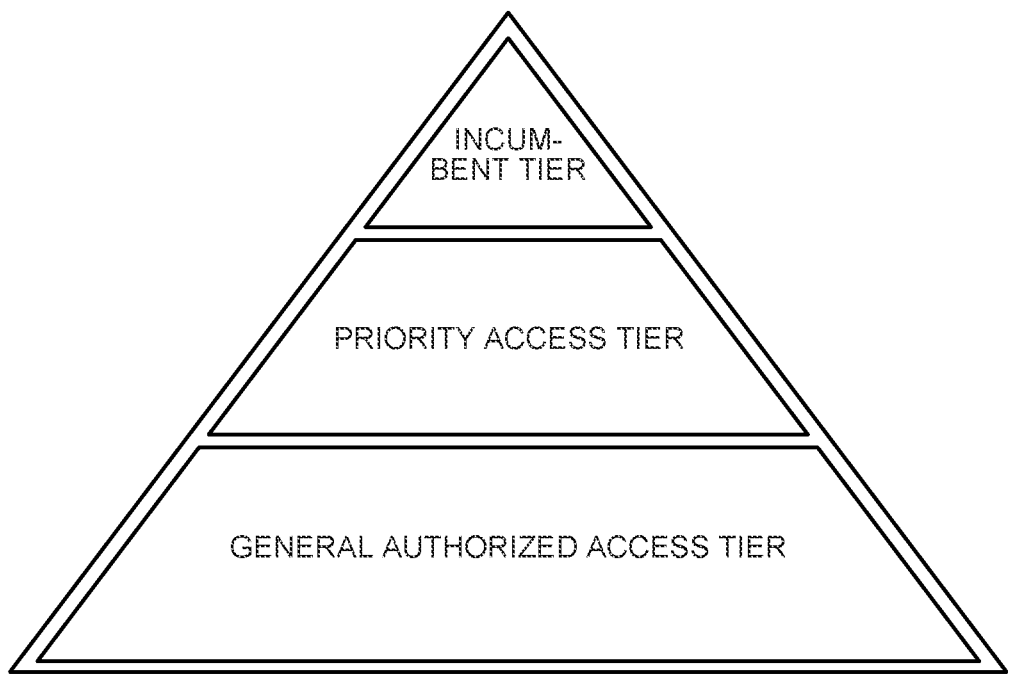
FIG. 2 is an explanatory diagram illustrating a hierarchical structure in a CBRS.

FIG. 2 is an explanatory diagram illustrating a hierarchical structure in the CBRS. As illustrated in FIG. 2, each of the users in the frequency band is classified into one of three groups. This group is referred to as a "tier". In each of the three groups, a hierarchical structure including an incumbent tier, a priority access tier, and a general authorized access tier is defined. In this hierarchical structure, the priority access tier is located above the general authorized access tier, and the incumbent tier is located above the priority access tier. Using the CBRS as an example, for example, a system (existing system) located in the incumbent tier is a primary system, and a system located in the general authorized access tier and the priority access tier are a secondary system.

The incumbent tier is a group of existing users of the shared frequency band. In the CBRS, the Department of Defense (DOD), a fixed satellite operator, and a grandfathered wireless broadband licensee (GWBL) are defined as existing users. The incumbent tier is not required to avoid or suppress interference to the priority access tier and the general authorized access tier (GAA Tier) with lower priority. In addition, the incumbent tier is protected from interference by the priority access tier and the general authorized access tier (GAA Tier). That is, the user of the "incumbent tier" can use the frequency band without considering the existence of other groups.

The priority access tier is a group of users each having a license called a priority access license (PAL). It is required to avoid or suppress interference to the incumbent tier with a higher priority than the priority access tier, but is not required to avoid or suppress interference to the general authorized access tier (GAA Tier) with a lower priority. In addition, the priority access tier is not protected from interference by the incumbent tier with a higher priority, but is protected from interference by the general authorized access tier (GAA Tier) with a lower priority.

The general authorized access tier (GAA Tier) is a group of all other users that do not belong to the foregoing incumbent tier and the priority access tier. It is required to avoid or suppress interference to the incumbent tier and the priority access tier having a higher priority. In addition, the general authorized access tier (GAA Tier) is not protected from interference by the priority access tier and the incumbent tier with a higher priority. That is, the general authorized access tier (GAA Tier) is a "tier" in which opportunistic spectrum use is required in law.

Note that the hierarchical structure is not limited to these definitions. The CBRS is generally called a three-tier structure, but may be a two-tier structure. A typical example is a two-tier structure such as a licensed shared access (LSA) and a TV band white space (TVWS). In the LSA, a structure equivalent to a combination of the incumbent tier and the priority access tier is used. In addition, in the TVWS, a structure equivalent to a combination of the incumbent tier and the general authorized access tier (GAA Tier) is used. In addition, there may be four or more tiers. Specifically, for example, an intermediate tier corresponding to the priority access tier may be further prioritized. In addition, for example, the general authorized access tier (GAA Tier) may be similarly prioritized.

Figure 3:
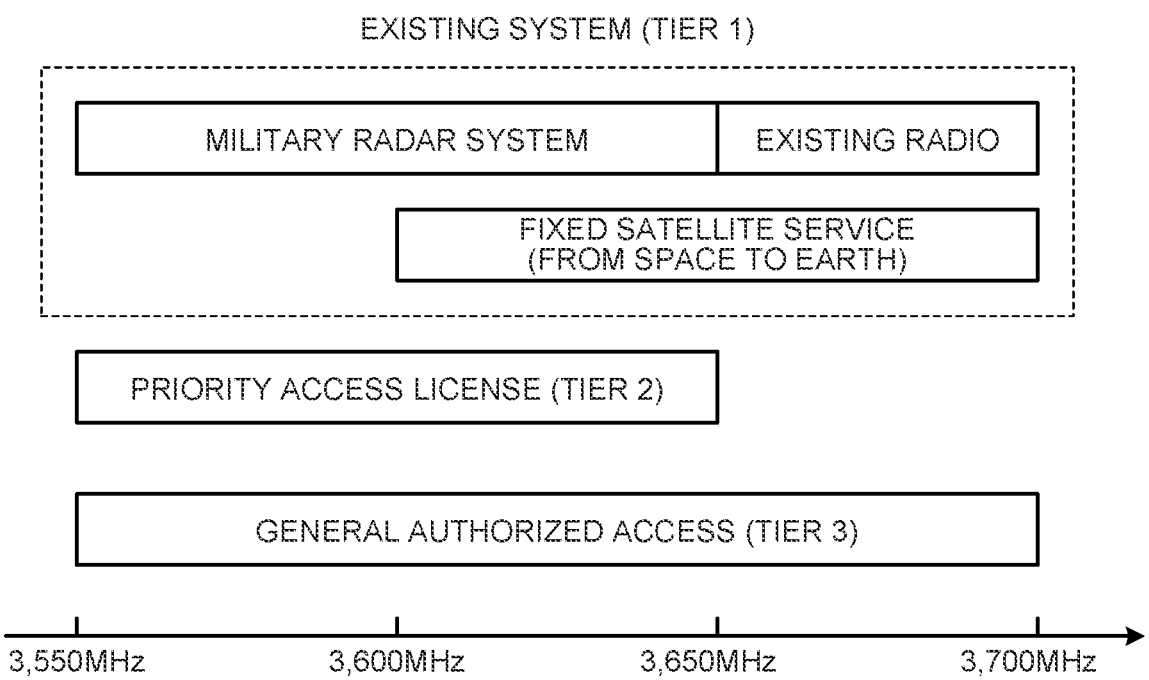
FIG. 3 is an explanatory diagram illustrating a band of the CBRS.

FIG. 3 is an explanatory diagram illustrating a band of the CBRS. Taking the CBRS described above as an example, the primary system is a military radar system, an existing radio system (grandfathered wireless system), or a fixed satellite service (from space to earth). Here, the military radar system is typically an on-board radar. In addition, the secondary system is a wireless network system including a base station and a terminal called a citizens broadband radio service device (CBSD) and an end user device (EUD). A priority further exists in the secondary system, and a priority access license (PAL) for which a shared band can be licensed and a general authorized access (GAA) equivalent to unlicensed are defined. The tier 1 illustrated in FIG. 3 corresponds to the incumbent tier illustrated in FIG. 2. Further, the tier 2 illustrated in FIG. 3 corresponds to the priority access tier illustrated in FIG. 2. Further, the tier 3 (Tier 3) illustrated in FIG. 3 corresponds to the general authorized access tier illustrated in FIG. 2.

Note that the primary system and the secondary system are not limited to the above examples. For example, a radio system included in the priority access tier may be regarded as a primary system, and a system included in a general authorized access tier (GAA Tier) may be regarded as a secondary system.

In addition, the primary system (communication system 1) of the present embodiment is not limited to the example illustrated in FIG. 3. Another type of radio system may be used as the primary system (communication system 1). For example, another radio system may be set as the primary system according to the country, region, and frequency band to be applied. For example, the primary system may be a television broadcasting system such as a digital video broadcasting-terrestrial (DVB-T) system. In addition, the primary system may be a radio system called a fixed system (FS). In addition, it may be spectrum access in another frequency band. For example, an LSA and a TV band white space (TVWS) can be cited as representative examples. Furthermore, the primary system may be a cellular communication system such as long term evolution (LTE) or new radio (NR). The primary system may also be an aviation radio system such as an aeronautical radio navigation service (ARNS). Of course, the primary system is not limited to the above radio system, and may be another type of radio system.

Further, a vacant radio wave (white space) used by the communication system 2 is not limited to the radio wave of the Federal use band (3.55-3.70 GHz). The communication system 2 may use the radio wave in a frequency band different from the Federal use band (3.55-3.70 GHz) as a vacant radio wave. For example, when the primary system (communication system 1) is a television broadcasting system, the communication system 2 may be a system that uses a TV white space as a vacant radio wave. Here, the TV white space refers to a frequency band that is not used by the television broadcasting system among frequency channels allocated to the television broadcasting system (primary system). At this time, the TV white space may be a channel that is not used according to the area.

The relationship between the communication system 1 and the communication system 2 is not limited to the spectrum access relationship in which the communication system 1 is a primary system and the communication system 2 is a secondary system. The relationship between the communication system 1 and the communication system 2 may be a network coexistence relationship between the same or different radio systems using the same spectrum.

In general, in spectrum access, an existing system using a target band is referred to as a primary system, and a system of a secondary user is referred to as a secondary system. However, in a case where the present embodiment is applied to an environment other than the spectrum access environment, these systems (primary system, secondary system) may be replaced with systems of another term. For example, a macro cell in HetNet may be a primary system, and a small cell or a relay station may be a secondary system. In addition, the base station may be a primary system, and a relay UE or a vehicle UE that implements D2D or V2X existing in its coverage may be a secondary system. The base station is not limited to a fixed type, and may be a portable/mobile type. In such a case, for example, the communication control device provided by the present invention may be included in a base station, a relay station, a relay UE, or the like.

The term "frequency" appearing in the following description may be replaced with another term. For example, the term "frequency" may be replaced with terms such as "resource", "resource block", "resource element", "channel", "component carrier", "bandwidth part (BWP)", "carrier", "subcarrier", and "beam" or terms having similar meanings.

2. Configuration of Communication System

Hereinafter, a communication system 1000 according to the embodiment of the present disclosure will be described. A communication system 1000 includes the communication system 1 and the communication system 2. The communication system 1 (first radio system) is a radio communication system that performs radio communication using a predetermined frequency band (primary use). In addition, the communication system 2 (second radio system) is a radio communication system that performs radio communication by secondarily using a frequency band used by the communication system 1. For example, the communication system 2 is a radio communication system that performs a dynamic spectrum access for the vacant radio wave of the communication system 1. The communication system 2 provides a radio service to a user or a device owned by the user by using a predetermined radio access technology.

Here, the communication systems 1 and 2 may be cellular communication systems such as a wideband code division multiple access (W-CDMA), a code division multiple access 2000 (cdma 2000), an LTE, and an NR. In the following explanation, the "LTE" includes an LTE-advanced (LTE-A), an LTE-advanced pro (LTE-A Pro), and an evolved universal terrestrial radio access (EUTRA). In addition, the "NR" includes a new radio access technology (NRAT) and a further EUTRA (FEUTRA).

The NR is the next generation (fifth generation) of LTE radio access technology (RAT). The NR is a radio access technology that can support various use cases including an enhanced mobile broadband (eMBB), massive machine type communications (mMTC), and ultra-reliable and low latency communications (URLLC).

Note that the communication systems 1 and 2 are not limited to the cellular communication system. For example, the communication system 2 may be another radio communication system such as a radio local area network (LAN) system, a television broadcasting system, an aviation radio system, or a space radio communication system.

In the present embodiment, the communication system 1 is a primary system, and the communication system 2 is a secondary system. As described above, a plurality of communication systems 1 and a plurality of communication systems 2 may be provided. In the example of FIG. 1, the communication system 1 includes one radio wave utilization device 10 (radio wave utilization device 101 illustrated in FIG. 1). However, as described above, the communication system 1 may include the plurality of radio wave utilization devices 10. The configuration of the radio wave utilization device 10 may be the same as or different from the configuration of a base station device 40 or a terminal device 30 to be described later.

<2-1. Overall Configuration of Communication System>

The communication system 1000 typically includes the following entities.

Communication device (for example, a radio wave utilization device, a base station device, or an intermediate device)

Terminal device Management device (for example, a communication control device)

Note that, in the following description, the entities serving as the communication devices are assumed to be the radio wave utilization device 10, the base station device 40, and an intermediate device 50, but the entities serving as the communication devices are not limited to these devices, and may be other communication devices (for example, a management device 20, the terminal device 30, and the communication control device 60). For example, an external device to be described later may be regarded as part of the communication system 1000. Of course, the external device may not be part of the communication system 1000. Furthermore, the terminal device 30 may be regarded as an external device.

Figure 4:
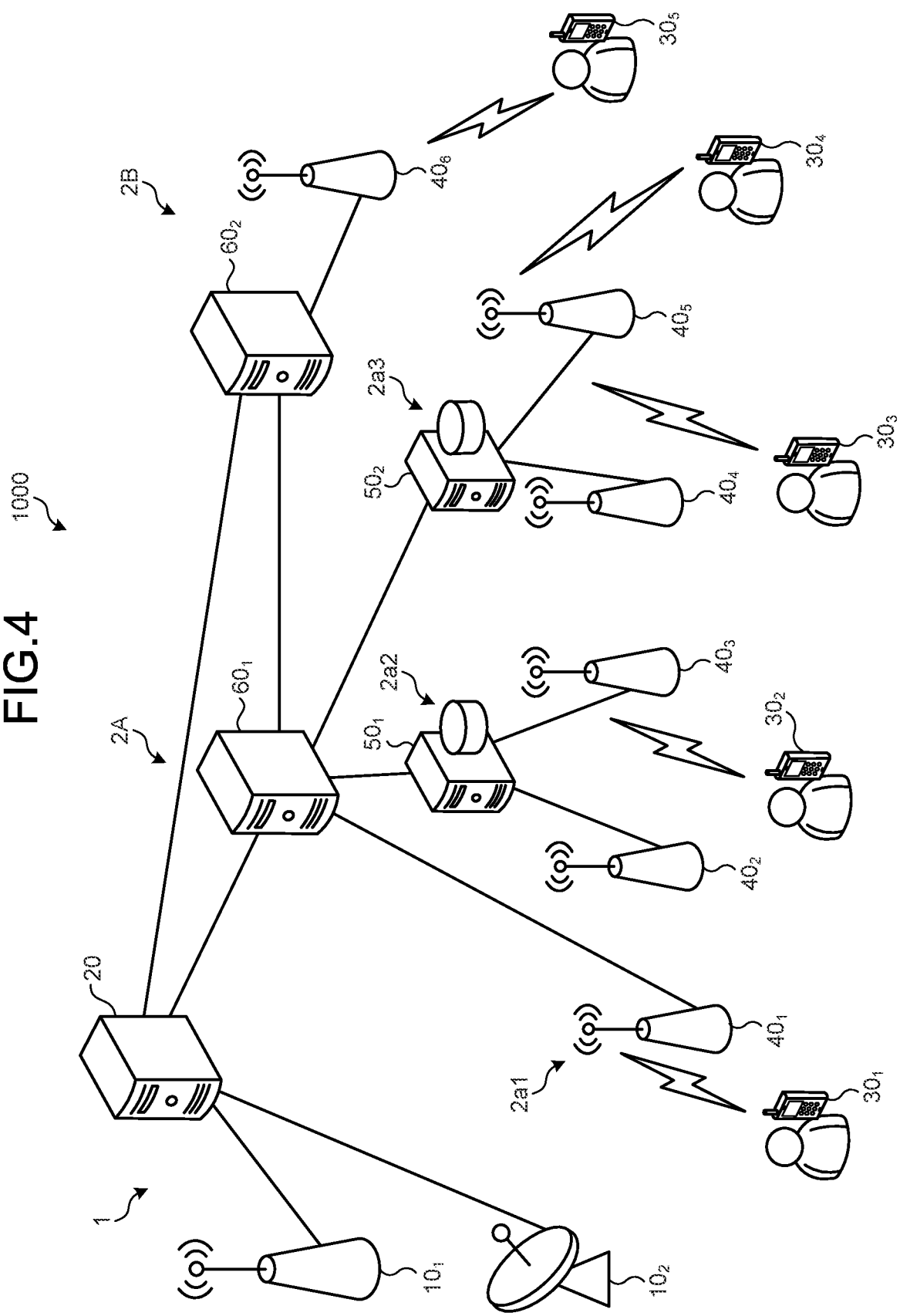
FIG. 4 is a diagram illustrating a configuration example of a communication system according to an embodiment of the present disclosure.

FIG. 4 is a diagram illustrating a configuration example of a communication system 1000 according to an embodiment of the present disclosure. As described above, the communication system 1000 includes the communication system 1 and the communication system 2. Note that the device in the figure can also be regarded as a device in a logical sense. In other words, some of the devices in the figure are realized by a virtual machine (VM), a container, a docker, and the like, and they may be implemented on the physically identical hardware.

The communication system 1 includes the radio wave utilization device 10 and the management device 20. In the example of FIG. 4, the communication system 1 includes radio wave utilization devices 101 and 102 and the management device 20 that manages the radio wave utilization devices. Note that the communication system 1 may not necessarily include the management device 20. Furthermore, the communication system 1 may include a plurality of radio wave utilization devices 10 or may include only one radio wave utilization device. In the example of FIG. 4, each of the radio wave utilization devices 101 and 102 can be regarded as one communication system 1.

The communication system 2 includes the terminal device 30, the base station device 40, the intermediate device 50, and the communication control device 60. In the example of FIG. 4, a communication system 2A and a communication system 2B are described as the communication system 2. The communication system 2A includes a communication system $2a1$, a communication system $2a2$, and a communication system $2a3$. The communication system $2a1$ includes a terminal device $30_1$ and a base station device $40_1$, the communication system $2a2$ includes a terminal device $30_2$, base station devices $40_2$ to $40_3$, and an intermediate device $50_1$, and the communication system $2a3$ includes terminal devices $30_2$ to $30_4$, base station devices $40_4$ to $40_5$, and an intermediate device $50_2$. Furthermore, the communication system 2B includes a terminal device $30_5$ and a base station device $40_6$.

Note that the communication system 2 may not necessarily include the communication control device 60. To describe by using the example of FIG. 4, each of the communication system 2a2 and the communication system 2a3 having the communication control device 60 outside may be regarded as one communication system 2. Furthermore, the communication system 2 may not necessarily include the intermediate device 50. In the example of FIG. 4, the communication system 2a1 not including the intermediate device 50 may be regarded as one communication system 2.

The communication systems 1 and 2 provide radio services to a user or a device possessed by the user by the devices (for example, communication devices such as radio communication devices) constituting the communication systems 1 and 2 operating in cooperation. The radio communication device is a device having a function of radio communication. In the example of FIG. 4, the radio wave utilization device 10, the base station device 40, and the terminal device 30 correspond to radio communication devices.

Note that the intermediate device 50 and the communication control device 60 may have a radio communication function. In this case, the intermediate device 50 and the communication control device 60 can also be regarded as radio communication devices. In the following description, the radio communication device may be simply referred to as a communication device. Note that the communication device is not limited to a radio communication device, and for example, a device that does not have a radio communication function and can only perform wired communication can also be regarded as a communication device.

In the present embodiment, the concept of the "communication device" includes not only a portable mobile device (for example, terminal device) such as a mobile terminal, but also a device installed in a structure or a moving object. The structure or the moving object itself may be regarded as a communication device. In addition, the concept of the communication device includes not only a terminal device but also a base station device and a relay device. The communication device is a type of processing device and information processing device. The description of the "communication device" appearing in the following description can be appropriately rephrased as a "transmission device" or a "reception device". Note that, in the present embodiment, the concept of "communication" includes "broadcasting". In this case, the description of the "communication device" can be appropriately rephrased as a "broadcasting device". Of course, the description of the "communication device" may be appropriately rephrased as a "transmission device" or a "reception device".

The communication system 2 may include the plurality of terminal devices 30, the plurality of base station devices 40, the plurality of communication control devices 60, and the plurality of intermediate devices 50. In the example of FIG. 4, the communication system 2 includes terminal devices $30_1$, $30_2$, $30_3$, $30_4$, $30_5$, and the like as the terminal device 30. Furthermore, the communication system 2 includes base station devices $40_1$, $40_2$, $40_3$, $40_4$, $40_5$, $40_6$, and the like as the base station device 40. Furthermore, the communication system 2 includes communication control devices $60_1$ and $60_2$ as the communication control device 60.

In the following description, a radio communication device may be referred to as a radio system. For example, each of the terminal devices $30_1$ to $30_5$ is one radio system. In addition, each of the radio wave utilization device 10 and the base station devices $40_1$ to $40_6$ is one radio system. In the following description, the communication system 1 is referred to as a first radio system, but each of one or a plurality of radio wave utilization devices 10 included in the communication system 1 may be regarded as the first radio system. In addition, in the following description, each of one or a plurality of base station devices 40 included in the communication system 2 is referred to as a second radio system, but the communication system 2 itself may be regarded as a second radio system, or each of one or a plurality of terminal devices 30 included in the communication system 2 may be regarded as a second radio system. When the intermediate devices 50 and the communication control devices 60 each have a radio communication function, each of the intermediate devices 50 or each of the communication control devices 60 may be regarded as the second radio system.

Note that the radio system may be one system including a plurality of communication devices including at least one radio communication device. For example, a system including one or a plurality of base station devices 40 and one or a plurality of terminal devices 30 under the base station devices may be regarded as one radio system. Furthermore, each of the communication system 1 and the communication system 2 can be regarded as one radio system. In the following description, a communication system including a plurality of communication devices including at least one radio communication device may be referred to as a radio communication system or simply as a communication system. Note that one system including a plurality of communication devices including one radio communication device may be regarded as the first radio system or the second radio system.

In the present embodiment, the system means a set of a plurality of components (devices, modules (parts), etc.). At this time, all the components constituting the system may or may not be in the same housing. For example, a plurality of devices housed in separate housings and connected by wire and/or wirelessly is one system. One device in which a plurality of modules are housed in one housing is also one system.

[Radio Wave Utilization Device]

The radio wave utilization device 10 is a radio communication device constituting the communication system 1 (primary system). The radio wave utilization device 10 may be a radio wave emission device such as a radar or a reflected wave reception device. As described above, the primary system is, for example, a military radar system, an existing system (for example, a television broadcasting system or an existing cellular communication system), or a system for a fixed satellite service.

In a case where the communication system 1 is a military radar system, the radio wave utilization device 10 is, for example, an on-board radar. In a case where the communication system 1 is a television broadcasting system, the radio wave utilization device 10 is, for example, a broadcasting station (broadcasting station as a facility) such as a broadcasting relay station. In a case where the communication system 1 is a system for a fixed satellite service, the radio wave utilization device 10 is, for example, a parabolic antenna that receives the radio wave from an artificial satellite. Of course, the radio wave utilization device 10 is not limited thereto. For example, when the communication system 1 is an existing cellular communication system, the radio wave utilization device 10 may be a base station device.

As with the base station device 40 to be described later, the radio wave utilization device 10 may be capable of communicating with other communication devices using a radio access technology. At this time, the radio access technology used by the radio wave utilization device 10 may be a cellular communication technology or a radio LAN technology. Of course, the radio access technology used by the base station device 40 is not limited to these, and may be another radio access technology. For example, the radio access technology used by the radio wave utilization device 10 may be a low power wide area (LPWA) communication technology. Here, the LPWA communication is communication conforming to the LPWA standard. Examples of the LPWA standard include ELTRES, ZETA, SIGFOX, LoRaWAN, and NB-IoT. Of course, the LPWA standard is not limited thereto, and may be other LPWA standards. In addition, the radio communication used by the radio wave utilization device 10 may be radio communication using millimeter waves. Further, the radio communication used by the radio wave utilization device 10 may be radio communication using the radio wave, or radio communication (optical radio) using infrared rays or visible light.

In addition, the configuration of the radio wave utilization device 10 may be similar to that of the terminal device 30 or the base station device 40 to be described later.

[Management Device]

The management device 20 is a device that manages the radio wave utilization device 10. For example, the management device 20 is a server or a database owned by an operator or an administrator of the communication system 1.

Note that the management device 20 may be a server or a database owned by a public institution. For example, the management device 20 may be a database (for example, a regulatory database) managed and operated by a national or regional radio administration agency. Examples of the regulatory database include a universal licensing system (ULS) operated by Federal Communications Commissions (FCC).

In addition, in a case where the communication system 1 is an existing cellular communication system, the management device 20 may be a device that manages a wireless network. For example, the management device 20 may be a device that functions as a mobility management entity (MME), an access and mobility management function (AMF), or a session management function (SMF).

When the communication system 2 configures a network including the radio wave utilization device 10 as one of the nodes, the management device 20 may be, for example, a network manager that integrally controls the radio wave utilization device 10 in the network.

Of course, the management device 20 is not limited to these examples. Note that the radio wave utilization device 10 may have the function of the management device 20. In this case, the radio wave utilization device 10 can be regarded as the management device 20.

In addition, the management device 20 may have a function of a communication control device. In this case, the management device 20 can be regarded as the communication control device 60.

[Terminal Device]

The terminal device 30 is a communication device having a communication function. The terminal device 30 is typically a communication device such as a smartphone. The terminal device 30 may be a user terminal such as a mobile phone, a smart device (smartphone or tablet), a wearable terminal, an Internet of Things (IoT) device, a personal digital assistant (PDA), or a personal computer. Furthermore, the terminal device 30 may be a business camera equipped with a communication function, or may be a motorcycle, a moving relay vehicle, or the like on which a communication device such as a field pickup unit (FPU) is mounted. Further, the terminal device 30 may be a machine to machine (M2M) device or an Internet of things (IoT) device. The terminal device may be referred to as user equipment, a user terminal, a user station, a mobile terminal, a mobile station, or the like. Furthermore, a terminal device 40 may also be referred to as, for example, MTC UE, NB-IoT UE, or Cat.MUE.

Furthermore, the terminal device 30 may be capable of performing sidelink communication with another terminal device 30. When performing sidelink communication, the terminal device 30 may be able to use an automatic retransmission technology such as Hybrid Automatic Repeat reQuest (HARQ). The radio communication (including sidelink communication) used by the terminal device 30 may be radio communication using the radio wave, or may be radio communication (optical radio) using infrared rays or visible light.

Furthermore, the terminal device 30 may be a mobile device. The mobile device is a mobile radio communication device. The terminal device 30 may be a radio communication device installed in the moving object, or may be the moving object itself. For example, the terminal device 30 may be a vehicle moving on the road such as an automobile, a bus, a truck, or a motorcycle, or a radio communication device mounted on the vehicle. The moving object may be a mobile terminal, or may be a moving object that moves on land (ground in a narrow sense), underground, on water, or underwater. Further, the moving object may be a moving object that moves in the atmosphere such as a drone or a helicopter, or may be a moving object that moves outside the atmosphere such as an artificial satellite.

The terminal device 30 may be connected to a plurality of base station devices or a plurality of cells at the same time to perform communication. For example, when one base station device supports a communication area through a plurality of cells (for example, pCell, sCell), with the carrier aggregation (CA) technology, the dual connectivity (DC) technology, and the multi-connectivity (MC) technology, it is possible to bundle the plurality of cells to perform communication between the base station device 40 and the terminal device 30. Alternatively, via a cell of a different base station device 40, by using coordinated multi-point transmission and reception (CoMP) technology, it is also possible for the terminal device 30 to communicate with the plurality of base station devices 40.

Note that the terminal device 30 is not necessarily used by a person. The terminal device 30 may be a sensor installed in a machine in a factory or a building, such as a so-called machine type communication (MTC). Further, the terminal device 30 may be a machine to machine (M2M) device or an Internet of things (IoT) device. In addition, the terminal device 30 may be a device having a relay communication function as represented by the device to device (D2D) and the vehicle to everything (V2X). Further, the terminal device 30 may be a device called customer premises equipment (CPE) used in a radio backhaul or the like. The terminal device 30 may be a radio communication device installed on the moving object, or may be the moving object itself.

[Base Station Device]

The base station device 40 (second radio system) is a radio communication device that wirelessly communicates with the terminal device 30 or another communication device (another base station device 40 and another intermediate device 50). The base station device 40 is a type of communication device. The base station device 40 is, for example, a device corresponding to a radio base station (Base Station, Node B, eNB, gNB, and the like) or a radio access point. When the base station device 40 is a radio access point, the base station device 40 may be referred to as a non-3GPP access. The base station device 40 may be a radio relay station (relay node). The base station device 40 may be a road base station device such as a road side unit (RSU). Further, the base station device 40 may be an optical remote device called a remote radio head (RRH). Furthermore, the base station device 40 may be a receiving station device such as a field pickup unit (FPU). Furthermore, the base station device 40 may be an integrated access and backhaul (IAB) donor node or an IAB relay node that provides a radio access line and a radio backhaul line by time division multiplexing, frequency division multiplexing, or space division multiplexing.

The radio access technology used by the base station device 40 may be a cellular communication technology or a radio LAN technology. Of course, the radio access technology used by the base station device 40 is not limited to these, and may be another radio access technology. For example, the radio access technology used by the base station device 40 may be a low power wide area (LPWA) communication technology. Here, the LPWA communication is communication conforming to the LPWA standard. Examples of the LPWA standard include ELTRES, ZETA, SIGFOX, LoRaWAN, and NB-IoT. Of course, the LPWA standard is not limited thereto, and may be other LPWA standards. In addition, the radio communication used by the base station device 40 may be radio communication using millimeter waves. Further, the radio communication used by the base station device 40 may be radio communication using the radio wave, or radio communication (optical radio) using infrared rays or visible light.

In the present embodiment, the base station of the radio communication system may be referred to as a base station device. The radio access technology used by the base station device 40 may be a cellular communication technology or a radio LAN technology. Of course, the radio access technology used by the base station device 40 is not limited to these, and may be another radio access technology. Further, the radio communication used by the base station device 40 may be radio communication using the radio wave, or radio communication (optical radio) using infrared rays or visible light.

The base station device 40 is not necessarily fixed, and may be installed in a moving object such as an automobile. Furthermore, the base station device 40 does not necessarily need to exist on the ground, and the communication device function may be provided for an object existing in the air or space, such as an aircraft, a drone, a helicopter, or a satellite, or an object existing on the sea or under the sea, such as a ship or a submarine. In such a case, the base station device 40 can perform radio communication with another fixedly installed communication device.

The concept of the base station device (also referred to as a base station) includes not only a donor base station but also a relay base station (also referred to as a relay station or a relay station device). The concept of a base station also includes an access point. Further, the concept of the base station includes not only a structure having a function of a base station but also a device installed in the structure.

The structure is, for example, a building such as an office building, a house, a steel tower, a station facility, an airport facility, a harbor facility, or a stadium. In addition, the concept of structure includes not only the building, but also non-building structures such as a tunnel, a bridge, a dam, a fence, and an iron pillar, and facilities such as a crane, a gate, and a wind turbine. The concept of structure includes not only structures on land (ground in a narrow sense) or underground, but also structures on water such as a pier and a mega float, and structures underwater such as an ocean observation facility.

The base station device 40 may be a donor station or a relay station. In a case where the base station device 40 is a relay station, the device is not limited to the device on which the base station device 40 is mounted as long as the function of relay is satisfied. For example, the base station device 40 may be mounted on a terminal device such as a smartphone, may be mounted on an automobile or a human-powered vehicle, may be mounted on a balloon, an airplane, or a drone, or may be mounted on a home appliance such as a television, a game machine, an air conditioner, a refrigerator, or a lighting fixture. Of course, these devices themselves may be regarded as the base station device 40.

Furthermore, the base station device 40 may be a fixed station or a mobile station. The mobile station is a radio communication device (for example, the base station device) configured to be movable. At this time, the base station device 40 may be a device installed in the moving object or may be the moving object itself. For example, a relay station device having mobility can be regarded as the base station device 40 as a mobile station. Also, a device having a base station device function (at least part of the base station device function) such as a vehicle, a drone, a smartphone, or the like, which is originally a device with mobility, also corresponds to the base station device 40 as a mobile station.

Here, the moving object may be a mobile terminal such as a smartphone or a mobile phone. Further, the moving object may be a moving object (for example, a vehicle such as an automobile, a bicycle, a bus, a truck, a motorcycle, a train, a linear motor vehicle, and the like) that moves on land (ground in a narrow sense), or may be a moving object (for example, subway) that moves underground (for example, in a tunnel).

Further, the moving object may be a moving object (for example, a ship such as a passenger ship, a cargo ship, or a hovercraft) that moves on the water, or may be a moving object that moves underwater (for example, a submersible ship such as a submersible boat, a submarine, or an unmanned submarine).

Further, the moving object may be a moving object (for example, an aerial vehicle such as an airplane, an airship, or a drone) moving in the atmosphere, or may be a moving object (for example, an artificial celestial body such as an artificial satellite, a spacecraft, a space station, or a space research craft) that moves outside the atmosphere. A moving object moving outside the atmosphere can be rephrased as a space moving object.

Further, the base station device 40 may be a ground base station device (ground station device) installed on the ground. For example, the base station device 40 may be a base station device disposed in a structure on the ground, or may be a base station device installed in a moving object moving on the ground. More specifically, the base station device 40 may be an antenna installed in a structure such as a building and a signal processing device connected to the antenna. Of course, the base station device 40 may be a structure or a moving object itself. "Ground" means not only on land (ground in a narrow sense) but also on the ground in a broad sense including underground, on water, and underwater.

The base station device 40 is not limited to the ground base station devices. The base station device 40 may be a non-ground base station device (non-ground station device)

capable of floating in the air or space. For example, the base station device 40 may be an aircraft station device or a satellite station device.

The aircraft station device is a radio communication device that can float in the atmosphere (including stratosphere) such as an aircraft. The aircraft station device may be a device mounted on an aircraft or the like, or may be an aircraft itself. The concept of the aircraft includes not only the heavy aircraft such as an airplane and a glider, but also the light aircraft such as a balloon and an airship. The concept of the aircraft includes not only the heavy aircraft and the light aircraft, but also the rotary-wing aircraft such as a helicopter and an autogyro. The aircraft station device (or the aircraft on which the aircraft station device is mounted) may be an unmanned aerial vehicle such as a drone.

In addition, the concept of the unmanned aerial vehicle includes unmanned aircraft systems (UAS) and tethered UAS. Also, the concept of the unmanned aerial vehicle includes lighter than air UAS (LTA) and heavier than air UAS (HTA). In addition, the concept of the unmanned aerial vehicle also includes high altitude UAS platforms (HAPs).

The satellite station device is a radio communication device that can float outside the atmosphere. The satellite station device may be a device mounted on a space moving object such as an artificial satellite, or may be a space moving object itself. The satellite that serves as the satellite station device may be any of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on a low earth orbiting satellite, a medium earth orbiting satellite, a geostationary earth orbiting satellite, or a highly elliptical orbiting satellite.

As described above, the base station device 40 may be a relay station device. The relay station device is, for example, an aircraft station or an earth station. The relay station device can be regarded as a type of the above-described relay device. The aircraft station is a radio station installed on the ground or a moving object moving on the ground in order to communicate with an aircraft station device. Furthermore, the earth station is a radio station located on the earth (including air) in order to communicate with the satellite station device. The earth station may be a large earth station or a small earth station such as a very small aperture terminal (VSAT).

Note that the earth station may be a VSAT controlled earth station (also referred to as a master station or a HUB station) or a VSAT earth station (also referred to as a slave station). Furthermore, the earth station may be a radio station installed in a moving object moving on the ground. For example, as an earth station mounted on a ship, there is an earth station on board vessels (ESV). Furthermore, the earth station may include an aircraft earth station that is installed in an aircraft (including a helicopter) and communicates with a satellite station. Furthermore, the earth station may include an aeronautical earth station that is installed in a moving object moving on the ground and communicates with the aircraft earth station via a satellite station. Note that the relay station device may be a portable movable radio station that communicates with a satellite station or an aircraft station.

The size of the coverage of the base station device 40 may be as large as a macro cell or as small as a pico cell. Of course, the size of the coverage of the base station device 40 may be extremely small, such as a femtocell. Further, the base station device 40 may have a beamforming capability.

In this case, the base station device 40 may have cells or service areas formed for each beam.

The base station device 40 can be used, operated, and/or managed by various entities. For example, it can be assumed that examples of the base station device 40 include a mobile network operator (MNO), a mobile virtual network operator (MVNO), a mobile virtual network enabler (MVNE), a neutral host network (NHN) operator, an enterprise, an educational institution (a school corporation, a local government education committee, and the like), a real estate (a building, a condominium, and the like) administrator, an individual, and the like. Of course, the entity of use, operation, and/or management of the base station device 40 is not limited to these.

The base station device 40 may be installed and/or operated by one operator, or may be installed and/or operated by one individual. Of course, the installation/operation entity of the base station device 40 is not limited to these. For example, the base station device 40 may be jointly installed and operated by a plurality of operators or a plurality of individuals. Further, the base station device 40 may be shared facilities used by a plurality of operators or a plurality of individuals. In this case, the installation and/or operation of the facilities may be carried out by a third party different from the user.

The base station device 40 operated by the operator is typically connected to the Internet via a core network. Furthermore, the base station device 40 performs operation management and maintenance by a function called operation, administration & maintenance (OA&M). Note that, in the communication system 2, for example, there may be a network manager that integrally controls the base station device 40 in the network.

In a case where the radio access technology used by the base station device 40 is a cellular communication technology, each of the plurality of base station devices 40 may form a cell. The cell provided by the base station device 40 is referred to as, for example, a serving cell. The serving cell may include a primary cell (pCell) and a secondary cell (sCell). When the dual connectivity is provided for the UE (for example, the terminal device 30), the pCell and the sCell(s) provided by the master node (MN) are referred to as a master cell group. Examples of dual connectivity include EUTRA-EUTRA Dual Connectivity, EUTRA-NR Dual Connectivity (ENDC), EUTRA-NR Dual Connectivity with 5GC, NR-EUTRA Dual Connectivity (NEDC), and NR-NR Dual Connectivity.

Further, the serving cell may include a primary secondary cell or primary SCG cell (PSCell). That is, in a case where dual connectivity is provided for the UE, the PSCell and the sCell(s) provided by the secondary node (SN) are referred to as a secondary cell group (SCG).

One downlink component carrier and one uplink component carrier may be associated with one cell. In addition, the system bandwidth corresponding to one cell may be divided into a plurality of bandwidth parts (BWPs). In this case, one or a plurality of BWPs may be configured for the UE, and one BWP may be used for the UE as an active BWP. In addition, the radio resources (for example, a frequency band, a numerology (subcarrier spacing), slot format (slot configuration)) that can be used by the terminal device 40 may be different for each cell, each component carrier, or each BWP. Moreover, one base station device 40 may provide a plurality of cells.

[Intermediate Device]

The intermediate device 50 is a device that communicates with the communication control device 60 as a proxy (representative) of one or a plurality of communication devices (for example, the base station device 40). For example, the intermediate device 50 is a proxy device (proxy system). The intermediate device 50 is also a type of communication device.

The intermediate device 50 may be a domain proxy (DP) defined in Non Patent Literature 2 or the like. Here, the DP refers to an entity that communicates with a communication control device such as an SAS instead of each of a plurality of CBSDs, or an entity that communicates with a communication control device such as an SAS instead of a network including a plurality of CBSDs. Note that the intermediate device 50 is not limited to the DP defined in Non Patent Literature 2 as long as the intermediate device 50 has a function of communicating with the communication control device 60 as a proxy (representative) of one or a plurality of communication devices. A network manager that integrally controls the base station device 40 in the network may be regarded as the intermediate device 50.

Note that the proxy system may include one device or a plurality of devices. Communication between the intermediate device 50 and the base station device 40 may be wired communication or radio communication. Similarly, communication between the intermediate device 50 and the communication control device 60 may be wired communication or radio communication.

Note that the communication device that the intermediate device 50 substitutes (represents) is not limited to the base station device 40, and may be, for example, the terminal device 30. In the following description, one or a plurality of communication devices (for example, one or a plurality of base station devices 40) that the intermediate device 50 substitutes (represents) may be referred to as subordinate communication devices (for example, the subordinate base station device 40).

[Communication Control Device]

The communication control device 60 is a device that manages the base station device 40. For example, the communication control device 60 is a device that controls radio communication of the base station device 40. For example, the communication control device 60 is a device that determines the communication parameter (also referred to as an operation parameter) to be used by the base station device 40 and gives permission or an instruction to the base station device 40.

At this time, the communication control device 60 may be a network manager that integrally controls radio devices in the network. Taking ETSI EN 303 387 or IEEE 802.19.1-2014 as an example, the communication control device 60 may be a control device such as a spectrum manager/coexistence manager that performs radio wave interference control between radio devices. Furthermore, for example, a registered location secure server (RLSS) defined in IEEE 802.11-2016 can also serve as the communication control device 60. In addition, under the frequency shared environment, a database (database server, device, and system) such as a geo-location database (GLDB) or a spectrum access system (SAS) can also serve as the communication control device 60.

Note that when the communication system 2 is a cellular communication system, the communication control device 60 may be a device constituting a core network. The core network CN is an evolved packet core (EPC) or a 5G core network (5GC). When the core network is the EPC, the communication control device 60 may be, for example, a device having a function as a mobility management entity (MME). Furthermore, in a case where the core network is the 5 GC, the communication control device 60 may be, for example, a device having a function as an access and mobility management function (AMF) or a session management function (SMF). Note that even when the communication system 2 is a cellular communication system, the communication control device 60 is not necessarily a device constituting a core network. For example, the communication control device 60 may be a device that functions as a radio network controller (RNC).

The communication control device 60 may have a gateway function. For example, when the core network is the EPC, the communication control device 60 may be a device having a function as a serving gateway (S-GW) or a packet data network gateway (P-GW). Further, when the core network is a 5GC, the communication control device 60 may be a device having a function as a user plane function (UPF). Furthermore, the communication control device 60 may be an SMF, a PCF, a UDM, or the like. The core network CN may include an SMF, a PCF, a UDM, and the like.

The communication control device 60 does not necessarily have to be a device that constitutes the core network. For example, it is assumed that the core network is a core network of a wideband code division multiple access (W-CDMA) or a code division multiple access 2000 (cdma 2000). At this time, the communication control device 60 may be a device that functions as a radio network controller (RNC).

The communication control device 60 may be connected to each of the plurality of base station devices 40. For example, in the case of the 5GC, an N2 reference point exists between the AMF and the NG-RAN, and the AMF and the NG-RAN are logically connected to each other via an NG interface.

The communication control device 60 manages communication of the base station device 40. For example, the communication control device 60 may manage the position of the terminal device 30 for each terminal device 30 in units of areas (for example, a tracking area and a RAN notification area) including a plurality of cells. Note that the communication control device 60 may manage the terminal device 30 by grasping the information, for each terminal device 30, including which base station device 40 (or which cell) the terminal device 30 is connected to, and in which communication area of the base station device 40 (or of which cell) the terminal device 30 is located.

Basically, the control target of the communication control device 60 is the base station device, but the communication control device 60 may control the terminal device 30 under the control of the base station device 40. Furthermore, the communication control device 60 may control a plurality of secondary systems. In this case, the communication system 2 can be regarded as a system including a plurality of secondary systems.

Figure 5:
FIG. 5 is a diagram illustrating a model in which communication control devices are disposed in a dispersive manner.

Furthermore, a plurality of communication control devices 60 may be present in one communication system 2. FIG. 5 is a diagram illustrating a model in which the communication control devices 60 are disposed in a dispersive manner. In this case, the plurality of communication control devices 60 (in the case of the example of FIG. 5, the communication control device 60$_3$ and the communication control device 60$_4$) exchanges information about the base station devices 40 to be managed with each other, and perform allocation of necessary frequencies and calculation of interference control.

Figure 6:
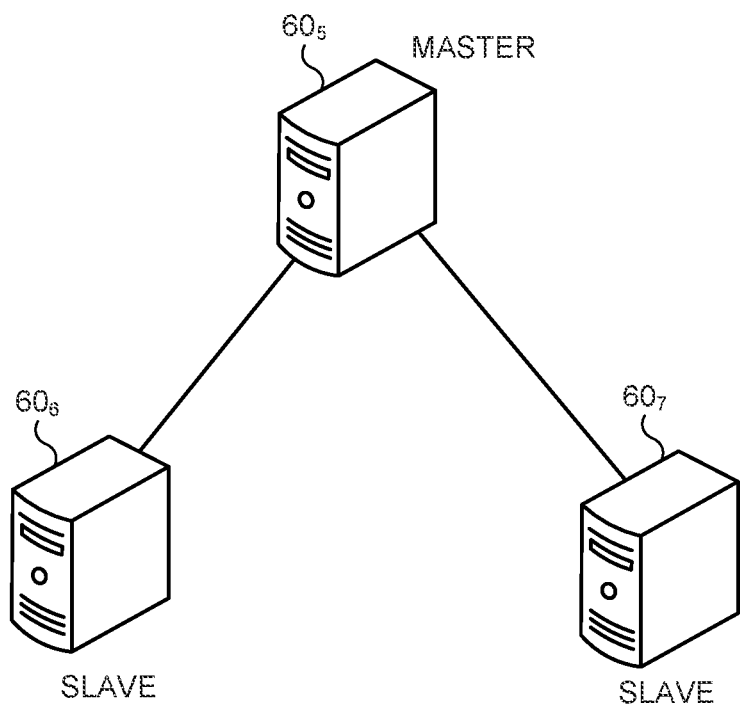
FIG. 6 is a diagram illustrating a model in which one communication control device centrally controls a plurality of communication control devices.

Furthermore, the communication control device 60 may be a master-slave device. FIG. 6 is a diagram illustrating a model (so-called master-slave model) in which one communication control device centrally controls a plurality of communication control devices. In the example of FIG. 6, the communication control device $60_5$ is a master communication control device, and the communication control devices $60_6$ and $60_7$ are slave communication control devices. In such a system, the master communication control device can control the plurality of slave communication control devices to intensively make a decision. In addition, the master communication control device can also perform delegation, discarding, and the like of the decision-making authority on each slave communication control device for the purpose of load dispersion (load balancing) and the like.

Note that the communication control device 60 can also acquire necessary information from entities other than the base station device 40, the terminal device 30, and the intermediate device 50 for its role. Specifically, the communication control device 60 can acquire information necessary for protection, such as position information of the primary system, from a database (regulatory database) managed and operated by a national or regional radio administration agency, for example. An example of the regulatory database includes a universal licensing system (ULS) operated by the United States Federal Communications Commissions. Other examples of information necessary for protection may include, for example, out-of-band emission limit (OOBE), adjacent channel leakage ratio (ACLR), adjacent channel selectivity, fading margin, and/or protection ratio (PR). For these examples, in a case where numerical values are fixedly given by law, it is desirable to use the numerical values.

Furthermore, as another example, it is also conceivable that the communication control device 60 acquires radio wave sensing information from a radio wave sensing system installed and operated for the purpose of radio wave detection in the primary system. As a specific example, the communication control device 60 can acquire radio wave detection information of the primary system from a radio wave sensing system such as an environmental sensing capability (ESC) in the CBRS of the United States. Furthermore, in a case where the communication device or the terminal has a sensing function, the communication control device 60 may acquire radio wave detection information of the primary system from the communication device or the terminal.

[External Device]

Figure 7:
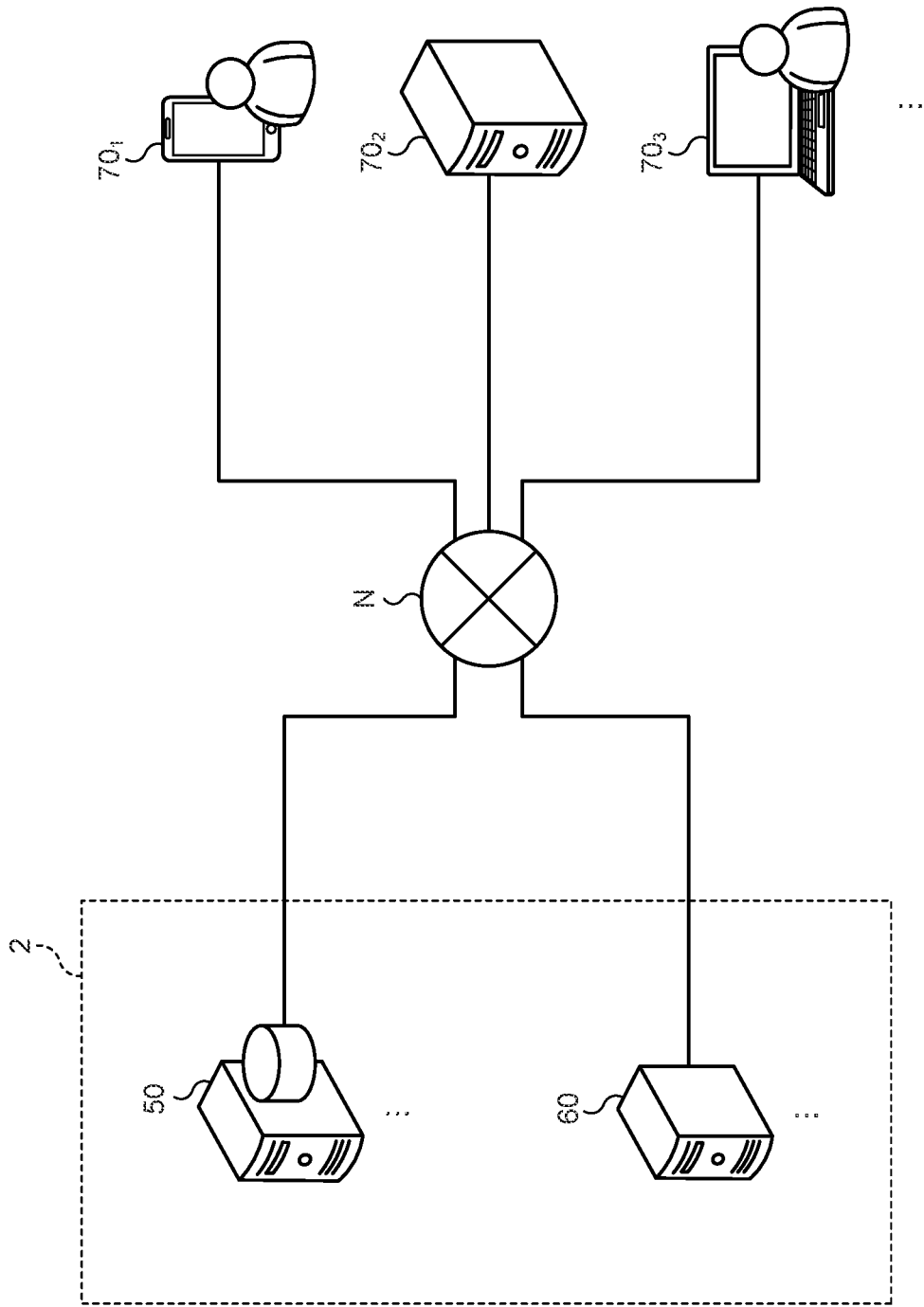
FIG. 7 is a diagram for explaining an external device according to an embodiment of the present disclosure.

FIG. 7 is a diagram for describing an external device according to an embodiment of the present disclosure. An external device 70 is a communication device having a communication function. The external device 70 is typically a communication device such as a smartphone. The external device 70 may be a user terminal such as a mobile phone, a smart device (smartphone or tablet), a wearable terminal, a PDA, or a personal computer, or may be a server device.

The external device 70 functions as an external entity of the communication system 2. The external entity is a logical entity located outside the communication control device 60 (including an accompanying device accompanying the communication control device 60). The accompanying device of the communication control device 60 is a device that performs an operation related to secondary use of a vacant radio wave accompanying the communication control device 60, and corresponds to, for example, the intermediate device 50. When the communication control device 60 is connected to a server device such as a database server, the server device may be regarded as an accompanying device.

In the example of FIG. 7, the external device 701 is a smart device, the external device 702 is a server device, and the external device 703 is a personal computer (notebook PC). The external device 70 is connected to the communication control device 60 and an accompanying device (for example, a database server connected to the communication control device 60, or the like) of the communication control device 60 via a network N. The network N is a communication network such as a local area network (LAN), a wide area network (WAN), a telephone network (mobile phone networks, fixed telephone networks, and the like), a regional internet protocol (IP) network, the Internet, and the like. The network N may be a wired network or a wireless network.

The external device 70 transmits various types of information such as privacy protection information to be described later to the communication control device 60 (or an accompanying device of the communication control device 60).

Hereinafter, a configuration of each device included in the communication system 1000 and an external device will be specifically described.

<2-2. Configuration of Radio Wave Utilization Device>

Figure 8:
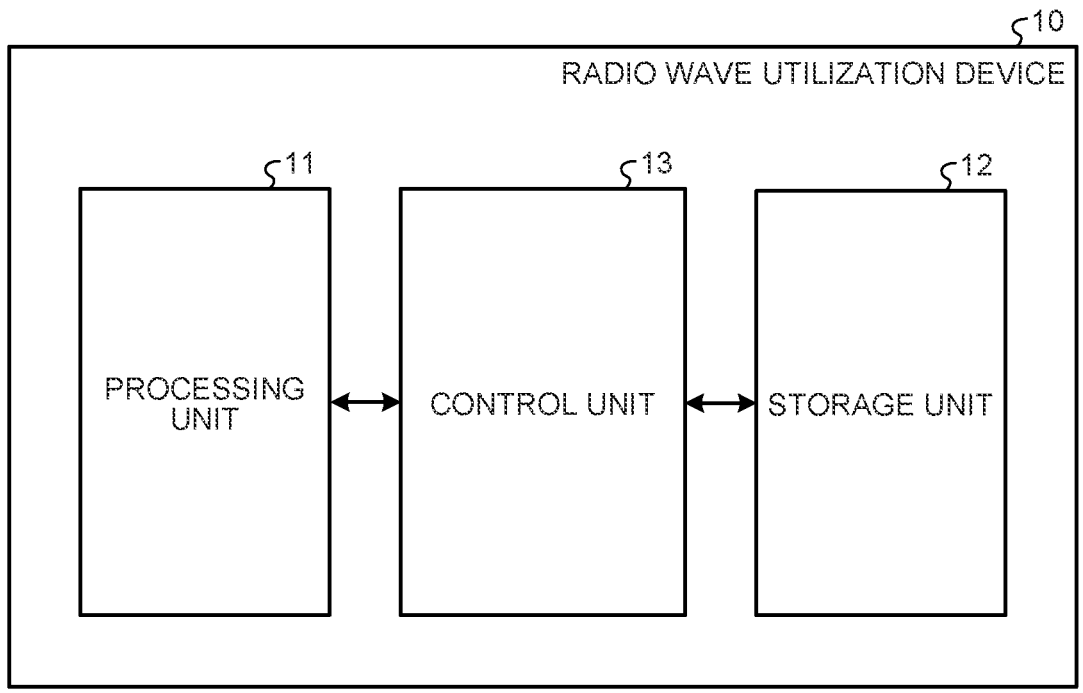
FIG. 8 is a diagram illustrating a configuration example of a radio wave utilization device according to the embodiment of the present disclosure.

First, a configuration of the radio wave utilization device 10 will be described. FIG. 8 is a diagram illustrating a configuration example of the radio wave utilization device 10 according to the embodiment of the present disclosure. The radio wave utilization device 10 primarily uses a predetermined frequency band. For example, the radio wave utilization device 10 is a communication device (radio system) that wirelessly communicates with another radio communication device. In this case, the radio wave utilization device 10 can be regarded as a type of communication device. Note that the radio wave utilization device 10 may be a radio wave emission device or a reflected wave reception device. The radio wave utilization device 10 is a type of information processing device.

The radio wave utilization device 10 includes a processing unit 11, a storage unit 12, and a control unit 13. The configuration illustrated in FIG. 8 is a functional configuration, and the hardware configuration may be different from this. Further, the function of the radio wave utilization device 10 may be dispersed and implemented in a plurality of physically separated configurations.

The processing unit 11 is a processing unit for using the radio wave in a predetermined frequency band. For example, the processing unit 11 is a signal processing unit that performs various processes for outputting and receiving the radio wave in a predetermined frequency band. When the radio wave utilization device 10 is a radio communication device, the processing unit 11 may be a radio communication interface that wirelessly communicates with another communication device. Here, the another communication device include not only a communication device that performs cellular communication or the like but also a transmission device that transmits broadcast waves and a reception device that receives broadcast waves such as television broadcasting.

The storage unit 12 is a data readable/writable storage device such as a dynamic random access memory (DRAM), a static random access memory (SRAM), a flash memory, and a hard disk. The storage unit 12 functions as a storage means for the radio wave utilization device 10.

The control unit 13 is a controller that controls each unit of the radio wave utilization device 10. The control unit 13 is realized, for example, by a processor such as a central processing unit (CPU) or a micro processing unit (MPU). For example, the control unit 13 is realized by the processor executing various programs stored in the storage device inside the radio wave utilization device 10 with a random access memory (RAM) or the like as a work area. The control unit 13 may be realized by an integrated circuit such as an application specific integrated circuit (ASIC) or a field programmable gate array (FPGA). The CPU, the MPU, the ASIC, and the FPGA can all be considered controllers.

Note that the radio wave utilization device 10 may have a function as the management device 20. In this case, the control unit 13 may have each functional block included in the control unit of the management device 20.

<2-3. Configuration of Management Device>

Figure 9:
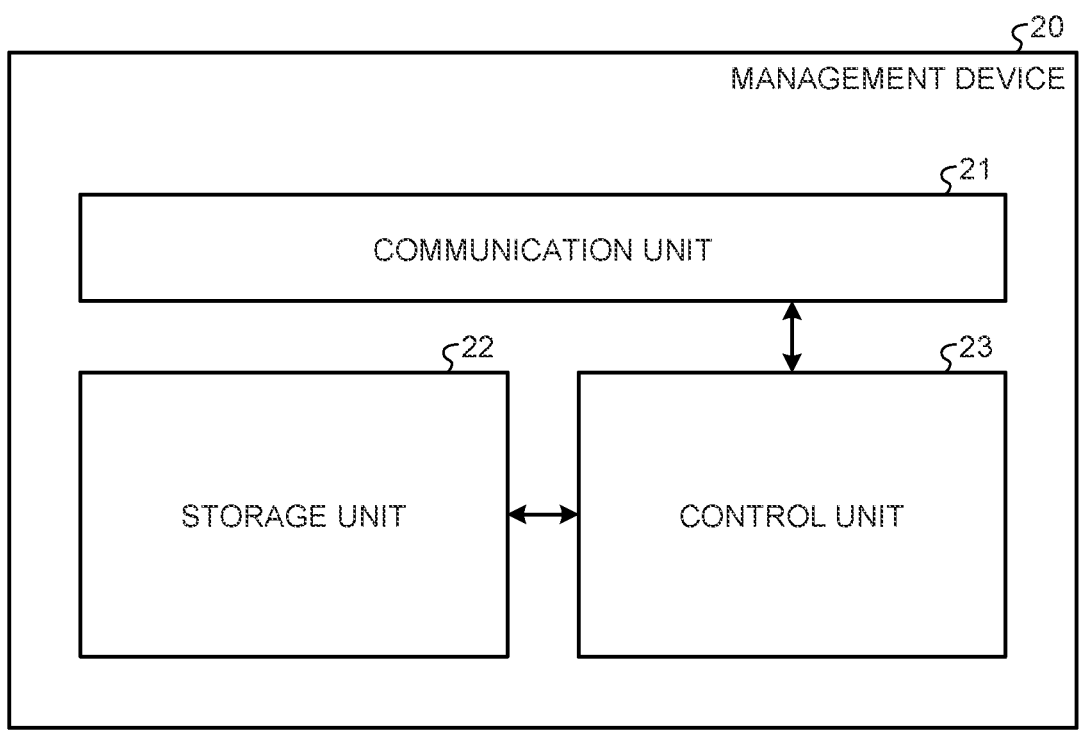
FIG. 9 is a diagram illustrating a configuration example of a management device according to the embodiment of the present disclosure.

Next, the configuration of the management device 20 will be described. FIG. 9 is a diagram illustrating a configuration example of the management device 20 according to the embodiment of the present disclosure. The management device 20 is a device that manages the radio wave utilization device 10. The management device 20 may be a device that manages radio wave output of the radio wave utilization device 10, or may be a device that manages information such as an installation mode and a management entity of the radio wave utilization device 10. The management device 20 is a type of information processing device.

The management device 20 includes a communication unit 21, a storage unit 22, and a control unit 23. The configuration illustrated in FIG. 8 is a functional configuration, and the hardware configuration may be different from this. Further, the function of the management device 20 may be dispersed and implemented in a plurality of physically separated configurations.

The communication unit 21 is a communication interface for communicating with other devices. The communication unit 21 may be a network interface or an equipment connection interface. For example, the communication unit 21 may include a local area network (LAN) interface such as a network interface card (NIC), or may include a USB interface composed of a Universal Serial Bus (USB) host controller, a USB port, and the like. The communication unit 21 may be a wired interface or a wireless interface. The communication unit 21 functions as a communication means of the management device 20. The communication unit 21 communicates with the radio wave utilization device 10 under the control of the control unit 23.

The storage unit 22 is a storage device that can read and write data such as a DRAM, an SRAM, a flash memory, and a hard disk. The storage unit 22 functions as a storage means for the management device 20. The storage unit 22 stores a first identifier and the like. The first identifier will be described later.

The control unit 23 is a controller that controls each unit of the management device 20. The control unit 23 is realized by, for example, a processor such as a CPU or an MPU. For example, the control unit 23 is realized by the processor executing various programs stored in the storage device inside the management device 20 with a RAM or the like as a work area. The control unit 23 may be realized by an integrated circuit such as an ASIC or an FPGA. The CPU, the MPU, the ASIC, and the FPGA can all be considered controllers.

As described above, the radio wave utilization device 10 can be regarded as the management device 20. In this case, the description of the "management device 20" appearing in the following description can be appropriately replaced with the "radio wave utilization device 10".

<2-4. Configuration of Terminal Device>

Figure 10:
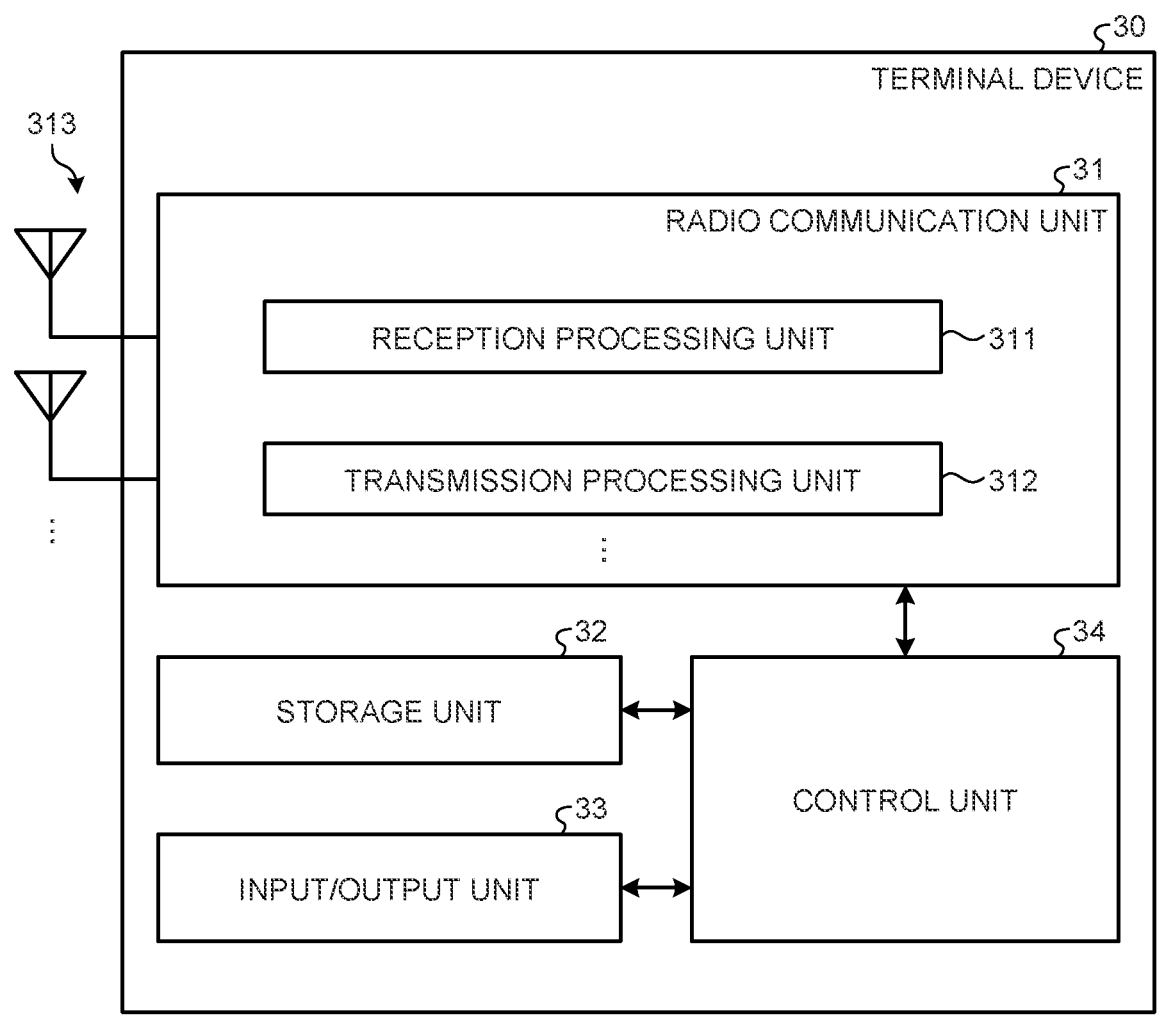
FIG. 10 is a diagram illustrating a configuration example of a terminal device according to the embodiment of the present disclosure.

Next, the configuration of the terminal device 30 will be described. FIG. 10 is a diagram illustrating a configuration example of the terminal device 30 according to the embodiment of the present disclosure. The terminal device 30 is a communication device (radio system) that wirelessly communicates with the base station device 40 and/or the communication control device 60. The terminal device 30 is a type of information processing device.

The terminal device 30 includes a radio communication unit 31, a storage unit 32, an input/output unit 33, and a control unit 34. The configuration illustrated in FIG. 10 is a functional configuration, and the hardware configuration may be different from this. Further, the function of the terminal device 30 may be dispersed and implemented in a plurality of physically separated configurations.

The radio communication unit 31 is a radio communication interface that radio communicates with other communication devices (for example, the base station device 40 and another terminal device 30). The radio communication unit 31 operates under the control of the control unit 34. The radio communication unit 31 corresponds to one or a plurality of radio access methods. For example, the radio communication unit 31 corresponds to both the NR and the LTE. The radio communication unit 31 may correspond to another radio access method such as a W-CDMA and a cdma 2000.

The radio communication unit 31 includes a reception processing unit 311, a transmission processing unit 312, and an antenna 313. The radio communication unit 31 may include a plurality of reception processing units 311, transmission processing units 312, and antennas 313. When the radio communication unit 31 corresponds to a plurality of radio access methods, each unit of the radio communication unit 31 may be individually configured for each radio access method. For example, the reception processing unit 311 and the transmission processing unit 312 may be individually configured by the LTE and the NR. The configurations of the reception processing unit 311 and the transmission processing unit 312 are similar to those of a reception processing unit 411 and a transmission processing unit 412 of the base station device 40.

The storage unit 32 is a storage device that can read and write data such as a DRAM, an SRAM, a flash memory, and a hard disk. The storage unit 32 functions as a storage means for the terminal device 30.

The input/output unit 33 is a user interface for exchanging information with the user. For example, the input/output unit 33 is an operation device for the user to perform various operations such as a keyboard, a mouse, operation keys, and a touch panel. Alternatively, the input/output unit 33 is a display device such as a liquid crystal display or an organic electroluminescence (EL) display. The input/output unit 33 may be an acoustic device such as a speaker or a buzzer. Further, the input/output unit 33 may be a lighting device such as a light emitting diode (LED) lamp. The input/output unit 33 functions as an input/output means (input means, output means, operation means, or notification means) of the terminal device 30.

The control unit 34 is a controller that controls each unit of the terminal device 30. The control unit 34 is realized by, for example, a processor such as a CPU or an MPU. For example, the control unit 34 is realized by the processor executing various programs stored in the storage device inside the terminal device 30 with a RAM or the like as a work area. The control unit 34 may be realized by an integrated circuit such as an ASIC or an FPGA. The CPU, the MPU, the ASIC, and the FPGA can all be considered controllers. Note that the control unit 34 may include each functional block included in the control unit of the base station device 40.

Note that the control unit 34 may have a function similar to that of a control unit of the external device 70 to be described later. For example, the control unit 34 may have functional blocks that perform operations similar to those of the functional blocks (acquisition unit, transmission unit, and the like) constituting the control unit of the external device 70.

<2-5. Configuration of Base Station Device>

Figure 11:
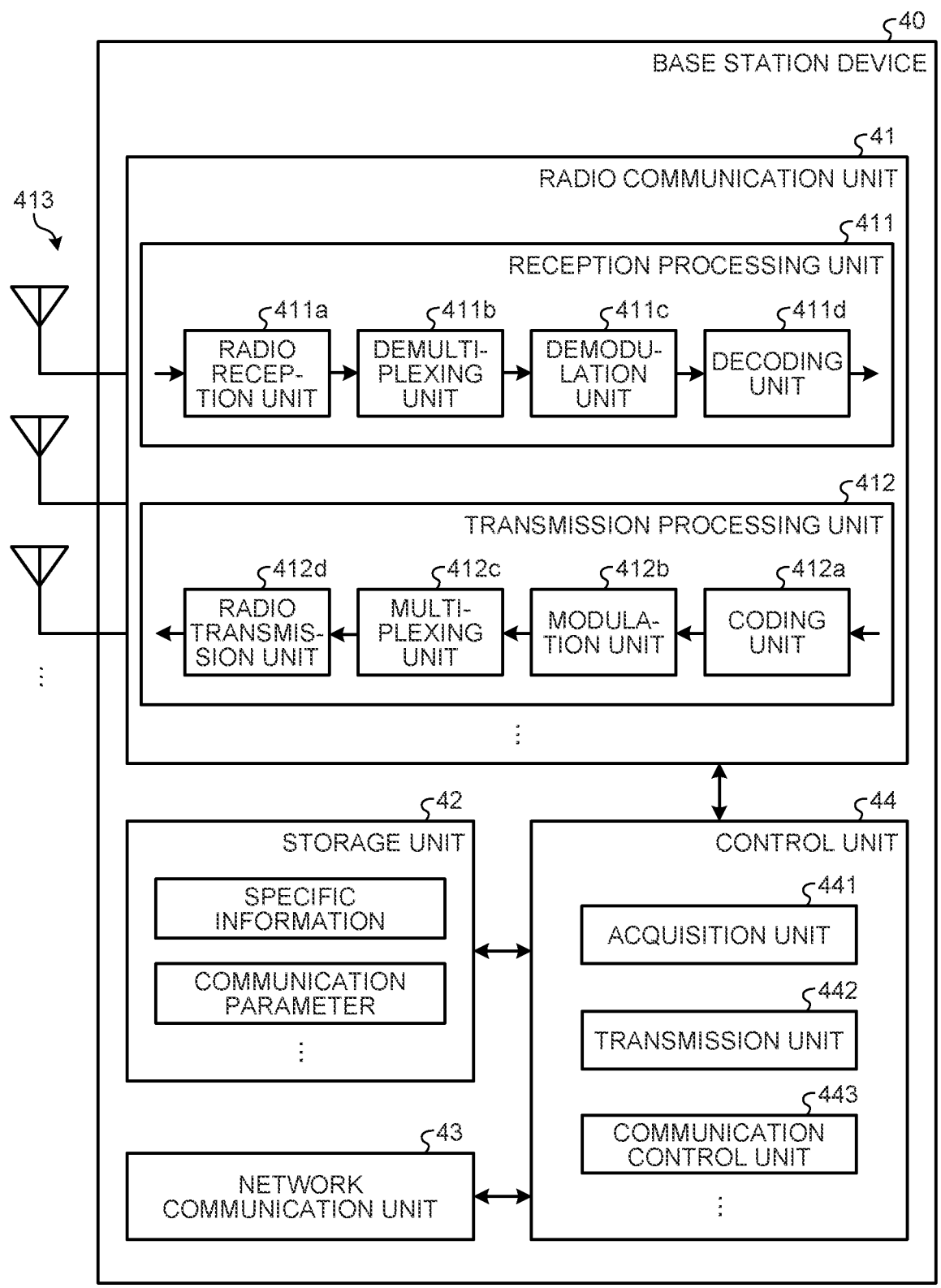
FIG. 11 is a diagram illustrating a configuration example of a base station device according to the embodiment of the present disclosure.

Next, the configuration of the base station device 40 will be described. FIG. 11 is a diagram illustrating a configuration example of the base station device 40 according to the embodiment of the present disclosure. The base station device 40 is a communication device (radio system) that wirelessly communicates with the terminal device 30 under the control of the communication control device 60. The base station device 40 is a type of information processing device.

The base station device 40 includes a radio communication unit 41, a storage unit 42, a network communication unit 43, and a control unit 44. The configuration illustrated in FIG. 11 is a functional configuration, and the hardware configuration may be different from this. Further, the function of the base station device 40 may be dispersed and implemented in a plurality of physically separated devices.

The radio communication unit 41 is a radio communication interface that wirelessly communicates with other communication devices (for example, the terminal device 30, the communication control device 60, the intermediate device 50, and another base station device 40). The radio communication unit 41 operates under the control of the control unit 44. The radio communication unit 41 may correspond to a plurality of radio access methods. For example, the radio communication unit 41 may correspond to both the NR and the LTE. The radio communication unit 41 may correspond to another cellular communication method such as the W-CDMA or the cdma 2000. Furthermore, the radio communication unit 41 may correspond to a radio LAN communication method in addition to the cellular communication method. Of course, the radio communication unit 41 may correspond to only one radio access method.

The radio communication unit 41 includes a reception processing unit 411, a transmission processing unit 412, and an antenna 413. The radio communication unit 41 may include a plurality of reception processing units 411, transmission processing units 412, and antennas 413. When the radio communication unit 41 corresponds to a plurality of radio access methods, each unit of the radio communication unit 41 may be individually configured for each radio access method. For example, when the base station device 40 corresponds to the NR and the LTE, the reception processing unit 411 and the transmission processing unit 412 may be configured separately by the NR and the LTE.

The reception processing unit 411 performs processing of the uplink signal received via the antenna 413. The reception processing unit 411 includes a radio reception unit 411*a*, a demultiplexing unit 411*b*, a demodulation unit 411*c*, and a decoding unit 411*d*.

The radio reception unit 411*a* performs, on the uplink signal, down-conversion, removal of unnecessary frequency components, control of amplification level, orthogonal demodulation, conversion to digital signals, removal of guard intervals, extraction of frequency domain signals by fast Fourier transform, and the like. For example, it is assumed that the radio access technology of the base station device 40 is a cellular communication method such as the LTE. At this time, the demultiplexing unit 411*b* separates, from the signal output from the radio reception unit 411*a*, uplink channels such as a physical uplink shared channel (PUSCH) and a physical uplink control channel (PUCCH) and uplink reference signals. The demodulation unit 411*c* demodulates the reception signal using a modulation method such as binary phase shift keying (BPSK) or quadrature phase shift keying (QPSK) for the modulation symbol of the uplink channel. The modulation method used by the demodulation unit 411*c* may be a multivalued QAM such as a 16 quadrature amplitude modulation (QAM), a 64 QAM, or a 256 QAM. The decoding unit 411*d* performs decoding process on the coded bits of the demodulated uplink channel. The decoded uplink data and uplink control information are output to the control unit 44.

The transmission processing unit 412 performs transmission process of downlink control information and downlink data. The transmission processing unit 412 includes a coding unit 412*a*, a modulation unit 412*b*, a multiplexing unit 412*c*, and a radio transmission unit 412*d*.

The coding unit 412*a* encodes the downlink control information and the downlink data input from the control unit 44 by using a coding method such as block coding, convolutional coding, or turbo coding. The modulation unit 412*b* modulates the coded bits output from the coding unit 412*a* by a predetermined modulation method such as the BPSK, the QPSK, the 16 QAM, the 64 QAM, the 256 QAM, or the like. The multiplexing unit 412*c* multiplexes the modulation symbol of each channel and the downlink reference signal and arranges them in a predetermined resource element. The radio transmission unit 412*d* performs various signal processing on the signal from the multiplexing unit 412*c*. For example, the radio transmission unit 412*d* performs processing such as conversion to the time domain by fast Fourier transform, addition of a guard interval, generation of a baseband digital signal, conversion to an analog signal, quadrature modulation, upconversion, removal of extra frequency components, and power amplification. The signal generated by the transmission processing unit 412 is transmitted from the antenna 413.

The storage unit 42 is a storage device that can read and write data such as a DRAM, an SRAM, a flash memory, and a hard disk. The storage unit 42 functions as a storage means for the base station device 40. The storage unit 42 stores desired transmission power information, an operation parameter, holding resource information, and the like.

The desired transmission power information is information about transmission power that the base station device 40 requires the communication control device 60 to transmit as information about transmission power necessary for transmission of the radio wave.

The operation parameter is information (for example, the setting information) related to the radio wave transmission operation of the base station device 40. For example, the operation parameter is information about the maximum value (maximum allowable transmission power) of the transmission power allowed for the base station device 40. Of course, the operation parameter is not limited to the information about the maximum allowable transmission power.

In addition, the holding resource information is information about holding of the radio resources of the base station device 40. For example, the holding resource information is information about the radio resources that can be currently used by the base station device 40. For example, the holding resource information is information about the holding amount of the interference margin allocated by the communication control device 60 to the base station device 40. The information about the holding amount may be information about a resource block unit to be described later. That is, the holding resource information may be information (for example, the resource block holding amount) related to a resource block held by the base station device 40.

The network communication unit 43 is a communication interface for communicating with other devices (for example, the communication control device 60, the intermediate device 50, and another base station device 40). For example, the network communication unit 43 is a local area network (LAN) interface such as a network interface card (NIC). The network communication unit 43 may be a Universal Serial Bus (USB) interface including a USB host controller, a USB port, and the like. Further, the network communication unit 43 may be a wired interface or a wireless interface. The network communication unit 43 functions as a network communication means of the base station device 40. The network communication unit 43 communicates with other devices under the control of the control unit 44.

The control unit 44 is a controller that controls each unit of the base station device 40. The control unit 44 is realized, for example, by a processor such as a central processing unit (CPU) or a micro processing unit (MPU). For example, the control unit 44 is realized by the processor executing various programs stored in the storage device inside the base station device 40 with a random access memory (RAM) or the like as a work area. The control unit 44 may be realized by an integrated circuit such as an application specific integrated circuit (ASIC) or a field programmable gate array (FPGA). The CPU, the MPU, the ASIC, and the FPGA can all be considered controllers.

As illustrated in FIG. 11, the control unit 44 includes an acquisition unit 441, a transmission unit 442, and a communication control unit 443. Each block (the acquisition unit 441 to the communication control unit 443) constituting the control unit 44 is a functional block indicating the function of the control unit 44. These functional blocks may be software blocks or hardware blocks. For example, each of the above functional blocks may be one software module realized by software (including a microprogram), or may be one circuit block on a semiconductor chip (die). Of course, each functional block may be one processor or one integrated circuit. The method of configuring the functional block is arbitrary. The control unit 44 may be configured in a functional unit different from the above-mentioned functional block.

As described above, the control unit 34 of the terminal device 30 may have each functional block included in the control unit 44 of the base station device 40. In this case, the description of the "base station device 40" appearing in the following description can be appropriately replaced with the "terminal device 30". In addition, the description of a "control unit 44", an "acquisition unit 441", a "transmission unit 442", and a "communication control unit 443" that appear in the following description can be replaced with the "control unit 13" as appropriate.

<2-6. Configuration of Intermediate Device>

Figure 12:
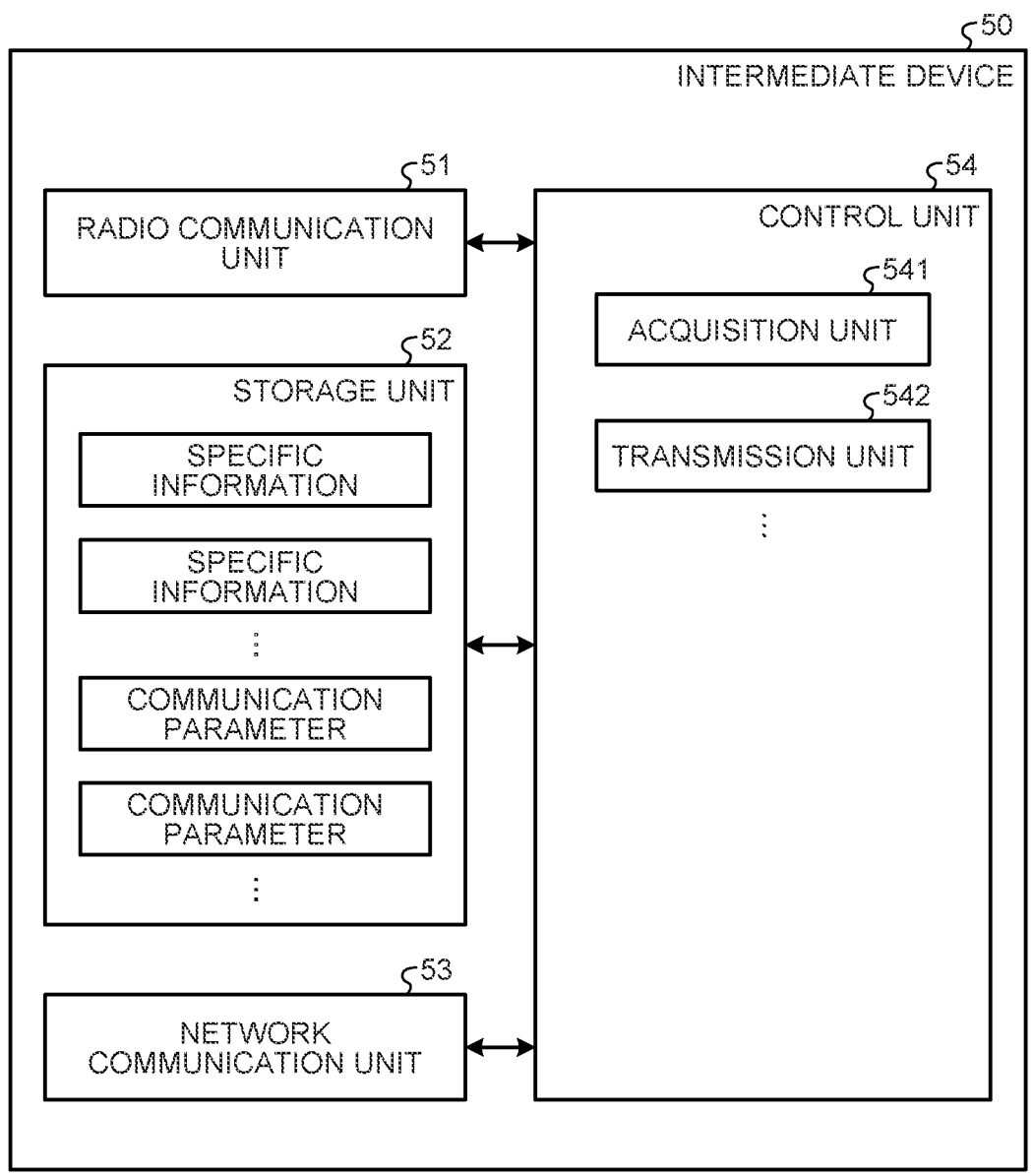
FIG. 12 is a diagram illustrating a configuration example of a proxy device according to the embodiment of the present disclosure.

Next, the intermediate device 50 will be described. FIG. 12 is a diagram illustrating a configuration example of the intermediate device 50 according to the embodiment of the present disclosure. The intermediate device 50 is a communication device that communicates with the base station device 40 and the communication control device 60. The intermediate device 50 is a type of information processing device.

The intermediate device 50 includes a radio communication unit 51, a storage unit 52, a network communication unit 53, and a control unit 54. The configuration illustrated in FIG. 12 is a functional configuration, and the hardware configuration may be different from this. Further, the function of the intermediate device 50 may be dispersed and implemented in a plurality of physically separated configurations.

The radio communication unit 51 is a radio communication interface that wirelessly communicates with other communication devices (for example, the base station device 40, the terminal device 30, the communication control device 60, and another intermediate device 50). The radio communication unit 51 operates under the control of the control unit 54. The radio communication unit 51 corresponds to one or a plurality of radio access methods. For example, the radio communication unit 51 corresponds to both the NR and the LTE. The radio communication unit 51 may correspond to other radio access methods such as a W-CDMA and a cdma 2000. The configuration of the radio communication unit 51 is similar to that of the radio communication unit 41 of the base station device 40.

The storage unit 52 is a storage device that can read and write data such as a DRAM, an SRAM, a flash memory, and a hard disk. The storage unit 52 functions as a storage means for the intermediate device 50. The storage unit 52 may store desired transmission power information, an operation parameter, holding resource information, and the like of each of the subordinate base station devices 40.

The network communication unit 53 is a communication interface for communicating with other devices (for example, the base station device 40, the communication control device 60, the external device 70, and another intermediate device 50). For example, the network communication unit 53 is a LAN interface such as an NIC. The network communication unit 53 may be a USB interface including a USB host controller, a USB port, and the like. Further, the network communication unit 53 may be a wired interface or a wireless interface. The network communication unit 53 functions as a network communication means of the intermediate device 50. The network communication unit 53 communicates with other devices under the control of the control unit 54.

The control unit 54 is a controller that controls each unit of the intermediate device 50. The control unit 54 is realized by, for example, a processor such as a CPU or an MPU. For example, the control unit 54 is realized by the processor executing various programs stored in the storage device inside the intermediate device 50 with a RAM or the like as a work area. The control unit 54 may be realized by an integrated circuit such as an ASIC or an FPGA. The CPU, the MPU, the ASIC, and the FPGA can all be considered controllers.

As illustrated in FIG. 12, the control unit 54 includes an acquisition unit 541 and a transmission unit 542. Each block (the acquisition unit 541 to the transmission unit 542) constituting the control unit 54 is a functional block indicating the function of the control unit 54. These functional blocks may be software blocks or hardware blocks. For example, each of the above functional blocks may be one software module realized by software (including a microprogram), or may be one circuit block on a semiconductor chip (die). Of course, each functional block may be one processor or one integrated circuit. The method of configuring the functional block is arbitrary. The control unit 54 may be configured in a functional unit different from the above-mentioned functional block. The operation of each block constituting the control unit 54 will be described later.

The operation of each block (the acquisition unit 541 to the transmission unit 542) constituting the control unit 54 may be the same as the operation of each block (the acquisition unit 441 to the transmission unit 442) constituting the control unit 44 of the base station device 40. In this case, the description of the "intermediate device 50" appearing in the following description can be appropriately replaced with a "base station device 40". Similarly, the description of the "control unit 54", the "acquisition unit 541", and the "transmission unit 542" appearing in the following description can be appropriately replaced with the "control unit 44", the "acquisition unit 441", and the "transmission unit 442".

<2-7. Configuration of Communication Control Device>

The communication control device 60 is a device that controls radio communication of the base station device 40. The communication control device 60 may control radio communication of the terminal device 30 via the base station device 40 or directly. The communication control device 60 is a type of information processing device.

Figure 13:
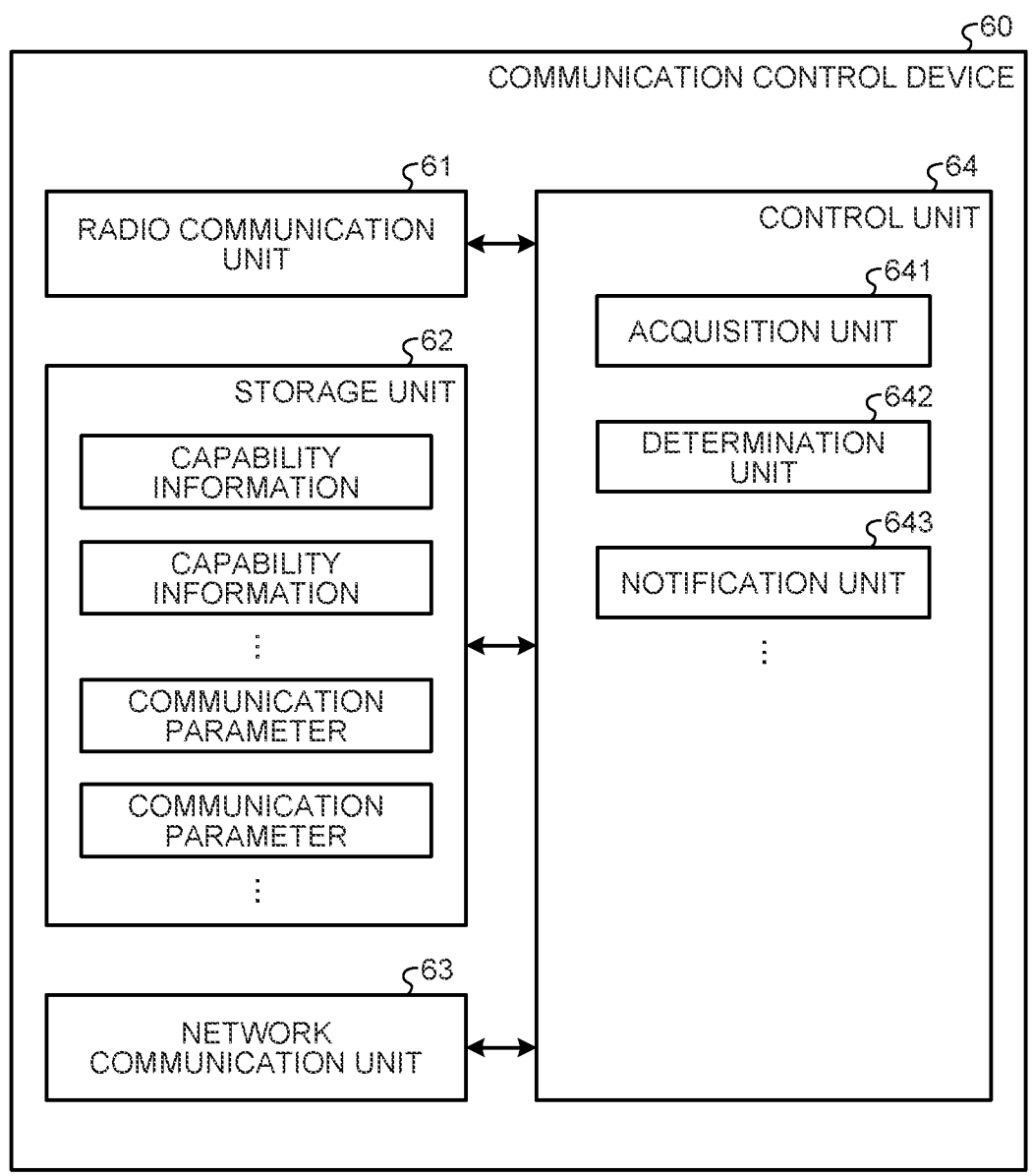
FIG. 13 is a diagram illustrating a configuration example of a communication control device according to the embodiment of the present disclosure.

FIG. 13 is a diagram illustrating a configuration example of the communication control device 60 according to the embodiment of the present disclosure. The communication control device 60 includes a radio communication unit 61, a storage unit 62, a network communication unit 63, and a control unit 64. The configuration illustrated in FIG. 13 is a functional configuration, and the hardware configuration may be different from this. Further, the function of the communication control device 60 may be dispersed and implemented in a plurality of physically separated configurations. For example, the communication control device 60 may be composed of a plurality of server devices.

The radio communication unit 61 is a radio communication interface that wirelessly communicates with other communication devices (for example, the base station device 40, the terminal device 30, the intermediate device 50, and another communication control device 60). The radio communication unit 61 operates under the control of the control unit 64. The radio communication unit 61 corresponds to one or a plurality of radio access methods. For example, the radio communication unit 61 corresponds to both the NR and the LTE. The radio communication unit 61 may correspond to other radio access methods such as a W-CDMA and a cdma 2000. The configuration of the radio communication unit 61 is similar to that of the radio communication unit 41 of the base station device 40.

The storage unit 62 is a storage device that can read and write data such as a DRAM, an SRAM, a flash memory, and a hard disk. The storage unit 62 functions as a storage means for the base station device 40. The storage unit 62 stores the operation parameter of each of the plurality of base station devices 40 constituting the communication system 2. Note that the storage unit 62 may store the holding resource information of each of the plurality of base station devices 40 constituting the communication system 2. As described above, the holding resource information is information about holding of the radio resources of the base station device 40.

The network communication unit 63 is a communication interface for communicating with other devices (for example, the base station device 40, the intermediate device 50, the external device 70, and another communication control device 60). The network communication unit 63 may be a network interface or an equipment connection interface. For example, the network communication unit 63 may be a local area network (LAN) interface such as a network interface card (NIC). Furthermore, the network communication unit 63 may be a Universal Serial Bus (USB) interface including a USB host controller, a USB port, and the like. Further, the network communication unit 63 may be a wired interface or a wireless interface. The network communication unit 63 functions as a communication means of the communication control device 60. The network communication unit 63 communicates with the base station device 40, the terminal device 30, and the intermediate device 50 under the control of the control unit 64.

The control unit 64 is a controller that controls each unit of the communication control device 60. The control unit 64 is realized by, for example, a processor such as a CPU or an MPU. For example, the control unit 64 is realized by the processor executing various programs stored in the storage device inside the communication control device 60 with a RAM or the like as a work area. The control unit 64 may be realized by an integrated circuit such as an ASIC or an FPGA. The CPU, the MPU, the ASIC, and the FPGA can all be considered controllers.

As illustrated in FIG. 13, the control unit 64 includes an acquisition unit 641, a determination unit 642, and a notification unit 643. Each block (the acquisition unit 641 to the notification unit 643) constituting the control unit 64 is a functional block indicating the function of the control unit 64. These functional blocks may be software blocks or hardware blocks. For example, each of the above functional blocks may be one software module realized by software (including a microprogram), or may be one circuit block on a semiconductor chip (die). Of course, each functional block may be one processor or one integrated circuit. The method of configuring the functional block is arbitrary. The control unit 64 may be configured in a functional unit different from the above-mentioned functional block. The operation of each block constituting the control unit 64 will be described later.

Figure 14:
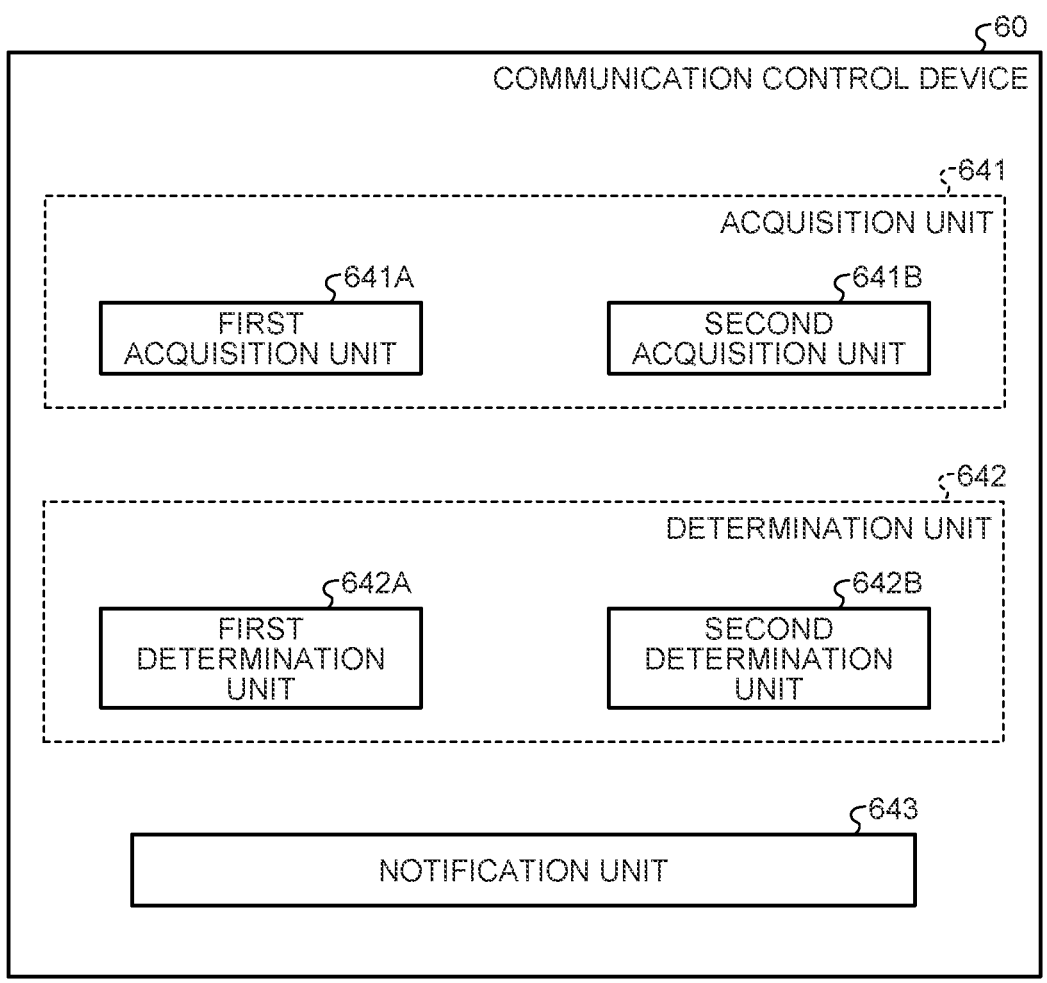
FIG. 14 is a diagram illustrating an example of a functional configuration of a communication control device.

Note that the configuration of the communication control device 60 is not limited to the above-described configuration. For example, one functional block included in the communication control device 60 may be regarded as a plurality of functional blocks. The plurality of functional blocks included in the communication control device 60 may be regarded as one functional block. FIG. 14 is a diagram illustrating an example of a functional configuration of the communication control device 60. For example, the acquisition unit 641 may include a first acquisition unit 641A and a second acquisition unit 641B. Furthermore, the determination unit 642 may include a first determination unit 642A and a second determination unit 642B. The configuration of the functional blocks of the communication control device 60 is arbitrary.

<2-8. Configuration of External Device>

Figure 15:
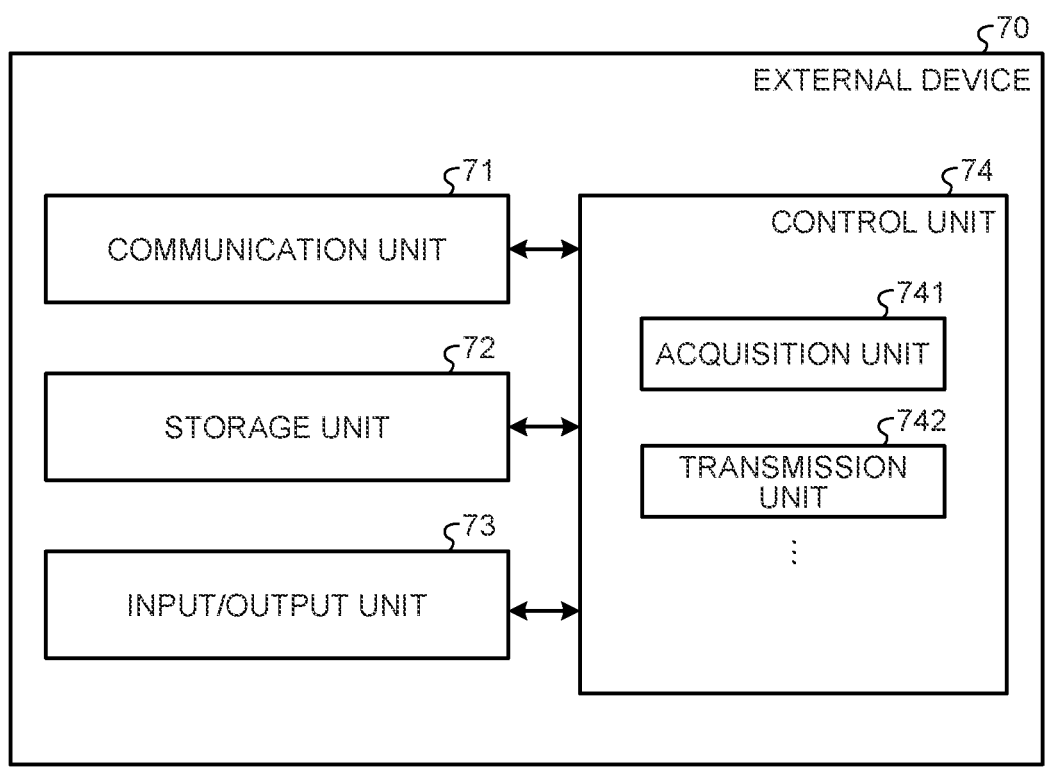
FIG. 15 is a diagram illustrating a configuration example of an external device according to the embodiment of the present disclosure.

Next, the external device 70 will be described. FIG. 15 is a diagram illustrating a configuration example of the external device 70 according to the embodiment of the present disclosure. The external device 70 is a communication device that wirelessly communicates with the communication control device 60 and the like. In the present embodiment, the concept of the communication device (or radio communication device) includes not only the base station device and the proxy device but also an external device.

Note that the configuration of the external device 70 may be similar to that of the terminal device 30. The terminal device 30 can be regarded as the external device 70. The external device 70 is not limited to a user terminal such as a smart device or a personal computer, and may be, for example, a server device. When the server device has a function (for example, a function of outputting information to a display device via a communication line) of receiving secondary information from another device (the communication control device 60 or the like) and presenting the secondary information to the user, the server device is also a type of external device. The external device can be rephrased as an "information processing terminal device", a "processing device", an "information processing device", or the like.

The external device 70 includes a communication unit 71, a storage unit 72, an input/output unit 73, and a control unit 74. The configuration illustrated in FIG. 15 is a functional configuration, and the hardware configuration may be different from this. Further, the function of the external device 70 may be dispersed and implemented in a plurality of physically separated configurations.

The communication unit 71 is a radio communication interface that wirelessly communicates with other communication devices (for example, the terminal device 30, the base station device 40, the intermediate device 50, the communication control device 60, and another external device 70). The communication unit 71 operates under the control of the control unit 74. The configuration of the communication unit 71 may be similar to that of the radio communication unit 41 and/or the network communication unit 43 of the base station device 40.

The storage unit 72 is a storage device that can read and write data such as a DRAM, an SRAM, a flash memory, and a hard disk. The storage unit 72 functions as a storage means for the external device 70.

The input/output unit 73 is a user interface for exchanging information with the user. For example, the input/output unit 73 is an operation device for the user to perform various operations such as a keyboard, a mouse, operation keys, and a touch panel. Alternatively, the input/output unit 73 is a display device such as a liquid crystal display or an organic electroluminescence (EL) display. The input/output unit 73 may be an acoustic device such as a speaker or a buzzer. Further, the input/output unit 73 may be a lighting device such as a light emitting diode (LED) lamp. The input/output unit 73 functions as an input/output means (input means, output means, operation means, or notification means) of the external device 70.

The control unit 74 is a controller that controls each unit of the external device 70. The control unit 74 is realized by, for example, a processor such as a CPU or an MPU. For example, the control unit 74 is realized by the processor executing various programs stored in the storage device inside the external device 70 with a RAM or the like as a work area. The control unit 74 may be realized by an integrated circuit such as an ASIC or an FPGA. The CPU, the MPU, the ASIC, and the FPGA can all be considered controllers.

As illustrated in FIG. 15, the control unit 74 includes an acquisition unit 741 and a transmission unit 742. Each block (the acquisition unit 741 to the transmission unit 742) constituting the control unit 74 is a functional block indicating the function of the control unit 74. These functional blocks may be software blocks or hardware blocks. For example, each of the above functional blocks may be one software module realized by software (including a microprogram), or may be one circuit block on a semiconductor chip (die). Of course, each functional block may be one processor or one integrated circuit. The method of configuring the functional block is arbitrary. The control unit 74 may be configured in a functional unit different from the above-mentioned functional block.

3. Interference Model

Figure 16:
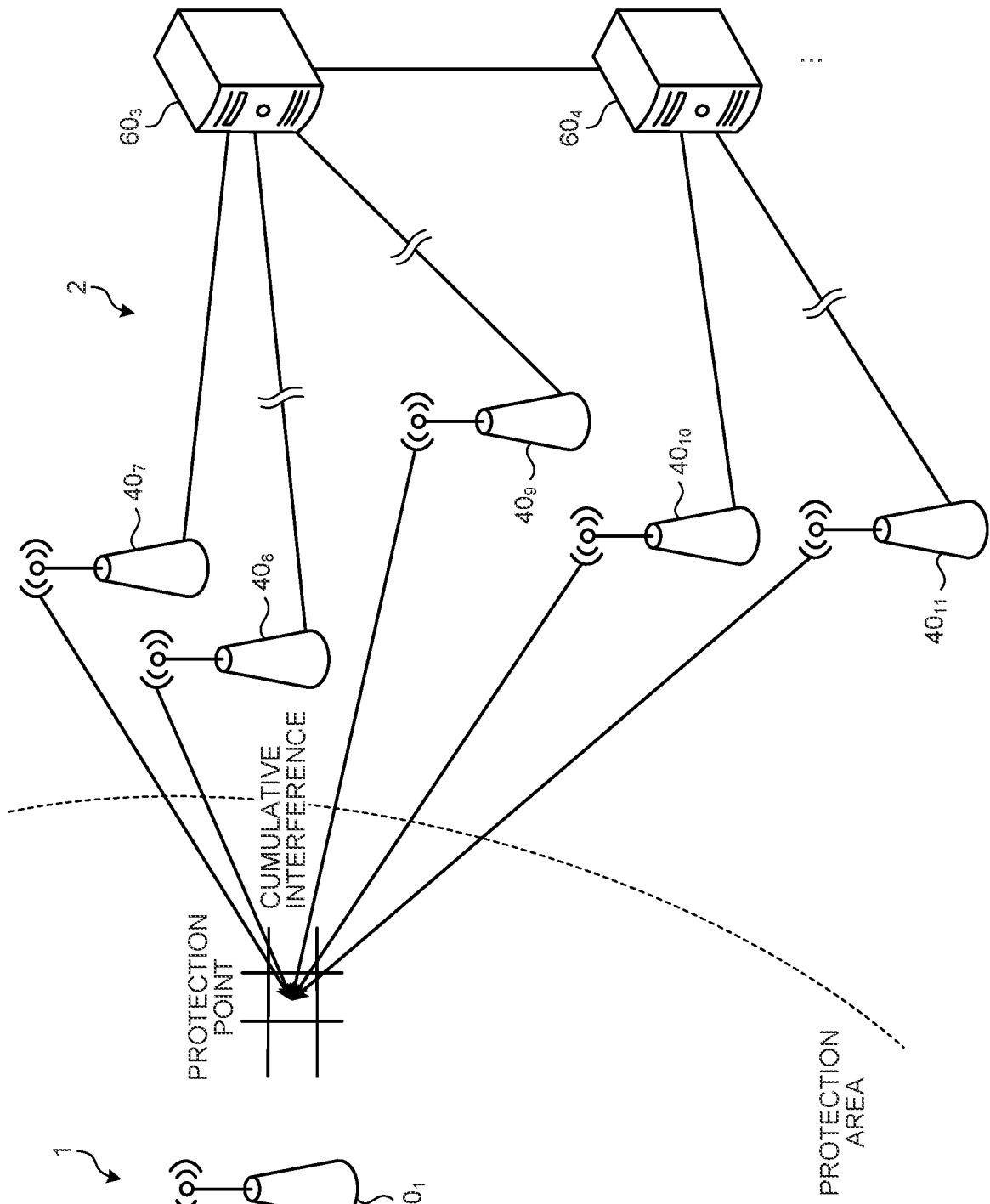
FIG. 16 is an explanatory diagram illustrating an example of an interference model assumed in an embodiment of the present disclosure.

Next, an interference model assumed in the present embodiment will be described. FIG. 16 is an explanatory diagram illustrating an example of an interference model assumed in an embodiment of the present disclosure. Note that the description of the base station device 40 appearing in the following description can be replaced with a word indicating another communication device having a radio communication function.

The interference model illustrated in FIG. 16 is applied, for example, in a case where the primary system has a service area. In the example of FIG. 16, the communication system 1 (primary system) is a radio communication system having a service area. This service area is, for example, a protection area of the communication system 1. A plurality of interference calculation reference points (hereinafter, the point is referred to as an interference calculation point or a protection point) is set in the protection area. The protection point is set by, for example, an operator of the communication system 1 or a public institution that manages the radio wave (hereinafter, referred to as an administrator). For example, the administrator may divide the protection area into a lattice shape and set the center of a predetermined lattice as the protection point. A method of determining the protection point is arbitrary.

The protection point may be set not only in the horizontal direction but also in the vertical direction. That is, the protection point may be disposed three-dimensionally. In the following description, a protection point (that is, the protection point is not a protection point under the assumption of a horizontal plane but a protection point under the assumption of a three-dimensional space) three-dimensionally disposed may be referred to as a spatial protection point.

The interference margin of each protection point is set by an administrator or the like. FIG. 16 illustrates interference given to the protection point by a plurality of base station devices 40 constituting the communication system 2 (secondary system). The communication control device 60 of the communication system 2 controls the transmission power of the plurality of base station devices 40 so that the cumulative interference at each protection point does not exceed the set interference margin.

Figure 17:
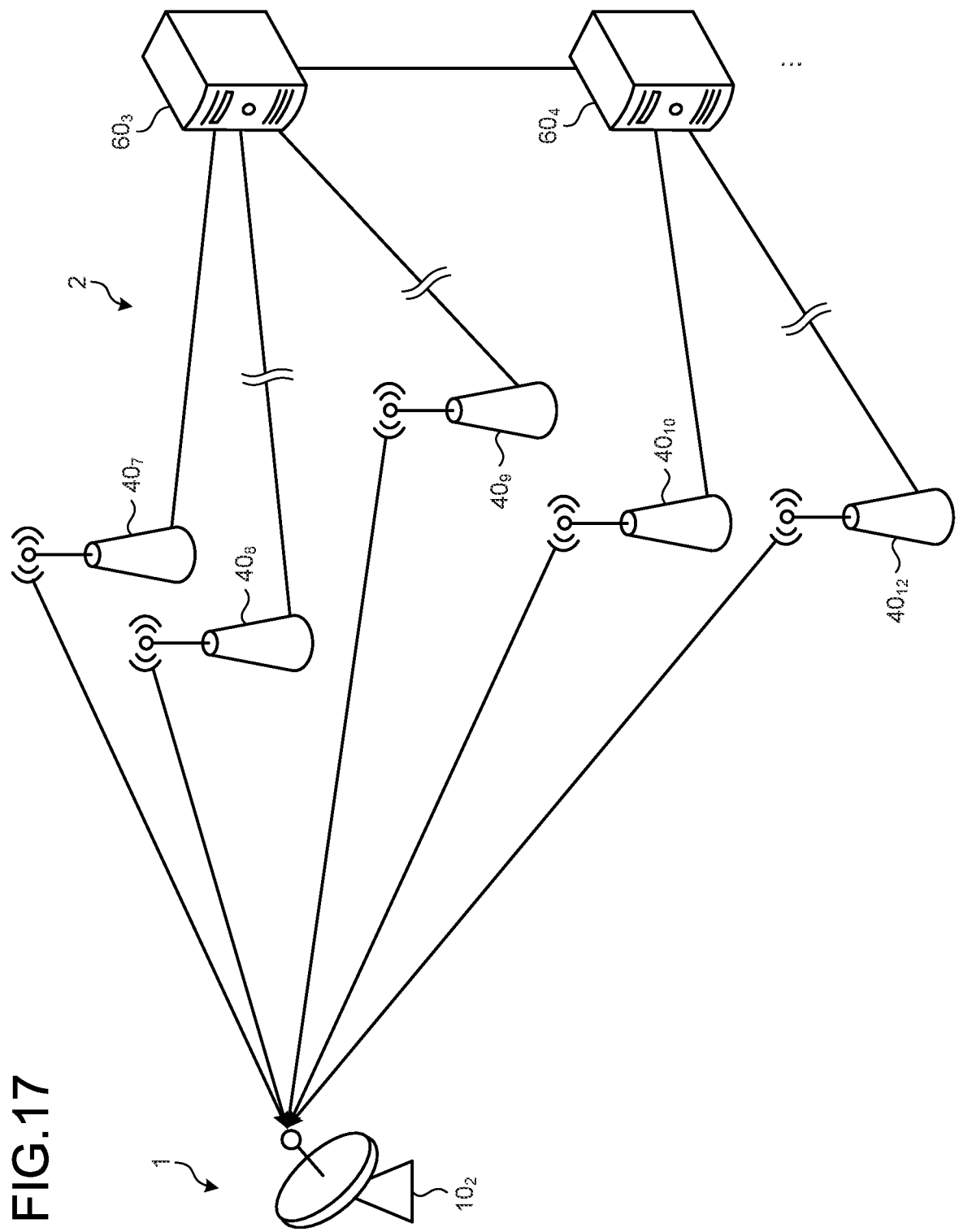
FIG. 17 is an explanatory diagram illustrating another example of an interference model assumed in the embodiment of the present disclosure.

FIG. 17 is an explanatory diagram illustrating another example of the interference model assumed in the embodiment of the present disclosure. The interference model illustrated in FIG. 17 is applied, for example, in a case where the primary system performs only reception. In the example of FIG. 17, the communication system 1 (primary system) includes a reception antenna as a radio wave utilization device 102. The radio wave utilization device 102 is, for example, a reception antenna of a satellite ground station. The communication control device 60 of the communication system 2 sets the position of the reception antenna as a protection point, and controls the transmission power of the plurality of base station devices 40 so that the cumulative interference at the point does not exceed the interference margin.

4. Primary System Protection Method

Next, a primary system protection method will be described. As described above, the primary system protection method can be classified into, for example, the following two types.

(1) Interference margin simultaneous allocation type
(2) Interference margin iterative allocation type Note that, an example of the interference margin simultaneous allocation type primary system protection method includes a method disclosed in Non Patent Literature 3 (for example, a calculation method of the maximum allowable EIRP), for example. In addition, an example of the interference margin iterative allocation type primary system protection method includes an iterative allocation process (IAP) disclosed in Non Patent Literature 6, for example.

Hereinafter, the "interference margin simultaneous allocation type" primary system protection method and the "interference margin iterative allocation type" primary system protection method will be described. Note that the description of the base station device 40 appearing in the following description can be replaced with a word indicating another communication device having a radio communication function.

<4-1. Interference Margin Simultaneous Allocation Type>

Figure 18:
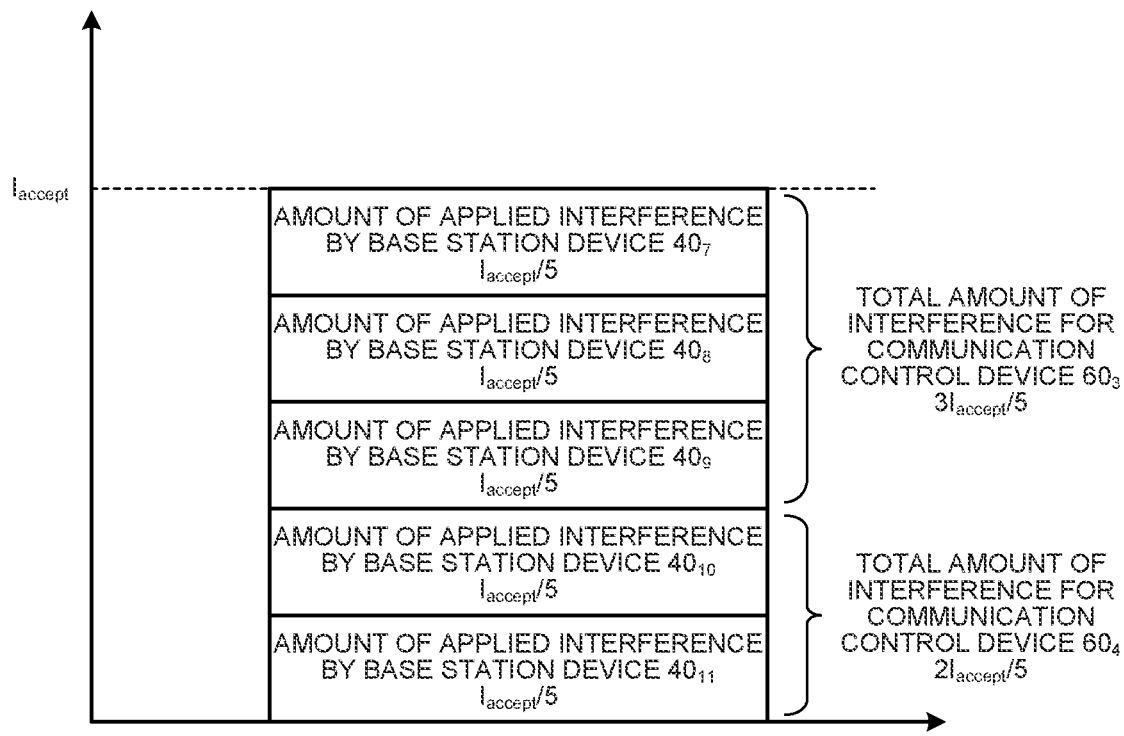
FIG. 18 is an explanatory diagram for explaining an interference margin simultaneous allocation type primary system protection method.

First, an interference margin simultaneous allocation type primary system protection method will be described. FIG. 18 is an explanatory diagram for describing the interference margin simultaneous allocation type primary system protection method. As described above, in the interference margin simultaneous allocation type, the communication control device 60 calculates the maximum allowable transmission power of the secondary system using "a value uniquely obtained by positional relationship between the protection reference point of primary system and secondary system" as a reference value. In the example of FIG. 18, the allowable interference threshold value of the primary system is $I_{accept}$. This threshold value may be an actual threshold value, or may be a value set in consideration of a certain margin (for example, a protection ratio) from the actual threshold value in consideration of a calculation error and an interference variation.

In the interference margin simultaneous allocation type primary system protection method, the interference control includes determining the transmission power (EIRP, conducted power+antenna gain, etc.) of the radio device so as not to exceed an allowable interference threshold. At this time, when there are a large number of base station devices 40 and each does not exceed the allowable interference threshold value, interference power received in the communication system 1 (primary system) may exceed the allowable interference threshold value. Therefore, the interference margin (allowable amount of interference) is "allocated" based on the number of base station devices 40 registered in the communication control device 60.

For example, in the example of FIG. 18, the total number of base station devices 40 is 5. Therefore, the allowable amount of interference of $I_{accept}/5$ is allocated individually. Since the base station device 40 cannot recognize the allocation amount by itself, the base station device recognizes the allocation amount through the communication control device or acquires transmission power determined based on the allocation amount. Since the communication control device cannot recognize the number of radio devices managed by other communication control devices, it can recognize the total number by exchanging information with each other, and can allocate the allowable amount of interference. For example, an allowable amount of interference of $3I_{accept}/5$ is allocated in the communication control device $60_1$.

Figure 19:
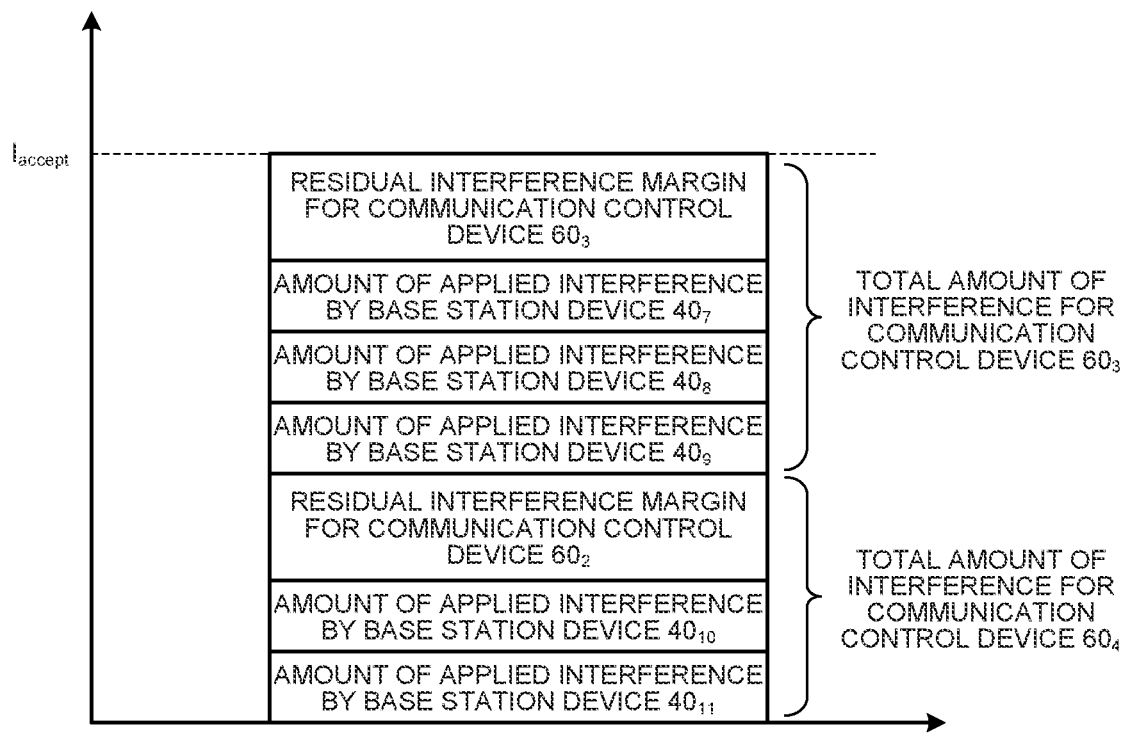
FIG. 19 is a diagram illustrating a state in which a residual interference margin occurs.

Note that, in this method, the interference margin not used by the base station device 40 can be a residual interference margin. FIG. 19 is a diagram illustrating a state in which a residual interference margin occurs. FIG. 19 illustrates a total amount of interference set in each of the two communication control devices 60 (communication control devices $60_3$, and $60_4$). In addition, FIG. 19 illustrates an amount of interference (amount of applied interference) applied to a predetermined protection point of the communication system 1 by a plurality of base station devices 40 (base station devices $40_7$ to $40_{11}$) under the management of the two communication control devices 60. An amount of interference obtained by subtracting the amount of interference of the base station device 40 from the total amount of interference of each of the two communication control devices 60 is a residual interference margin. In the following description, an excessive amount of interference is referred to as a residual interference margin. The residual interference margin can be rephrased as a residual amount of interference.

<4-2. Interference Margin Iterative Allocation Type>

Figure 20:
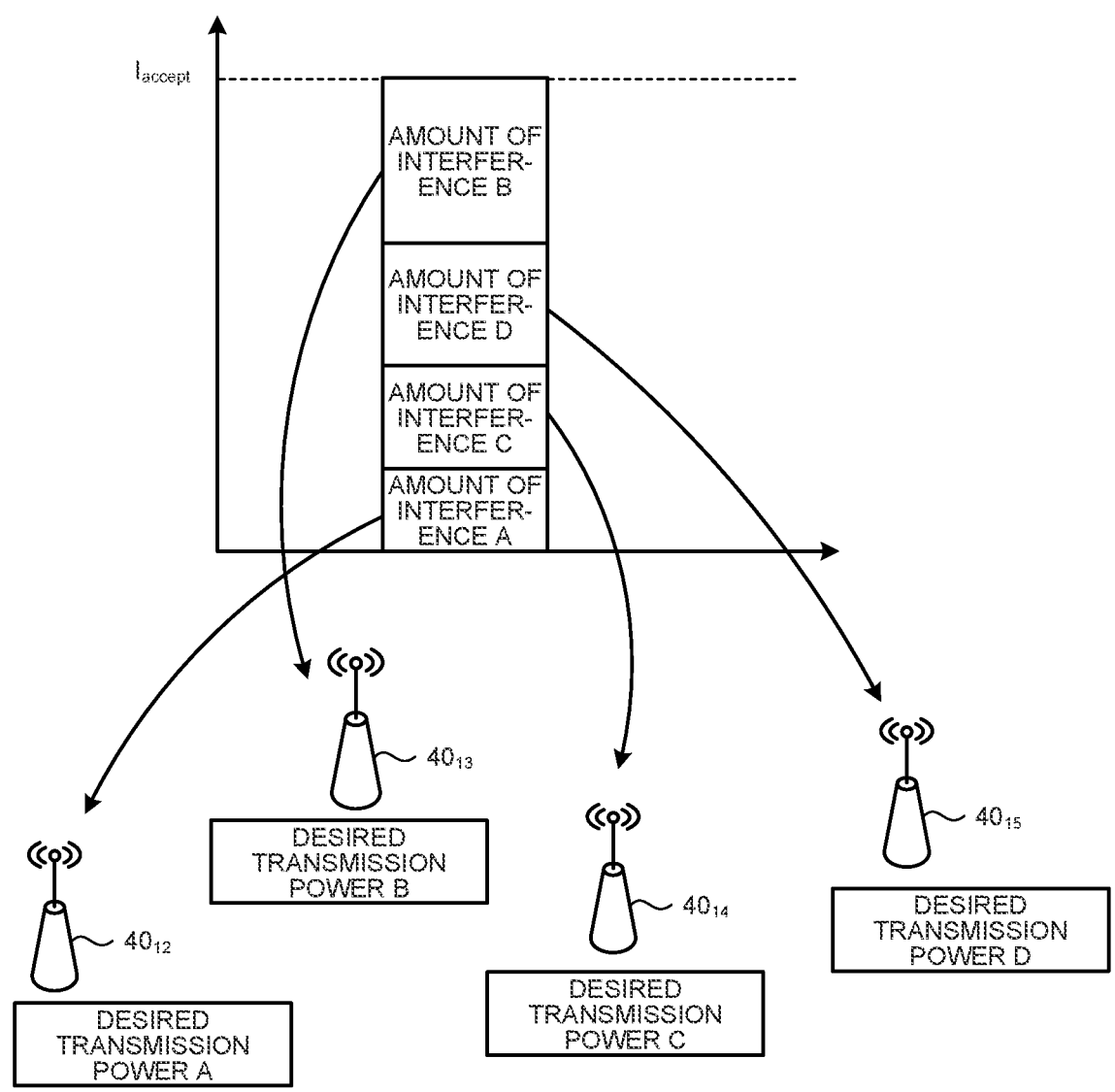
FIG. 20 is an explanatory diagram for explaining an interference margin iterative allocation type primary system protection method.

Next, an interference margin iterative allocation type primary system protection method will be described. As described above, in the interference margin iterative allocation type, the communication control device 60 calculates the maximum allowable transmission power of the secondary system using the "desired transmission power of the secondary system" as a reference value. FIG. 20 is an explanatory diagram for describing the interference margin iterative allocation type primary system protection method. In the interference margin iterative allocation type, for example, each of the plurality of base station devices 40 stores the desired transmission power information in the storage unit 42. The desired transmission power information is information about transmission power that the base station device 40 requires the communication control device 60 to transmit as information about transmission power necessary for transmission of the radio wave. In the example of FIG. 20, the base station devices $40_{12}$ to $40_{15}$ hold the desired transmission power information A to D, respectively. The communication control device 60 allocates the amounts of interference A to D to the base station devices $40_{12}$ to $40_{15}$ based on the desired transmission power information A to D, respectively.

5. Description of Various Procedures

Next, various procedures that may occur between entities of the communication system 2 will be described. Note that the description of the base station device 40 appearing in the following description can be replaced with a word indicating another communication device having a radio communication function.

<5-1. Registration Procedure>

The registration procedure is a procedure for registering a device parameter related to the base station device 40 in the communication control device 60. Typically, the registration procedure is started when one or a plurality of communication systems including the base station device 40 or the plurality of base station devices 40 notify the communication control device 60 of the registration request including the device parameter. The registration request may be transmitted by a communication system (for example, a proxy system such as the intermediate device 50) that substitutes (represents) one or a plurality of base station devices 40.

In the following description, it is assumed that the communication system that substitutes (represents) the plurality of base station devices 40 is the intermediate device 50, but a word of the intermediate device 50 appearing in the following description can be replaced with a word indicating a communication system that substitutes (represents) another communication device such as a proxy system. Of course, the description of the base station device 40 can also be replaced with a word indicating another communication device having a radio communication function.

[Details of Required Parameters]

The device parameter refers to, for example, the following information.

Information specific to communication device
Position information
Antenna information
Wireless interface information
Legal Information
Installer information At the time of implementation, information other than these may be treated as device parameters.

The information specific to the communication device is information that can identify the base station device 40, information about hardware of the base station device 40, and the like. For example, a serial number, a product model number, and the like may be included.

The information that can identify the base station device 40 indicates communication device user information, a communication device manufacturing serial number, and the like. For example, a user ID, a call sign, and the like can be assumed as the communication device user information. The user ID may be independently generated by the communication device user or may be issued in advance by the communication control device 60.

The information about the hardware of the base station device 40 may include, for example, transmission power class information, manufacturer information, and the like. In FCC C.F.R Part 96, for example, two types of classes Category A and Category B are defined as the transmission power class information, and information about any of the types can be included. Further, in 3GPP TS 36.104 and TS 38.104, some classes of eNodeB and gNodeB are defined, and these may also be used.

The information about the software of the base station device 40 can include, for example, version information, a build number, and the like related to an execution program in which the processing necessary for interaction with the communication control device 60 is described. In addition, version information, a build number, and the like of software for operating as the base station device 40 may also be included.

The position information is typically information capable of identifying the geographical position of the base station device 40. For example, it is coordinate information acquired by a positioning function represented by a global positioning system (GPS), a Beidou, a quasi-zenith satellite system (QZSS), a Galileo, or an assisted global positioning system (A-GPS). Typically, information about latitude, longitude, altitude, and positioning error may be included. Alternatively, for example, it may be position information registered in an information management device managed by a national regulatory authority (NRA) or its agency.

Alternatively, for example, coordinates of an X axis, a Y axis, and a Z axis with a specific geographical position as an origin may be used. In addition, an identifier indicating outdoor/indoor can be assigned together with such coordinate information.

Further, the position information may be information indicating an area in which the base station device 40 is located. For example, information defined by the government such as a postal code and an address may be used.

Furthermore, for example, the area may be indicated by a set of three or more geographic coordinates. The information indicating the area may be provided together with the coordinate information.

Furthermore, in a case where the base station device 40 is located indoors, information indicating a floor of a building may be assigned to the position information. For example, an identifier indicating a floor number, ground/underground, or the like may be assigned. Furthermore, for example, information indicating a further closed space inside the building, such as a room number and a room name in the building, may be assigned.

Typically, the positioning function is desirably provided by the base station device 40. However, it is not always possible to acquire the position information satisfying the required accuracy depending on the performance of the positioning function or the installation position. Therefore, the positioning function may be used by the installer. In such a case, it is desirable that the position information measured by the installer is written in the base station device 40.

The antenna information is typically information indicating performance, a configuration, and the like of an antenna included in the base station device 40. Typically, information such as an antenna installation height, a tilt angle (downtilt), a horizontal orientation (azimuth), a pointing (boresight), an antenna peak gain, and an antenna model may be included.

The antenna information may also include information about a formable beam. For example, information such as a beam width, a beam pattern, and an analog/digital beamforming capability may be included.

In addition, the antenna information can also include information about performance and a configuration of multiple input multiple output (MIMO) communication. For example, information such as the number of antenna elements and the maximum number of spatial streams may be included. In addition, codebook information to be used, and weight matrix information (a unitary matrix obtained by singular value decomposition (SVD), eigen value decomposition (EVD), block diagonalization (BD), or the like, a zero-forcing (ZF) matrix, or a minimum mean square error (MMSE) matrix), and the like can be included. In addition, in the case of including maximum likelihood detection (MLD) or the like that requires nonlinear calculation, information indicating the MLD or the like may be included.

The antenna information may include zenith of direction, departure (ZoD). The ZoD is a type of radio wave arrival angle. The ZoD may be estimated by another base station device 40 from the radio wave radiated from the antenna of the base station device 40. In this case, the base station device 40 may be a terminal device that operates as a base station or an access point, a device that performs D2D communication, a moving relay base station, or the like. The ZoD can be estimated by a radio wave arrival direction estimation technology such as a multiple signal classification (MUSIC) or an estimation of signal propagation via rotation invariance techniques (ESPRIT). The measurement information can be used by the communication control device 60.

The wireless interface information is typically information indicating a wireless interface technology included in the base station device 40. For example, identifier information indicating a technology used in a GSM (registered trademark), a CDMA 2000, a UMTS, an E-UTRA, a 5G NR or a further next generation cellular system, a derivative technology based on the LTE such as a MulteFire or an LTE-unlicensed (LTE-U), a metropolitan area network (MAN) such as a WiMAX or a WiMAX 2+, or a standard technology such as a radio LAN based on IEEE 802.11 is included. In addition, a version number or a release number of the technical specification that defines them may also be assigned. It is not necessarily a standard technology, and information indicating a proprietary radio technology may be included.

The wireless interface information may also include frequency band information supported by the base station device 40. For example, it may be expressed by one or a plurality of combinations of the upper limit frequency and the lower limit frequency, one or a plurality of combinations of the center frequency and the bandwidth, or one or a plurality of 3GPP operating band numbers.

The frequency band information supported by the base station device 40 may further include capability information about carrier aggregation (CA) or channel bonding. For example, combinable band information or the like may be included. Furthermore, the carrier aggregation may also include information about a band to be used as a primary component carrier (PCC) or a secondary component carrier (SCC). Also, the number of CCs that can be aggregated at the same time can be included.

The frequency band information supported by the base station device 40 may also include information indicating radio wave usage priority such as a PAL and a GAA.

The wireless interface information may also include modulation method information supported by the base station device 40. For example, as a representative example, information indicating a primary modulation method such as frequency shift keying (FSK), n-value phase shift keying (PSK) (n is 2, 4, 8, or the like), and an n-value quadrature amplitude modulation (QAM) (n is 4, 16, 64, 256, or the like), and information indicating a secondary modulation method such as orthogonal frequency division multiplexing (OFDM), DFT spread OFDM (DFT-s-OFDM), and a filter bank multi carrier (FBMC) may be included.

The wireless interface information may also include information about an error correction code. For example, capabilities such as a turbo code, a low density parity check (LDPC) code, and a polar code, and coding rate information to be applied can be included.

The modulation method information and the information about the error correction code can also be expressed by a modulation and coding scheme (MCS) index as another aspect.

In addition, the wireless interface information may also include information indicating functions specific to each radio technology supported by the base station device 40. For example, as a representative example, there is transmission mode (TM) information defined in LTE. In addition, information having two or more modes with respect to a specific function can be included in the wireless interface information as in the TM described above. In addition, in the technical specification, in a case where the base station device 40 supports a function that is not essential in the specification even when there are not two or more modes, information indicating this may also be included.

The wireless interface information may also include the radio access technology (RAT) information supported by the base station device 40. For example, information indicating an orthogonal a multiple access (OMA) such as a time division multiple access (TDMA), a frequency division multiple access (FDMA), and an orthogonal frequency division multiple access (OFDMA), a non-orthogonal multiple access (NOMA) such as a power division multiple access (PDMA) (a technique implemented by a combination of superposition coding (SPC) and successive interference canceller (SIC) is a representative example), code division multiple access (CDMA), a sparse code multiple access (SCMA), an interleaver division multiple access (IDMA), and a spatial division multiple access (SDMA), and an opportunistic access such as a carrier sense multiple access/collision avoidance (CSMA/CA) and a carrier sense multiple access/collision detection (CSMA/CD) may be included.

In addition, the wireless interface information may also include information about a duplex mode supported by the base station device 40. For example, frequency division duplex (FDD), time division duplex (TDD), and full duplex (FD) can be included as a representative example. In a case where TDD is included as the wireless interface information, TDD frame configuration information used/supported by the base station device 40 may be assigned. Furthermore, information about the duplex mode may be included for each frequency band indicated by the frequency band information.

The wireless interface information may also include information about a transmission diversity method supported by the base station device 40. For example, space time coding (STC) or the like may be included.

The wireless interface information may also include guard band information. For example, information about a guard band size defined by the standard may be included. Alternatively, for example, information about a guard band size desired by the base station device 40 may be included.

The legal information is typically information about regulation that the base station device 40 must comply with and which is defined by radio administration agencies in each country and region or equivalent organizations, authentication information acquired by the base station device 40, and the like. Typically, the information about the regulation may include, for example, upper limit value information about out-of-band radiation, information about a blocking characteristic of the receiver, and the like. Typically, the authentication information can include, for example, type approval information (FCC ID, technical standard conformance certificate, etc), legal/regulatory information (for example, FCC regulation number, ETSI harmonized standard number, and the like) serving as a standard for authentication acquisition, and the like.

Among the legal information, information related to numerical values may be substituted by information defined in the specification of the wireless interface technology. For example, the upper limit value of the out-of-band radiation may be derived and used by using an adjacent channel leakage ratio (ACLR) instead of the upper limit value information about the out-of-band radiation. In addition, the ACLR itself may be used as necessary. Further, adjacent channel selectivity (ACS) may be used instead of the blocking characteristic. In addition, these may be used in combination, or an adjacent channel interference ratio (ACIR) may be used.

The installer information may include information capable of identifying a person who installs the base station device 40 (installer), specific information associated with the installer, and the like. For example, Non Patent Literature 2 discloses the certified professional installation registration ID (CPIR-ID) and the CPI name as information that can identify the installer. In addition, for example, a contact address (mailing/contact address), an e-mail address, a telephone number, a public key identifier (PKI), and the like are disclosed as information specific to the installer. The information is not limited thereto, and other information about the installer may be included as necessary.

[Supplement of Required Parameters]

In the registration procedure, depending on the embodiment, it is assumed that the device parameters related to the terminal device 30 in addition to the base station device 40 are required to be registered in the communication control device 60. In such a case, the term "communication device" in the above description (details of required parameters) may be replaced with a term "terminal device" or an equivalent term. In addition, a parameter specific to the "terminal device" that is not described above (details of the required parameter) may also be treated as the required parameter in the registration procedure. For example, a user equipment (UE) category specified in 3GPP can be cited.

[Details of Registration Process]

Figure 21:
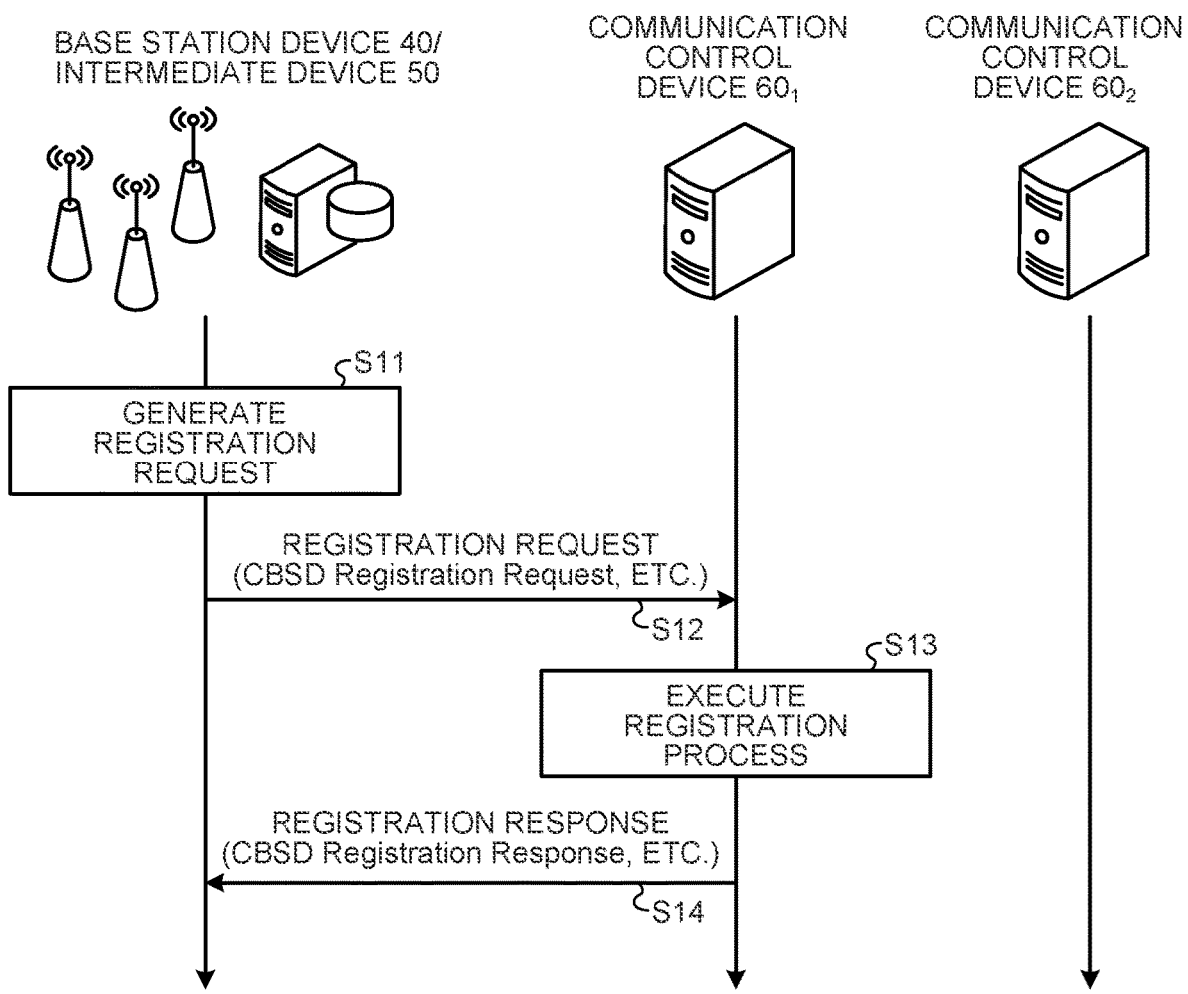
FIG. 21 is a sequence diagram for explaining a registration procedure.

FIG. 21 is a sequence diagram for describing a registration procedure. One or a plurality of communication systems including the base station device 40 or the plurality of base station devices 40 generate a registration request message using the device parameter (step S11), and notifies the communication control device 60 of the registration request message (step S12). The generation and/or notification of the message may be performed by the intermediate device 50.

Here, in a case where the device parameter includes the installer information, the falsification prevention processing or the like may be performed on the registration request by using this information. In addition, part or all of the information included in the registration request may be subjected to the encryption process. Specifically, for example, a process in which a public key specific to the installer is shared in advance between the installer and the communication control device 60, and the installer encrypts information using the secret key can be performed. An example of the encryption target includes security sensitive information such as position information.

Further, as disclosed in Non Patent Literature 2, for example, the installer may directly write the position information to the communication control device 60.

After receiving the registration request, the communication control device 60 performs the registration process of the base station device 40 (step S13), and returns a registration response according to a processing result (step S14). When there is no shortage or abnormality of information necessary for registration, the communication control device 60 records the information in the storage unit 42 and makes a notification of normal completion. Otherwise, the communication control device 60 makes a notification of the registration failure. In a case where the registration is normally completed, the communication control device 60 may allocate an ID to each communication device and make notification enclosing the ID information at the time of response. In a case where the registration fails, typically, one or a plurality of communication systems including the base station device 40 or the plurality of base station devices 40, or an operator (for example, a mobile network operator or an individual) or an installer thereof corrects the registration request or the like and tries the registration procedure until the registration is normally completed.

Note that the registration procedure may be executed a plurality of times. Specifically, for example, the registration procedure can be re-executed in a case where the position information is changed beyond a predetermined standard due to movement/accuracy improvement or the like. The predetermined standard is typically defined by a legal system. For example, in 47 C.F.R Part 15, the mode II personal/portable white space device is required to access the database again when the position information changes by 100 meters or more.

<5-2. Available Spectrum Query Procedure)>

The available spectrum query procedure is a procedure in which the base station device 40 or the intermediate device 50 inquires from the communication control device 60 about information about an available spectrum. Typically, the procedure is started when the base station device 40 or the intermediate device 50 notifies the communication control device 60 of a query request including information that can identify the base station device 40 (or the base station device 40 under the control of the intermediate device 50).

As described above, the description of the "base station device 40" can be replaced with a word indicating another communication device having a radio communication function. Furthermore, the description of "intermediate device 50" can also be replaced with a word indicating a communication system that substitutes (represents) another communication device such as a proxy system.

(1) Example 1

Here, typically, the available spectrum information is information indicating a spectrum that does not give fatal interference to the primary system at the position of the base station device 40 (or the base station device 40 under the control of the intermediate device 50) and can be safely secondarily used. For example, in a case where the base station device 40 is installed in a secondary use prohibited area such as an exclusion zone in order to protect the primary system using the frequency channel F1, the frequency channel F1 is not notified as an available channel to the base station device 40.

(2) Example 2

Further, for example, when it is determined that fatal interference is given to the primary system even outside the secondary use prohibited area, the frequency channel may not be notified as an available channel.

(3) Example 3

There may also be a frequency channel that is not notified as available spectrum information is available by conditions other than the primary system protection requirements of Example 2. Specifically, for example, in order to avoid interference that may occur between the base station devices 40 in advance, a frequency channel being used by another base station device 40 existing in the vicinity of the base station device 40 (or the base station device 40 under the control of the intermediate device 50) may not be notified as an available channel.

In this case, separately from the available spectrum described in Examples 1 and 2, the communication control device 60 may transmit, as the estimation spectrum information, information about a spectrum at which no interference occurs between the base station devices 40. Here, the available spectrum information referred to in Example 1 or Example 2 may be, for example, information about an available channel described in Non Patent Literature 13. Further, the recommended spectrum information may be information about a recommended channel described in Non Patent Literature 13. Note that the recommended spectrum information can be regarded as a type of available spectrum.

(4) Example 4

Even in a case of these examples (Example 2, Example 3), the same spectrum as that of the primary system or the neighboring base station device 40 can be notified as an available channel. In such a case, typically, the maximum allowable transmission power information is included in the available spectrum information. The maximum allowable transmission power is typically expressed by equivalent isotropic radiated power (EIRP). The present invention is not necessarily limited to this, and may be provided by, for example, a combination of conducted power and antenna gain. A feeder loss may also be included. Furthermore, as the antenna gain an allowable peak gain may be set for each spatial direction.

(Details of Required Parameter)

As the information that can identify the base station device 40 can be assumed to be, for example, information specific to the communication device registered at the time of the registration procedure, the ID information described above (details of the registration process), and the like.

The query request may also include query requirement information. The query requirement information may include, for example, information indicating a frequency band for which it is desired to know whether the frequency band is available. Also, for example, transmission power information may be included. The base station device 40 or the intermediate device 50 may include the transmission power information, for example, in a case where it is desired to know only the spectrum information in which the desired transmission power can be used. The query requirement information does not necessarily need to be included.

The query request may also include a measurement report. The measurement report includes a result of measurement performed by the base station device 40 and/or the terminal device 30. For example, not only raw data but also processed information may be included. For example, standardized metrics represented by reference signal received power (RSRP), reference signal strength indicator (RSSI), and reference signal received quality (RSRQ) may be used.

[Details of Available Spectrum Evaluation Process]

Figure 22:
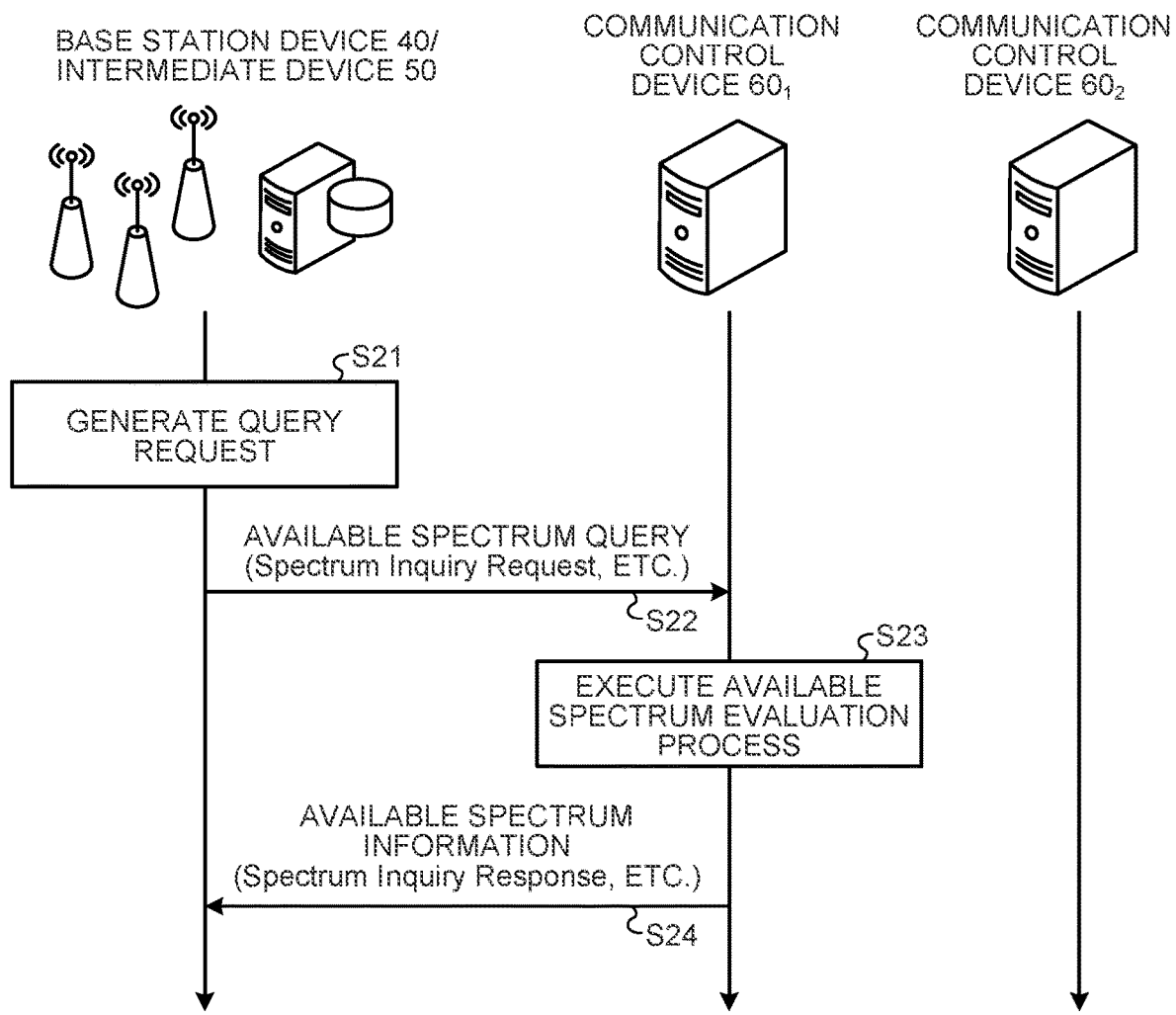
FIG. 22 is a sequence diagram for explaining an available spectrum query procedure.

FIG. 22 is a sequence diagram for describing an available spectrum query procedure. The base station device 40 or the intermediate device 50 generates a query request including information that can identify the base station device 40 (or the base station device 40 under the control the intermediate device 50) (step S21), and notifies the communication control device 60 of the query request (step S22).

After receiving the query request, the communication control device 60 evaluates the available spectrum based on the query requirement information (step S23). For example, as described in Examples 1 to 3 described above, the available spectrum can be evaluated in consideration of the existence of the primary system, the secondary use prohibited area thereof, and the base station device 40 in the vicinity thereof.

As described in Example 4 above, the communication control device 60 may derive the maximum allowable transmission power information. Typically, it is calculated using allowable interference power information in the primary system or the protection zone thereof, calculation reference point information about an interference power level experienced by the primary system, registration information of the base station device 40, and a propagation loss estimation model. Specifically, as an example, it is calculated by the following mathematical expression.

$$P_{MaxTx(dBm)} = I_{Th(dBm)} + PL(d)_{(dB)} \quad (1)$$

where, $P_{MaxTx(dBm)}$ is maximum allowable transmission power, $I_{Th(dBm)}$ is allowable interference power, d is a distance between the reference point and the base station device 40, and $PL(d)_{(dB)}$ is a propagation loss at the distance d. Although the antenna gain in the transceiver is not explicitly indicated in the mathematical expression, the antenna gain may be included according to a method of expressing the maximum allowable transmission power (EIRP, conducted power, etc) or a reference point of the reception power (antenna input point, antenna output point, and the like). Further, a safety margin or the like for compensating for variation due to fading may be included. In addition, feeder loss and the like may be considered as necessary.

In addition, the above mathematical expression is described based on the assumption that the single base station device 40 is an interference source. For example, in a case where it is necessary to consider cumulative interference (aggregated interference) from a plurality of base station devices 40 at the same time, a correction value may be added. Specifically, for example, the correction value can be determined based on three types (fixed/predetermined, flexible, flexible minimized) of interference margin methods disclosed in Non Patent Literature 3.

Note that, although the above mathematical expression is expressed using logarithms, it is a matter of course that the mathematical expression may be converted into a true number and used at the time of implementation. In addition, all parameters in logarithmic notation described in the present embodiment may be appropriately converted into true numbers and used.

(1) Method 1

Furthermore, as described in the section (details of required parameter) above, in a case where the transmission power information is included in the query requirement information, the available spectrum can be evaluated by a method different from the above-described method. Specifically, for example, in a case where it is assumed that desired transmission power indicated by transmission power information is used, when an estimated amount of applied interference is less than allowable interference power in the primary system or the protection zone thereof, it is determined that the frequency channel is available, and the base station device 40 (or the intermediate device 50) is notified of the result.

(2) Method 2

Although the example in which the band use condition is calculated based on the other system related information is described, the present disclosure is not limited to such an example. For example, as in an area of a radio environment map (REM), in a case where an area/space in which the base station device 40 can use the shared band is determined in advance, the available spectrum information may be derived based on only the position-related information and the height-related information. Furthermore, for example, in a case where a look-up table for associating a position and a height with available spectrum information is prepared, the available spectrum information may be derived based on only the position-related information and the height-related information.

The evaluation of the available spectrum does not necessarily need to be performed after the query request is received. For example, after the normal completion of the above-described registration procedure, the communication control device 60 may independently perform the evaluation without a query request. In such a case, the communication control device 60 may create an REM or a look-up table exemplified in Method 2 or an information table similar thereto.

In any method, the radio wave usage priority such as a PAL or a GAA may also be evaluated. For example, in a case where the registered device parameter or the query requirement includes information about the radio wave usage priority, it may be determined whether the spectrum use is available based on the priority, and the notification may be made. Furthermore, for example, as disclosed in Non Patent Literature 2, in a case where information (in Non Patent Literature 2, referred to as a cluser list) related to the base station device 40 that performs high priority use (for example, PAL) from the user in advance is registered in the communication control device 60, the evaluation may be performed based on the information.

After the evaluation of the available spectrum is completed, the communication control device 60 notifies the base station device 40 (or the intermediate device 50) of the evaluation result (step S24). The base station device 40 may select a desired communication parameter by using the evaluation result received from the communication control device 60.

<5-3. Spectrum Grant Procedure>

The spectrum grant procedure is a procedure in which the base station device 40 receives secondary use permission of a spectrum from the communication control device 60. Typically, after the registration procedure is normally completed, one or a plurality of communication systems including the base station device 40 or the plurality of base station devices 40 start the procedure by notifying the communication control device 60 of a spectrum grant request including information that can identify the base station device 40. This notification may be performed by the intermediate device 50. Note that "after the registration procedure is normally completed" also means that the available spectrum query procedure does not necessarily need to be performed.

As described above, the description of the "base station device 40" can be replaced with a word indicating another communication device having a radio communication function. Furthermore, the description of "intermediate device 50" can also be replaced with a word indicating a communication system that substitutes (represents) another communication device such as a proxy system.

In the present invention, it is assumed that at least the following two types of spectrum grant request methods can be used.

Designation Method
Flexible Method

The designation method is a request method in which the base station device 40 designates at least a frequency band desired to be used and maximum transmission power as a desired communication parameter and requests the communication control device 60 to permit operation based on the desired communication parameter. The parameters are not necessarily limited to the parameters, and parameters specific to the wireless interface technology (such as a modulation method and a duplex mode) may be designated. In addition, information indicating radio wave usage priority such as a PAL and a GAA may be included.

The flexible method is a request method in which the base station device 40 designates only a requirement related to a communication parameter and requests the communication control device 60 to designate the communication parameter that can be secondarily used while satisfying the requirement. A requirement related to a communication parameter may include bandwidth or desired maximum transmission power or desired minimum transmission power. The parameters are not necessarily limited to the parameters, and parameters specific to the wireless interface technology (such as a modulation method and a duplex mode) may be designated. Specifically, for example, one or a plurality of TDD frame configurations may be selected in advance and notified.

In any methods, the measurement report may be included. The measurement report includes a result of measurement performed by the base station device 40 and/or the terminal device 30. For example, not only raw data but also processed information may be included. For example, standardized metrics represented by reference signal received power (RSRP), reference signal strength indicator (RSSI), and reference signal received quality (RSRQ) may be used.

[Details of Spectrum Grant Process]

Figure 23:
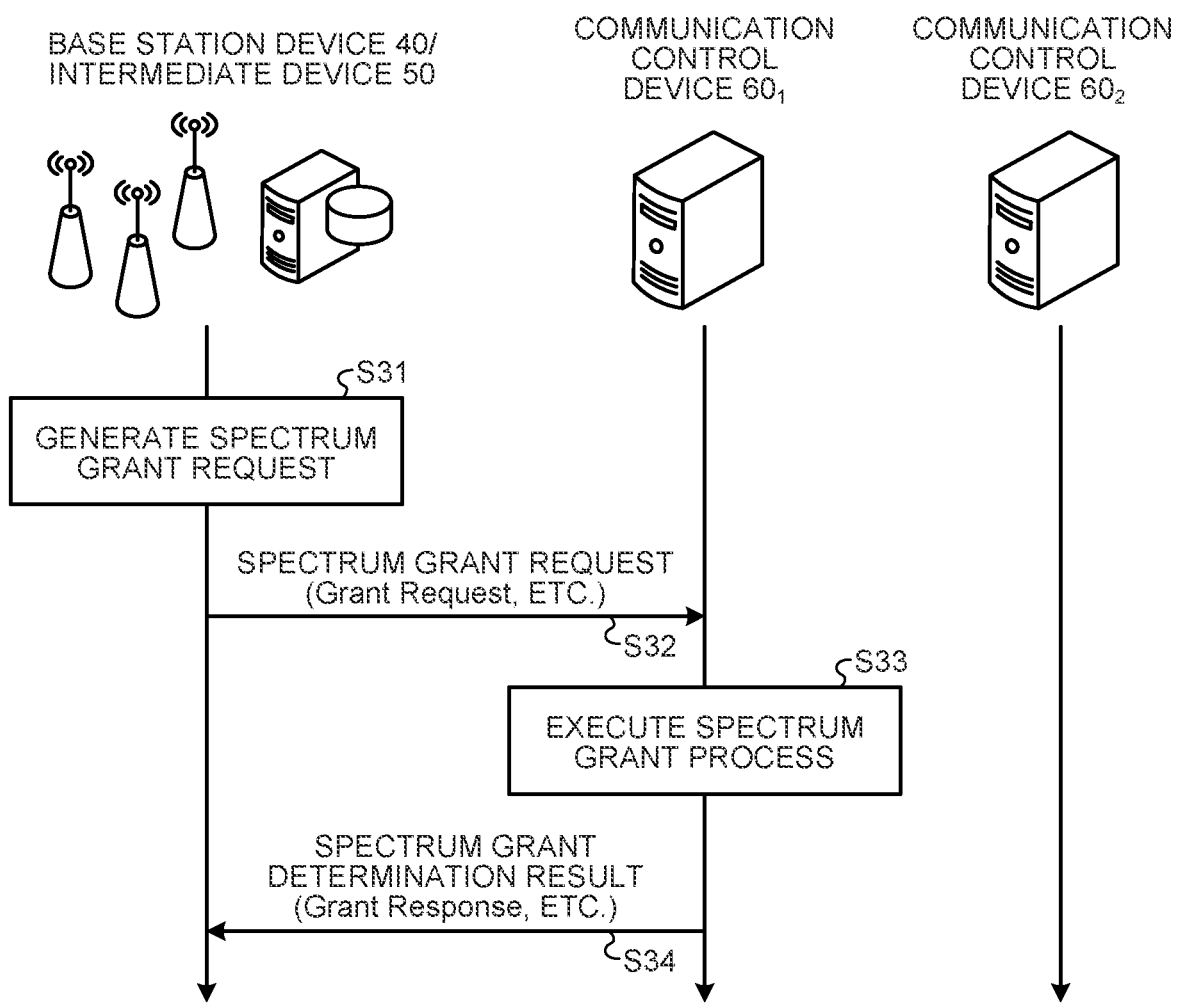
FIG. 23 is a sequence diagram for explaining a spectrum grant procedure.

FIG. 23 is a sequence diagram for describing a spectrum grant procedure. One or a plurality of communication systems including the base station device 40 or the plurality of base station devices 40 generates a spectrum grant request including information that can identify the base station device 40 (step S31), and notifies the communication control device 60 of the spectrum grant request (step S32). The generation and/or notification of the request may be performed by the intermediate device 50.

After acquiring the spectrum grant request, the communication control device 60 performs the spectrum grant process based on the spectrum grant request method (step S33). For example, the communication control device 60 can perform the spectrum grant process in consideration of the existence of the primary system, the secondary use prohibited area thereof, and the base station device 40 in the vicinity using the method described in Examples 1 to 3 of <5-2. Available spectrum query procedure>.

In a case where the flexible method is used, the communication control device 60 may derive the maximum allowable transmission power information using the method described in Example 4 of <5-2. Available spectrum query procedure>. Typically, the communication control device 60 calculates the maximum allowable transmission power by using the allowable interference power information in the primary system or the protection zone thereof, the calculation reference point information about the interference power level experienced by the primary system, the registration information of the base station device 40, and the propagation loss estimation model. For example, the communication control device 60 calculates the maximum allowable transmission power by the following expression (2).

$$P_{MaxTx(dBm)} = I_{Th(dBm)} + PL(d)_{(dB)} \quad (2)$$

where, $P_{MaxTx(dBm)}$ is maximum allowable transmission power, $I_{Th(dBm)}$ is allowable interference power, d is a distance between the reference point and the base station device 40, and $PL(d)_{(dB)}$ is a propagation loss at the distance d. Although the antenna gain in the transceiver is not explicitly indicated in the mathematical expression, the expression may be modified and used according to the expression method of the maximum allowable transmission power (EIRP, conducted power, etc) or the reference point of the reception power (Antenna input point, antenna output point, and the like). Further, a safety margin or the like for compensating for variation due to fading may be included. In addition, feeder loss and the like may be considered as necessary.

In addition, the above mathematical expression is described based on the assumption that the single base station device 40 is an interference source. For example, in a case where it is necessary to consider cumulative interference (aggregated interference) from a plurality of base station devices 40 at the same time, a correction value may be added. Specifically, for example, the correction value can be determined based on three types of methods (fixed/predetermined, flexible, flexible minimized) disclosed in Non Patent Literature 3.

Various models may be used as the propagation loss estimation model. When a model is designated for each application, it is desirable to use the designated model. For example, in Non Patent Literature 6, a propagation loss model such as an extended Hata (eHATA) or an irregular terrain model (ITM) is used for each application. Certainly, during implementation of the present invention, the propagation loss model does not need to be limited thereto.

When a model is not designated in a predetermined application, the model may be selectively used as necessary. As a specific example, for example, it is possible to selectively use an aggressive model such as a free space loss model when estimating the applied interference power to another base station device 40, or use a conservative model when estimating the coverage of the base station device 40.

Furthermore, in a case where the designation method is used, the spectrum grant process can be performed using the method described in Method 1 of <5-2. Available spectrum query procedure>. Specifically, for example, in a case where it is assumed that desired transmission power indicated by transmission power information is used, when an estimated amount of applied interference is less than allowable interference power in the primary system or the protection zone thereof, it is determined that the frequency channel is available, and the base station device 40 (or the intermediate device 50) is notified of the result.

In any method, the radio wave usage priority such as a PAL or a GAA may also be evaluated. For example, in a case where the registered device parameter or the query requirement includes information about the radio wave usage priority, it may be determined whether the spectrum use is available based on the priority, and the notification may be made. Furthermore, for example, as disclosed in Non Patent Literature 2, in a case where information (in Non Patent Literature 2, referred to as a cluser list) related to the base station device 40 that performs high priority use (for example, PAL) from the user in advance is registered in the communication control device 60, the evaluation may be performed based on the information.

The spectrum grant process is not necessarily performed when the request is received. For example, after the normal completion of the above-described registration procedure, the communication control device 60 may independently perform the process without the spectrum grant request. Furthermore, for example, the spectrum grant determination process may be performed at regular intervals. In such a case, the REM and the look-up table exemplified in Method 2 of <5-2. Available spectrum query procedure>, and an information table similar to them may be created.

After completion of the spectrum grant processing, the communication control device 60 notifies the base station device 40 of the determination result (step S34).

<5-4. Spectrum Use Notification/Heartbeat>

The spectrum use notification is a procedure in which the base station device 40 or the intermediate device 50 notifies the communication control device 60 of the spectrum use based on the communication parameter allowed to be used in the spectrum grant procedure. Typically, the procedure is started when the base station device 40 or the intermediate device 50 notifies the communication control device 60 of a notification message including information that can identify the base station device 40.

As described above, the description of the "base station device 40" can be replaced with a word indicating another communication device having a radio communication function. Furthermore, the description of "intermediate device 50" can also be replaced with a word indicating a communication system that substitutes (represents) another communication device such as a proxy system.

This procedure is desirably performed periodically until the use of the spectrum is rejected by the communication control device 60. When this procedure is normally completed, the base station device 40 may start or continue the radio wave transmission. For example, when the state of the grant is granted, the state of the grant transitions to authorized due to the success of this procedure. In addition, when the state of the grant is authorized, the state of the grant transitions to granted or idole due to the failure of this procedure.

Here, the grant is approval of radio wave transmission given by the communication control device 60 (for example, the SAS) to the base station device 40 (for example, the CBSD). The grant is described, for example, in Non Patent Literature 2. In Non Patent Literature 2, a signaling protocol between a database (SAS) and a base station (CBSD) for spectrum access of 3550-3700 MHz in the United States is standardized. In this standard, approval of radio wave transmission that the SAS gives to the CBSD is referred to as a "grant". The operation parameters allowed for the grant are defined in two ways: a maximum allowable equivalent isotropic radiated power (EIRP) and a frequency channel. That is, in order to perform radio wave transmission using a plurality of frequency channels, the CBSD is required to acquire a plurality of grants from the SAS.

Figure 24:
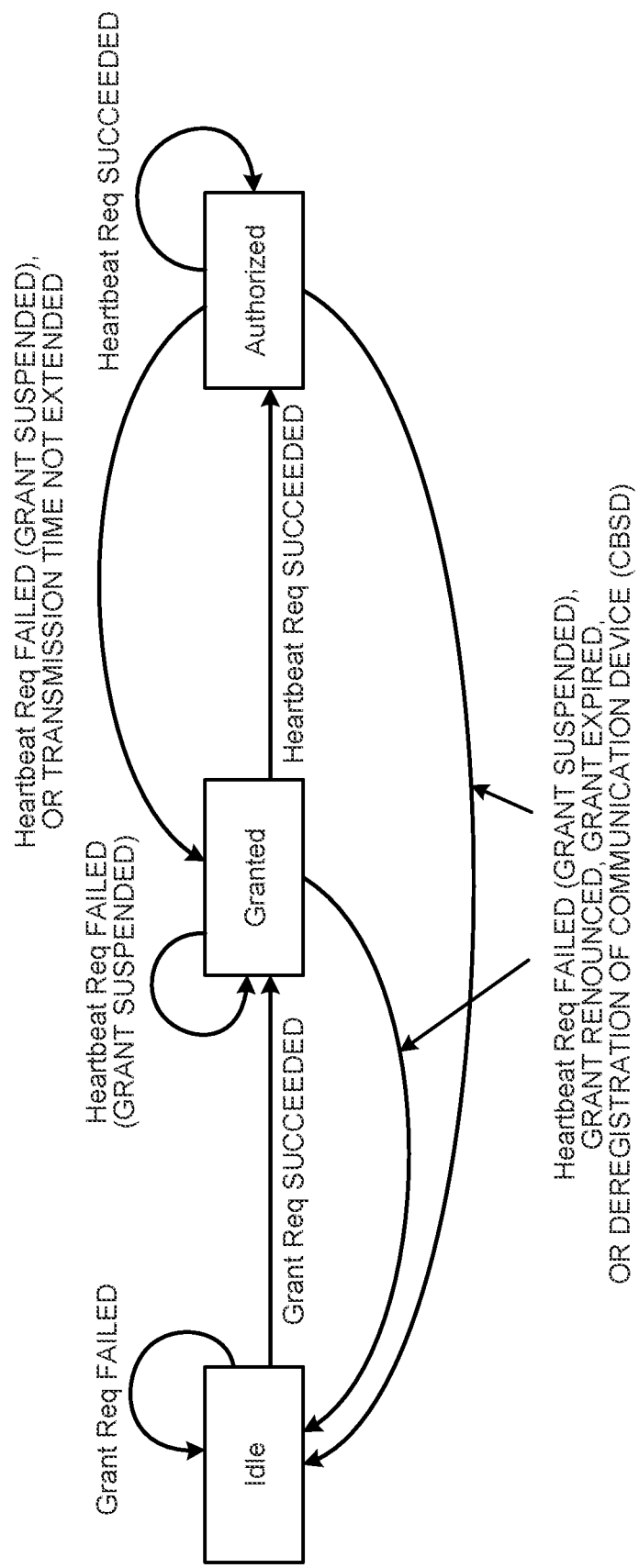
FIG. 24 is a state transition diagram illustrating a permission state of radio wave transmission.

In the grant, a state indicating a permission state of radio wave transmission is defined. Examples of the state indicating a permission state of radio wave transmission include a granted state and an authorized state. FIG. 24 is a state transition diagram illustrating a permission state of radio wave transmission. In FIG. 24, the granted state indicates a state in which the grant is held but radio wave transmission is prohibited, and the authorized state indicates a state in which radio wave transmission is permitted based on an operation parameter value defined in the grant. These two states transition according to a result of a heartbeat procedure defined in the same standard.

In the following description, the spectrum use notification may be referred to as a heartbeat request or simply a heartbeat. In addition, a transmission interval of a heartbeat request may be referred to as a heartbeat interval. Note that the description of a heartbeat request or a heartbeat appearing in the following description can be appropriately replaced with another description indicating "a request for starting or continuing radio wave transmission". Similarly, the heartbeat interval can be replaced with another description (for example, the transmission interval) indicating the transmission interval of the spectrum use notification.

Figure 25:
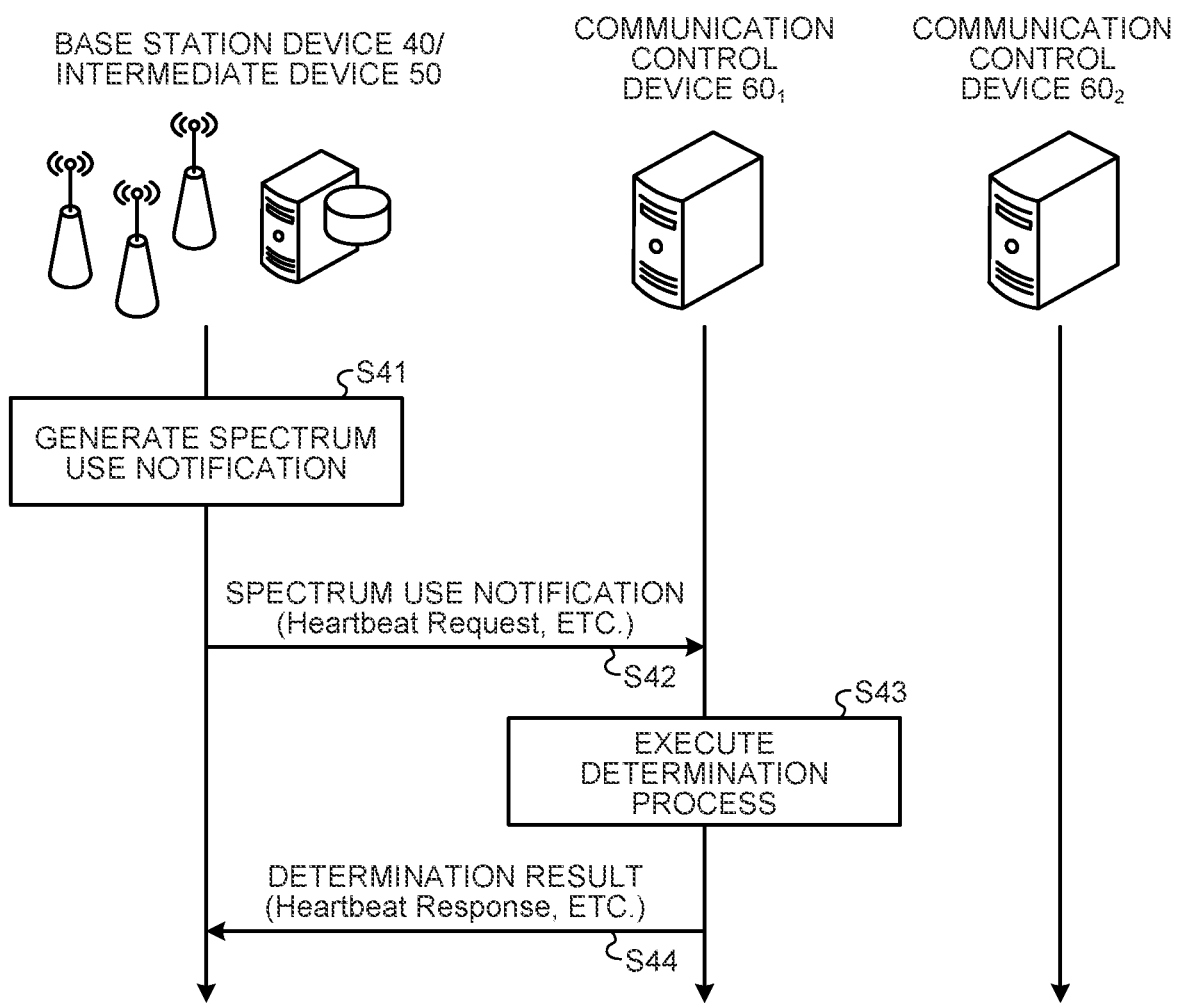
FIG. 25 is a sequence diagram for explaining a spectrum use notification procedure.

FIG. 25 is a sequence diagram for explaining a spectrum use notification. One or a plurality of communication systems including the base station device 40 or the plurality of base station devices 40 generate a notification message including information that can identify the base station device (step S41), and notifies the communication control device 60 of the notification message (step S42). The generation and/or notification of the message may be performed by the intermediate device 50.

After receiving the spectrum use notification, the communication control device 60 may determine whether the start/continuation of the radio wave transmission is permitted (step S43). Examples of the determination method include confirmation of the spectrum use information of the primary system. Specifically, the start/continuation permission or rejection of the radio wave transmission can be determined based on a change in the use spectrum of the primary system, a change in the spectrum use status of the primary system in which the radio wave use is not steady (for example, on-board radar), or the like.

When the determination process is completed, the communication control device 60 notifies the base station device (or the intermediate device 50) of the determination result (step S44).

In this procedure, a reconfiguration command of the communication parameter may be given by the communication control device 60 to the base station device 40 (or the intermediate device 50). Typically, it may be executed in response to the spectrum use notification. For example, recommended communication parameter information may be provided.

<5-5. Supplement to Various Procedures>

Here, the various procedures do not necessarily need to be individually implemented as described below. For example, the two different procedures may be implemented by substituting a third procedure with the roles of the two different procedures. Specifically, for example, the registration request and the available spectrum query request may be integrally notified. Furthermore, for example, the spectrum grant procedure and the spectrum use notification may be integrally performed. Of course, the number of combinations is not limited to these combinations, and may be three or more. Further, the above procedure may be separately performed.

In addition, in a case where the present embodiment is applied for the purpose of spectrum access with an existing system, it is desirable that appropriate procedures or equivalent procedures are selected and used based on the radio wave law related to the frequency band in the country or region in which the technology of the present embodiment is implemented. For example, in a case where registration of a communication device is required for use of a specific frequency band in a specific country or region, it is desirable to perform the registration procedure.

In addition, the expression of "acquiring information" or an expression equivalent thereto in the present embodiment does not necessarily mean that the information is acquired according to the procedure described above. For example, although it is described that the position information about the base station device 40 is used in the available spectrum evaluation process, it means that it is not always necessary to use the information acquired in the registration procedure, and in a case where the position information is included in the available spectrum query procedure request, the position information may be used. In other words, it means that the described parameters may be included in other procedures within the scope described in the present embodiment and within the scope of technical feasibility.

Furthermore, information that can be included in the response from the communication control device 60 to the base station device 40 (or the intermediate device 50) described in the above procedure may be push notified. As a specific example, available spectrum information, recommended communication parameter information, radio wave transmission continuation rejection notification, and the like may be push notified.

<5-6. Various Procedures Related to Terminal Device>

Basically, each procedure described in <5-1> to <5-4> can be used for the terminal device 30. However, unlike the base station device 40, the terminal device 30 has mobility. That is, the position information is dynamically updated. Depending on the legal system, when the position information changes by a certain amount or more, re-registration to the communication control device 60 may be required in some cases. Therefore, in an operation form (see Non Patent Literature 4) defined by the UK Office of Communication (Ofcom), the following two types of communication parameters are defined.

Specific Operational Parameters

Generic Operational Parameters

The specific operation parameters are defined as "operation parameters specific to a specific slave white space device (WSD)" in Non Patent Literature. In other words, it is a communication parameter calculated using the device parameter of the slave WSD corresponding to the terminal device 30. As a feature, it is calculated by a white space database (WSDB) using the position information about the slave WSD.

The generic operational parameters are defined as "operation parameters which any slave WSD located within the coverage area of a predetermined master WSD (corresponding to the base station device 40) can use" in Non Patent Literature. The feature is that it is calculated by the WSDB without using the position information about the slave WSD.

The information for the terminal device 30 can be provided from the base station device 40 by unicast/broadcast. For example, a broadcast signal represented by a contact verification signal (CVS) defined in FCC rule Part 15 Subpart H may be used. Alternatively, it may be provided by a broadcast signal specific to a wireless interface. Specifically, it may be provided by, for example, a physical broadcast channel (PBCH) or NR-PBCH used in the LTE or the 5G NR.

<5-7. Procedure Occurring Between Communication Control Devices>

[Information Exchange]

Figure 26:
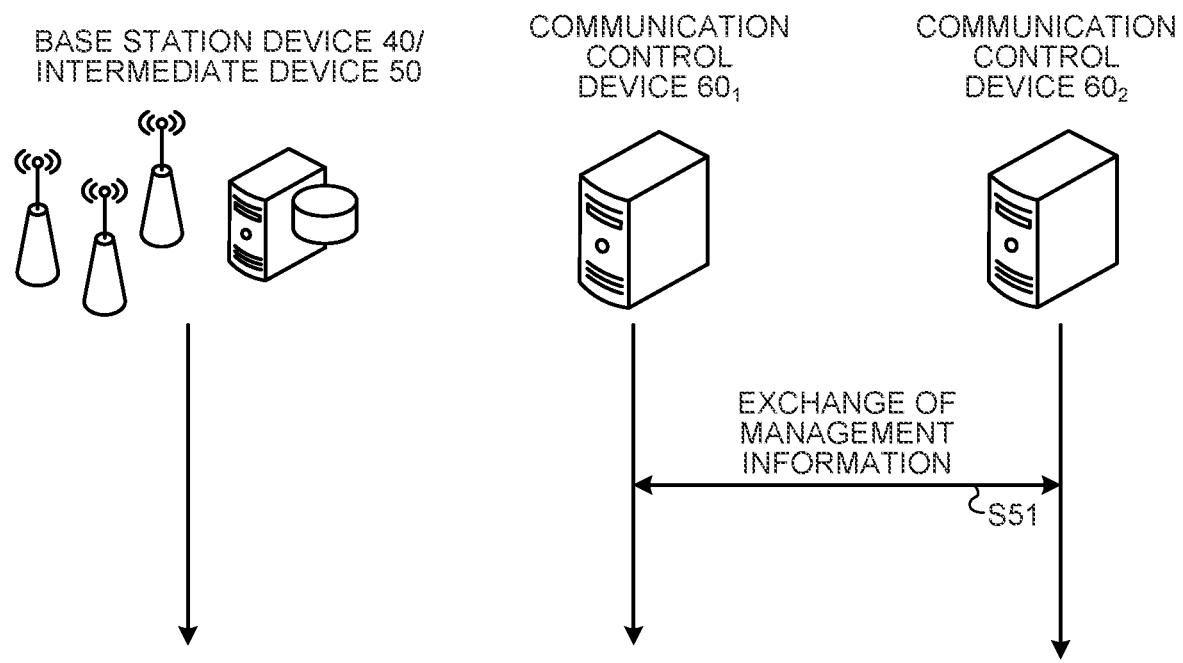
FIG. 26 is a sequence diagram for explaining an exchange procedure of management information.

The communication control device 60 can exchange management information with another communication control device 60. FIG. 26 is a sequence diagram for describing an exchange procedure of management information. In the example of FIG. 26, the communication control device 60$_1$ and the communication control device 60$_2$ exchange information. Of course, the communication control device that exchanges information is not limited to two of the communication control device 60$_1$ and the communication control device 60$_2$.

In the exchange procedure of management information, at least the following information is desirably exchanged.

Communication device registration information

Communication device communication parameter information

Area information

The communication device registration information is typically a device parameter of the base station device 40 registered in the communication control device 60 in the registration procedure. Not all the registered information is necessarily exchanged. For example, information that may correspond to personal information does not need to be exchanged. Furthermore, when the communication device registration information is exchanged, encrypted and ambiguous information may be exchanged. For example, information converted into a binary value or information signed using an electronic signature mechanism may be exchanged.

Typically, the communication device communication parameter information is information about a communication parameter currently used by the base station device 40. At least information indicating the use spectrum and the transmission power is desirably included. Other communication parameters may be included.

The area information is typically information indicating a predetermined geographical area. The information may include area information with various attributes in various manners.

For example, protection area information of the base station device 40 serving as a high priority secondary system such as PAL protection area (PPA) disclosed in Non Patent Literature 5 may be included. The area information in this case can be expressed by, for example, a set of three or more geographical position coordinates. Furthermore, for example, in a case where a plurality of communication control devices 60 can refer to a common external database, the information can be expressed by an ID indicating the information.

Furthermore, for example, information indicating the coverage of the base station device 40 may be included. The area information in this case can also be expressed by, for example, a set of three or more geographical position coordinates. Furthermore, for example, assuming a circle with the geographical position of the base station device 40 as the origin, the area information can also be expressed by information indicating the radius size. Furthermore, for example, in a case where a plurality of communication control devices 60 can refer to a common external database, the information can be expressed by an ID indicating the information.

Furthermore, as another aspect, information about an area section determined in advance by an administration or the like can be included. Specifically, for example, it is possible to indicate a certain area by indicating an address. Furthermore, for example, a license area or the like can be similarly expressed.

Furthermore, as still another aspect, the area information does not necessarily express a planar area, and may express a three-dimensional space. For example, it may be expressed using a spatial coordinate system. In addition, for example, information indicating a predetermined closed space such as a floor number, a floor, or a room number of a building may be used.

These pieces of information may be exchanged in various manners. An example thereof will be described below.

ID designation method
Period designation method
Area designation method
Dump method The ID designation method is a method of acquiring information corresponding to an ID using the ID assigned in advance to identify information managed by the communication control device 60. For example, it is assumed that the communication control device 60$_1$ manages the base station device 40 with ID: AAA. At this time, the communication control device 60$_2$ designates the ID: AAA and makes an information acquisition request to the communication control device 60$_1$. After receiving the request, the communication control device 60$_1$ searches for information about ID: AAA, and make notification of the registration information of the base station device 40 and the communication parameter information by a response.

In the period designation method, a specific period is designated, and information satisfying a predetermined condition can be exchanged during the period.

An example of the predetermined condition includes the presence or absence of information update. For example, in a case where acquisition of communication device information in a specific period is designated by a request, registration information of the base station device 40 newly registered in the period, registration information and information about the communication parameter of the base station device 40 whose communication parameter has been changed may be notified by a response.

An example of the predetermined condition includes whether the communication control device 60 performs recording. For example, in a case where acquisition of the communication device information in a specific period is designated by the request, the registration information of the base station device 40 recorded by the communication control device 60 in the specific period and the information about the communication parameter can be notified in response. Furthermore, the latest information in the period can be notified. Alternatively, the update history may be notified for each piece of information.

In the area designation method, a specific area is designated, and information belonging to the area is exchanged. For example, in a case where acquisition of communication device information in a specific area is designated by a request, registration information of the base station device 40 installed in the area and information about the communication parameter may be notified by a response.

The dump method is a method of providing all information recorded by the communication control device 60. At least information about the base station device 40 and area information are desirably provided by a dump method.

The above description of the information exchange between the communication control devices 60 is based on the pull method. That is, it is a form in which information corresponding to the parameter designated by the request is responded, and can be implemented by the HTTP GET method as an example. However, the present invention is not limited to the pull method, and information may be actively provided for another communication control device 60 by the push method. The push manner may be implemented by, for example, the HTTP POST method.

[Command/Request Procedure]

The communication control devices 60 may execute a command and/or a request with each other. Specifically, an example includes reconfiguration of the communication parameter of the base station device 40 can be cited. For example, when it is determined that the base station device 40$_1$ managed by the communication control device 60$_1$ receives a large amount of interference from the base station device 40$_4$ managed by the communication control device 60$_2$, the communication control device 60$_1$ may request the communication control device 60$_2$ to change the communication parameter of the base station device 40$_4$.

Another example includes reconfiguration of area information. For example, in a case where incompletion is found in calculation of the coverage information and the protection area information about the base station device 40$_4$ managed by the communication control device 60$_2$, the communication control device 60$_1$ may request the communication control device 60$_2$ to reconfigure the area information. Besides this, the area information reconfiguration request may be made for various reasons.

<5-8. Acquisition of Information about Communication Control>

Figure 27:
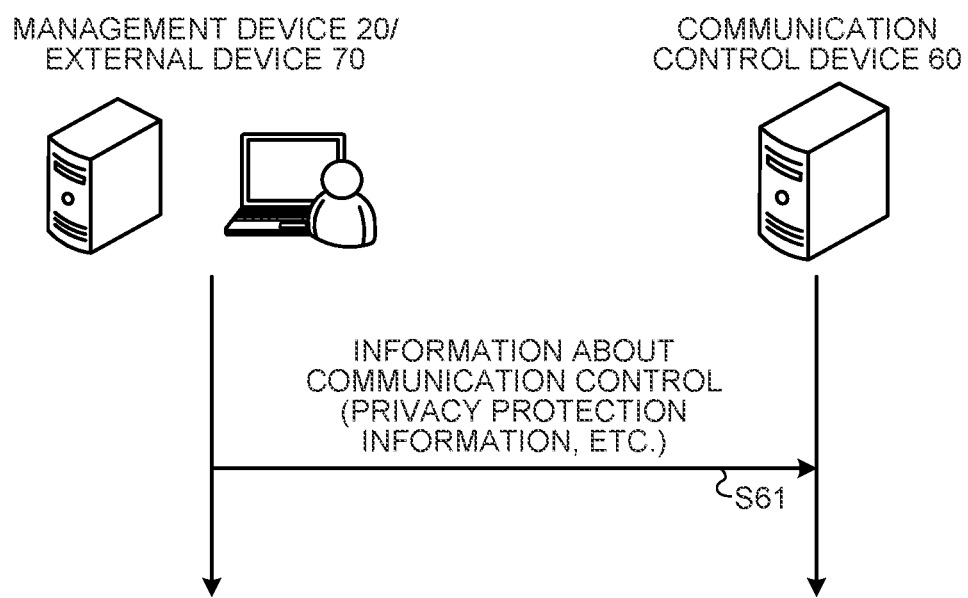
FIG. 27 is a sequence diagram for explaining an acquisition procedure of information about communication control.

The communication control device 60 can acquire information about communication control from another device. FIG. 27 is a sequence diagram for describing an acquisition procedure of information about communication control. The communication control device 60 acquires, for example, information about communication control transmitted from the management device 20, the external device 70, or the like.

The information about communication control is information about communication control of the base station device 40, the terminal device 30, and the like. The information about communication control may be information about privacy protection (hereinafter, referred to as privacy protection information). The privacy protection information is, for example, privacy level information desired by a user of a high priority radio system such as the communication system 1. Here, the "privacy protection information" is a concept including not only personal information but also information that the user of the high priority radio system does not want others to know, such as confidential information. The privacy protection information will be described later in detail in <6-1. Privacy protection information>.

The communication control device 60 may acquire information about communication control such as privacy protection information from the external device 70. For example, the communication control device 60 may acquire information about communication control via a web interface or the like provided for the user of the high priority radio system. Of course, the communication control device 60 may acquire information about the communication control from a management device (for example, the management device 20) of the high priority radio system or a device (for example, a database server or the like) accompanying the management device.

Furthermore, the communication control device 60 may acquire information about communication control such as privacy protection information from another communication control device 60 or another communication device. The communication control device 60 may directly acquire information about communication control from the base station device 40 or the intermediate device 50 via a registration procedure request or the like.

Furthermore, for example, in a case where information about communication control such as privacy protection information is stored in an external database server or the like, the communication control device 60 may acquire the information by the communication control device 60 itself accessing the external database server in which the information is stored.

<5-9. Representative Operation Flow>

Next, a representative operation flow according to interference protection calculation (interference calculation) will be described.

Figure 28:
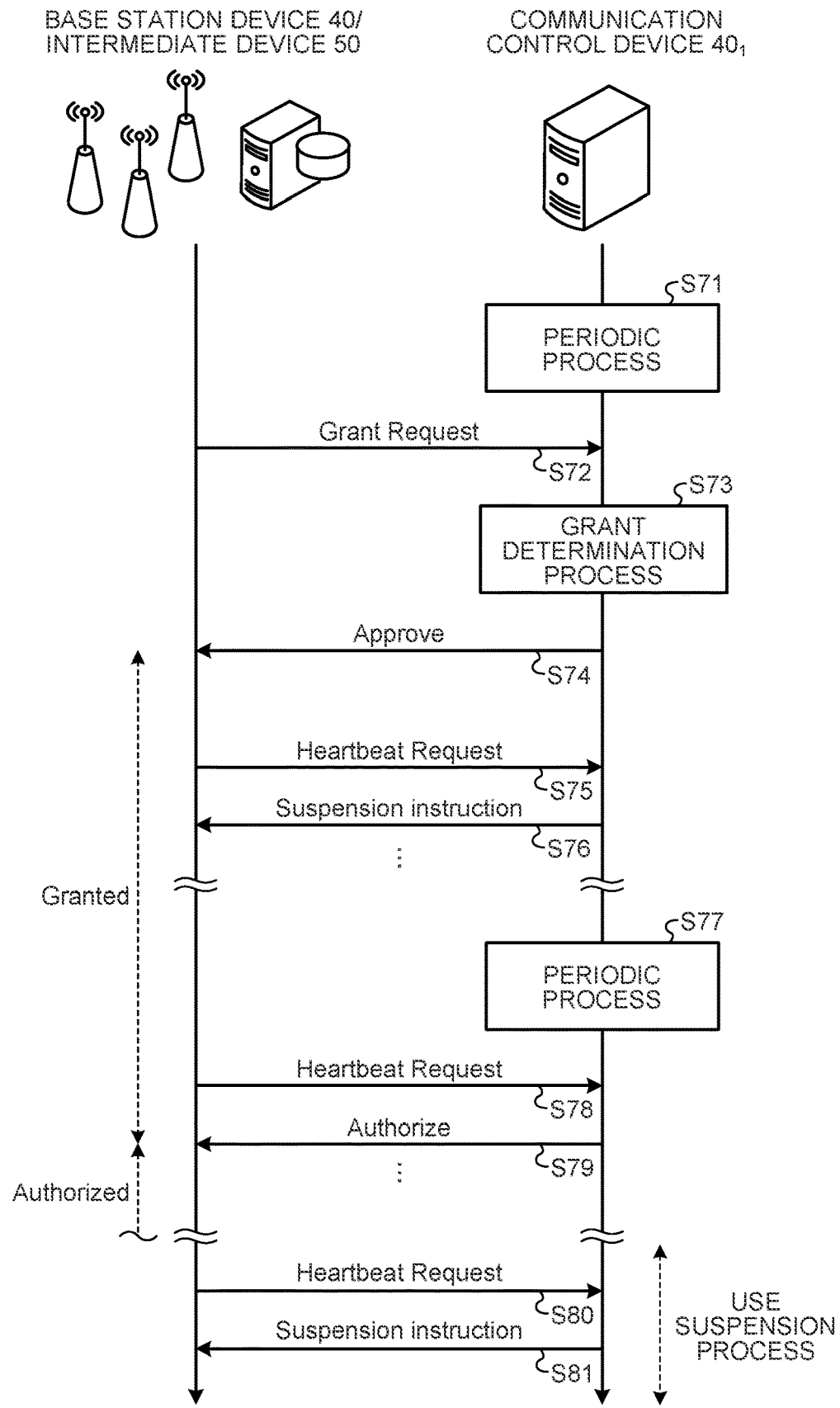
FIG. 28 is a sequence diagram illustrating an example of an operation related to a grant.

FIG. 28 is a sequence diagram illustrating an example of an operation related to the grant. Specifically, FIG. 28 is a sequence diagram illustrating an operation of the communication system 2 corresponding to procedures of <5-3. Spectrum grant procedure> and <5-4. Spectrum use notification>. Note that the operation flow illustrated in FIG. 28 is merely an example, and various changes are made depending on a state or the like in which the base station device 40, the communication control device 60, and the intermediate device 50 are placed.

First, the communication control device $60_1$ executes the periodic process at the execution timing of the periodic process (step S71). The periodic process is a process of executing information synchronization between the communication control devices 60 and calculation related to primary system protection. The periodic process is, for example, coordinated periodic activities among SASs (CPAS) described in Non Patent Literature 10 and Non Patent Literature 11. In the following description, the periodic process may be referred to as periodic protection calculation. The execution timing of the periodic process is, for example, 24 hours after the previous execution of the periodic process. Of course, the execution interval of the periodic process is not limited to 24 hours.

Figure 29:
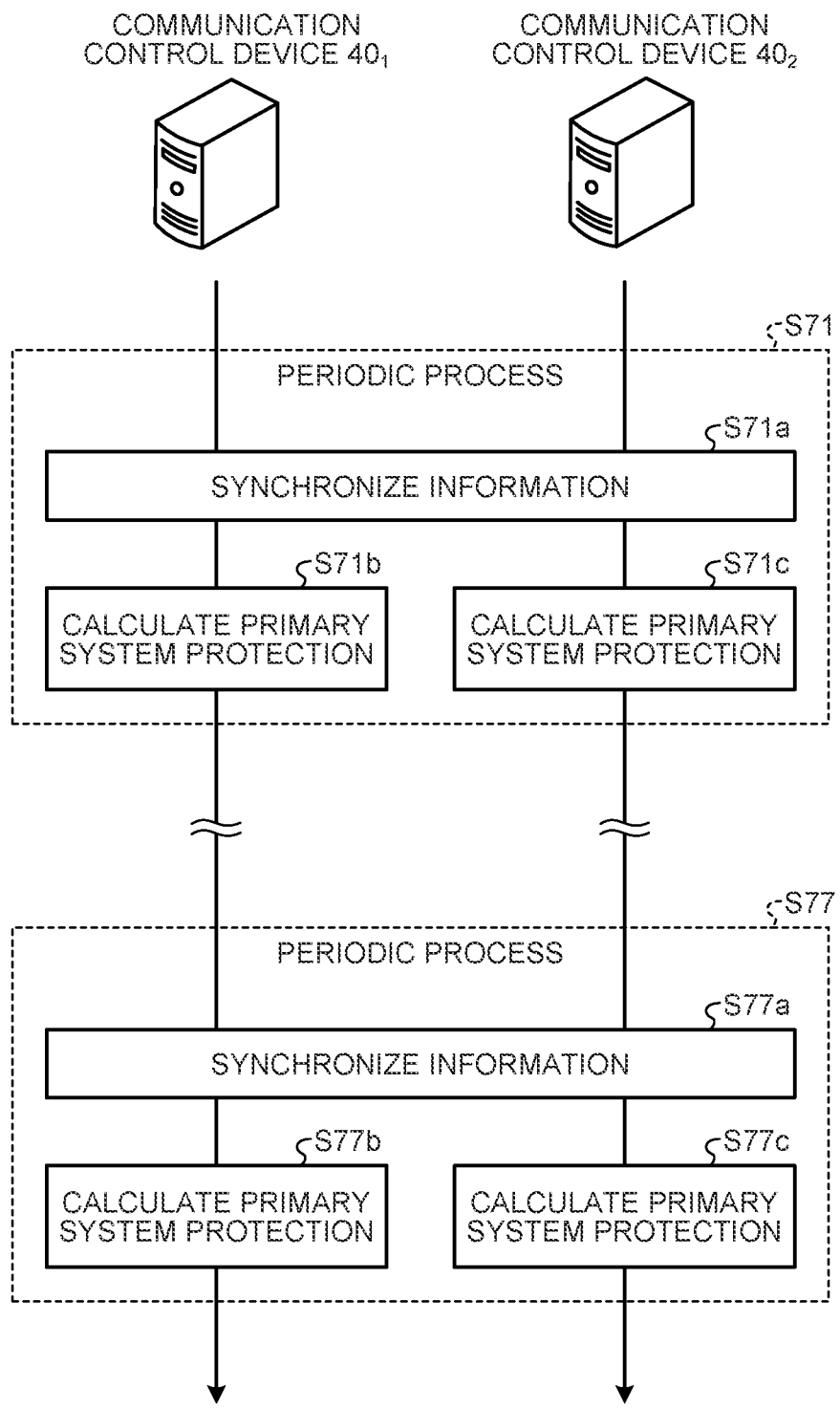
FIG. 29 is a diagram illustrating specific processing contents of the periodic process.

FIG. 29 is a diagram illustrating specific processing contents of the periodic process. In the example of FIG. 29, the communication control device $60_1$ and the communication control device $60_2$ perform information synchronization and primary system protection calculation. Of course, the number of communication control devices 60 that perform the periodic process (information synchronization or the like) may be more than two.

As illustrated in FIG. 29, each of the plurality of communication control devices 60 executes the periodic process (step S71). First, each of the plurality of communication control devices 60 synchronizes information with another communication control device 60 (step S71a). Then, each of the plurality of communication control devices 60 performs primary system protection calculation (step S71b, step S71c). At this time, the communication control device 60 may calculate an estimated value of an amount of interference, a residual interference margin, or the like that can be individually given to the primary system by each communication node (for example, the base station device 40).

Returning to FIG. 28, the base station device 40 or the intermediate device 50 transmits a grant request to the communication control device $60_1$ (step S72). The transmission of the grant request may be performed by the transmission unit 442 of the base station device 40 or the transmission unit 542 of the intermediate device 50. In the present embodiment, the base station device 40 or the intermediate device 50 assigns, to a grant request, information about a use mode of frequency resources (radio wave resources) allocated as a result of the grant request. For example, the base station device 40 or the intermediate device 50 adds information indicating the application and details of the grant to the grant request.

The acquisition unit 641 of the communication control device $60_1$ acquires the grant request to which the use mode information is added. The communication control device $60_1$ performs the process (that is, a process related to the grant) related to the frequency resources based on the use mode information (step S73). For example, the communication control device $60_1$ performs the grant determination process for allocating an available spectrum to the base station device 40 based on the use mode information.

After allocating the frequency, the communication control device $60_1$ transmits the grant response to the base station device 40 or the intermediate device 50. In the example of FIG. 28, the communication control device $60_1$ make notification of the success of the grant request (approve illustrated in FIG. 28) as the grant response (step S74). The acquisition unit 441 of the base station device 40 or the acquisition unit 541 of the intermediate device 50 acquires the grant response from the communication control device $60_1$. Due to the success of the grant request, the grant state of the base station device 40 transitions from idole to granted as illustrated in FIG. 24. The base station device 40 performs setting of each unit based on the allocated grant.

Subsequently, the base station device 40 or the intermediate device 50 transmits a heartbeat request to the communication control device $60_1$ (step S75). Then, the acquisition unit 641 of the communication control device $60_1$ acquires the transmitted heartbeat request. Then, the communication control device $60_1$ transmits a heartbeat response.

Note that, in the example of FIG. 28, the grant allocated to the base station device 40 has not passed the periodic process (for example, the CPAS) yet. Therefore, in the example of FIG. 28, the communication control device 60$_1$ cannot approve the start of the radio wave transmission. Therefore, the communication control device 60$_1$ transmits a suspension instruction of radio wave transmission as a heartbeat response (step S76).

Thereafter, the base station device 40 or the intermediate device 50 continues to transmit the heartbeat request at the heartbeat interval notified from the communication control device 60$_1$. In response to the heartbeat request, the communication control device 60$_1$ continues to transmit the instruction to stop the radio wave transmission as a heartbeat response until the next periodic process is completed.

When the execution timing of the periodic process arrives, each of the plurality of communication control devices 60 including the communication control device 60$_1$ executes the periodic process (step S77). For example, as illustrated in FIG. 29, each of the plurality of communication control devices 60 synchronizes information with another communication control device 60 (step S77$a$). Then, each of the plurality of communication control devices 60 performs primary system protection calculation (step S77$b$, step S77$c$). This protection calculation is an example of interference calculation in the embodiment.

Subsequently, the base station device 40 or the intermediate device 50 transmits a heartbeat request to the communication control device 60$_1$ (step S78). Then, the acquisition unit 641 of the communication control device 60$_1$ acquires the transmitted heartbeat request. Then, the communication control device 60$_1$ transmits the heartbeat response. At this time, since the grant allocated to the base station device 40 has passed the periodic process, the communication control device 60$_1$ can approve the start of the radio wave transmission to the base station device 40 that has transmitted the heartbeat request. Therefore, the communication control device 60$_1$ transmits success (authorize illustrated in FIG. 28) of the heartbeat response as the heartbeat response (step S79). With the success of the heartbeat request, the grant state of the base station device 40 transitions from granted to authorized as illustrated in FIG. 24. The base station device 40 performs radio communication by controlling the radio communication unit 41 based on the allocated grant.

As described above, the state of the grant (the state indicating a permission state of radio wave transmission) transitions according to the result of the heartbeat procedure. Various purposes are defined in the heartbeat procedure, and one of them is a radio wave suspension instruction of the base station device 40 when the radio wave of the existing system (for example, on-board radar) in the same band is used. For example, when it is determined that an existing system such as the communication system 1 is using the radio wave, the communication control device 60 is required to stop the radio wave of all the base station devices 40 that can cause interference within a predetermined time (for example, within 300 seconds). At this time, since it is assumed that push notification of the suspension instruction is complicated in implementation, the communication control device 60 may issue the radio wave suspension instruction using a heartbeat response. In the following description, the process for causing the base station device 40 to stop the use of the frequency resources, which is executed by the communication control device 60, is referred to as "use suspension process of frequency resources" or "grant suspension process".

For example, the base station device 40 or the intermediate device 50 transmits a heartbeat request to the communication control device 60$_1$ (step S80). Then, the communication control device 60$_1$ acquires the transmitted heartbeat request. Then, the communication control device 60$_1$ determines whether the primary system such as the communication system 1 is using the radio wave. When it is determined that the primary system is performing radio wave utilization related to predetermined frequency resources, the communication control device 60$_1$ transmits a suspension instruction of radio wave transmission as a heartbeat response (step S81). The base station device 40 stops the transmission of the radio wave related to the predetermined frequency resources. As a result, the grant state of the base station device 40 transitions from authorized to idle (or granted) as illustrated in FIG. 24. Alternatively, as illustrated in FIG. 24, the grant state of the base station device 40 transitions from granted to idole.

6. Operation Related to Privacy Protection

Next, an operation related to privacy protection of the communication control device 60 will be described. As described above, in the future, with the diversification of radio wave use modes, it is assumed that various users having different privacy protection requirements (also referred to as security requirements) are mixed. Therefore, the communication control device 60 performs the following operation to implement communication control that enables privacy protection (also referred to as security protection) of a high priority radio system (for example, the communication system 1) while enabling spectrum access.

In the following description, a radio system that uses the radio wave in preference to a predetermined radio system may be referred to as a high priority radio system. The high priority radio system (first radio system) may be the communication system 1 or the radio wave utilization device 10. Furthermore, the predetermined radio system (second radio system) may be the communication system 2, or may be the base station device 40 or the terminal device 30. In the following description, the predetermined radio system may be simply referred to as a communication device.

Before describing the operation related to privacy protection of the communication control device 60, privacy protection information will be described.

<6-1. Privacy Protection Information>

The privacy protection information is, for example, information about privacy protection (also referred to as security protection) requested by a user of the high priority radio system. Here, the "privacy protection information" is a concept including not only personal information but also confidential information. An example of the privacy protection information includes information about a range related to privacy protection (hereinafter, referred to as range information). Note that the "range" here includes not only a temporal range (hereinafter, referred to as a time range) but also a spatial range (hereinafter, referred to as a space range). Of course, the "range" may be a temporal and spatial range (hereinafter, referred to as a time space range) combining a time range and a space range.

An example of the range information includes information about a range (hereinafter, referred to as a limited range) related to restriction of radio wave use. When the "range" of the range information means a time range, the limited range means a limited time range. When the "range" of the range information means a space range, the limited range means a limited space range. When the "range" of the range information means a time space range, the limited range means a limited time space range. Specific examples of the limited time range information and the limited space range information will be described below.

Specific Example of Limited Time Range Information

An example of the limited time range information includes radio wave use time zone information. The radio wave use time zone information is information about a time zone in which the high priority radio system uses the radio wave. The radio wave use time zone information may be information in a time unit such as 14:00 to 16:00, or may be information in a day unit such as a day of the week. Certainly, the time unit may be shorter, and may be minutes, seconds, or less. When the time zone changes periodically, the radio wave use time zone information may include a change period and time zone information after the change. The user of the high priority radio system does not necessarily need to notify the communication control device of accurate radio wave use time zone information, and may notify the communication control device 60 of the radio wave use time zone information with a certain margin.

Specific Example of Limited Space Range Information

Figure 30:
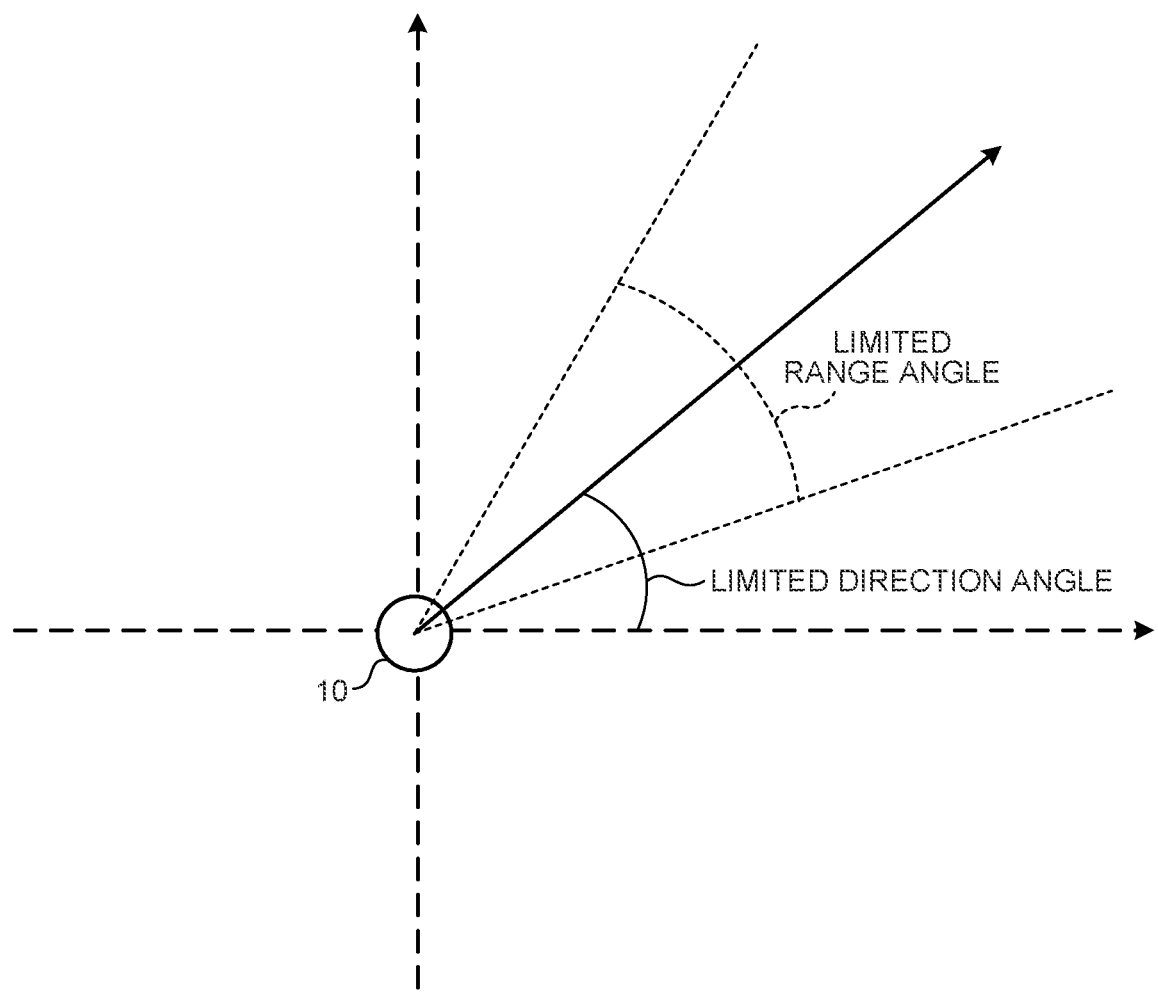
FIG. 30 is a diagram for explaining incident beam direction limiting information.

An example of the limited space range information includes the incident beam direction limiting information. The incident beam direction limiting information is, for example, information indicating a direction in which the beam from the communication device is not desired to be directed to the position of the high priority radio system. FIG. 30 is a diagram for describing incident beam direction limiting information. For example, the incident beam direction limiting information includes information indicating that it is desirable to avoid a beam of the communication device from a 90 degree direction (directly north) with directly east as 0 degrees when viewed from the high priority radio system. Furthermore, the incident beam direction limiting information may include, in addition to the direction, information about the spread of the angle to be avoided with the direction as the center. The maximum separation distance to which the above limitation is applied may be included.

Figure 31:
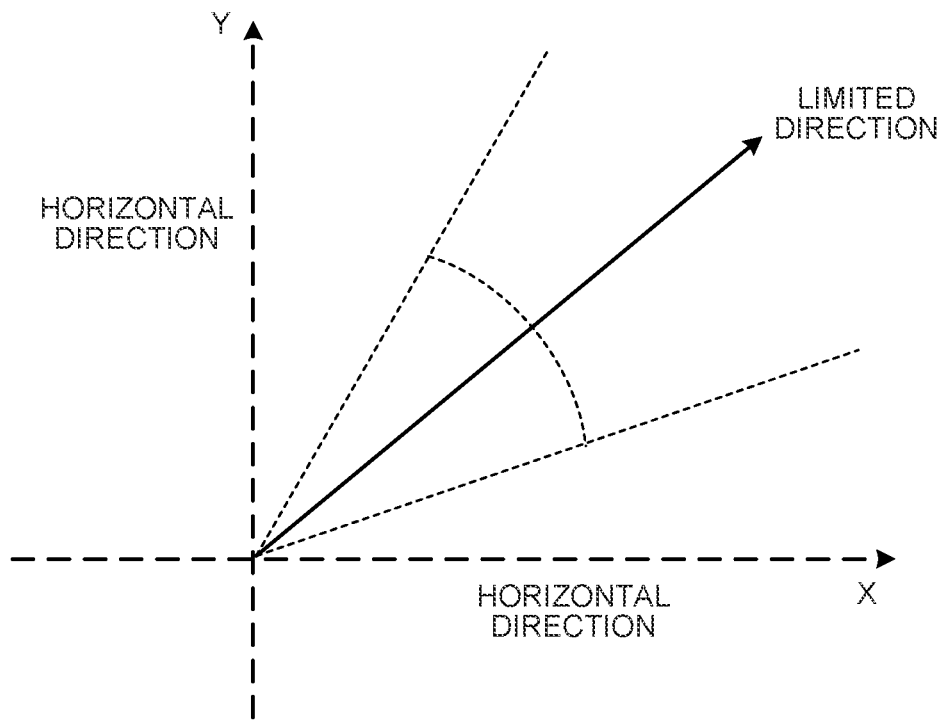
FIG. 31 is a diagram for explaining incident beam direction limiting information.
Figure 32:
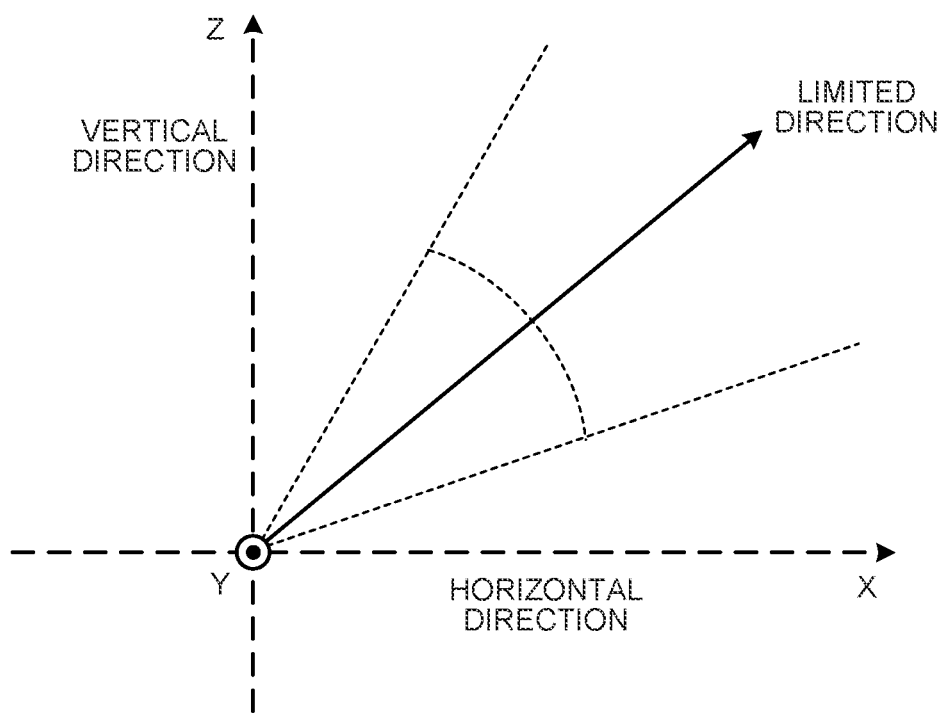
FIG. 32 is a diagram for explaining incident beam direction limiting information.

Note that the incident beam direction limiting information may be two-dimensional information or three-dimensional information. For example, as illustrated in FIG. 31, the incident beam direction limiting information may be two-dimensional information indicated with the X-axis direction in the horizontal direction and the Y-axis direction in the horizontal direction that intersects perpendicularly to the X-axis as a reference. For example, as illustrated in FIG. 32, the incident beam direction limiting information may be three-dimensional information indicated with the X axis, the Y axis, and the Z axis with the Z axis intersecting perpendicularly to the X axis and the Y axis as a reference. In addition, the incident beam direction limiting information may be angular area information.

<6-2. Communication Control Process>

Next, the communication control process performed by the communication control device 60 will be described. The communication control process is a process in which the communication control device 60 notifies the communication devices such as the terminal device 30 and the base station device 40 of the communication parameter to control communication of the communication devices. In the communication control process of the present embodiment, it is possible to realize privacy protection of a high priority radio system while realizing spectrum access of the high priority radio system (for example, the radio wave utilization device 10) and the communication device (for example, the base station device 40).

Figure 33:
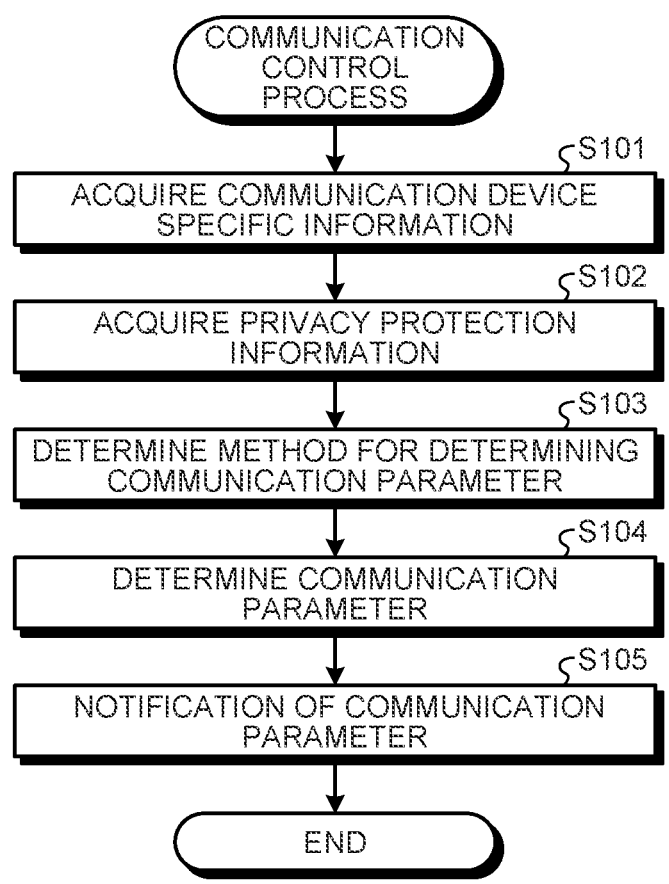
FIG. 33 is a flowchart illustrating an example of a communication control process according to an embodiment of the present disclosure.

FIG. 33 is a flowchart illustrating an example of a communication control processing according to the embodiment of the present disclosure. The communication control process is executed by the control unit 64 of the communication control device 60, for example. The communication control process will be described below with reference to the flowchart of FIG. 33.

[First Acquisition Unit]

First, the first acquisition unit 641A of the communication control device 60 acquires specific information (hereinafter, referred to as communication device-specific information) of one or a plurality of communication devices (for example, the base station device 40) (step S101). The communication device specific information includes, for example, ID information, installation position information, and wireless interface technical information about the communication device. At this time, for example, the first acquisition unit 641A may acquire information specific to the communication device by receiving the registration procedure request described in <5-1. Registration procedure> described above.

Next, the second acquisition unit 641B of the communication control device 60 acquires the privacy protection information about the request of the user of the high priority radio system (step S102). The privacy protection information is, for example, limited range information such as limited time range information or limited space range information. At this time, the second acquisition unit 641B may acquire the privacy protection information via, for example, a web interface or the like provided for the user of the high priority radio system.

Furthermore, for example, the second acquisition unit 641B may acquire the privacy protection information directly from the communication device such as the base station device 40 or the intermediate device 50 via the registration procedure request or the like integrally with the first acquisition unit 641A. Furthermore, for example, in a case where the privacy protection information is stored in an external server device (for example, a database server or the like), the second acquisition unit 641B may acquire the privacy protection information by accessing the server device in which the information is stored.

Next, the first determination unit 642A of the communication control device 60 determines a method of determining a communication parameter related to control of the communication device (for example, the base station device 40) (step S103). At this time, the first determination unit 642A may determine the method of determining the communication parameter based on the information specific to the communication device acquired by the first acquisition unit and the privacy protection information acquired by the second acquisition unit.

Note that the communication parameter changes depending on a result of permission or non-permission of the radio wave use by the communication device. That is, the communication parameter can be considered to include information about permission or non-permission of radio wave use. Therefore, the method of determining the communication parameter may include a determination method (permission method) as to whether to permit the communication device to use the radio wave.

In the following description, it is assumed that the privacy protection information is limited range information such as limited time range information and limited space range information. At this time, the method determined by the first determination unit 642A may be a method associated with a range identified based on the range information. Examples of the range identified based on the range information include a range outside the limited range (hereinafter, also referred to as a first range) and a range within the limited range (hereinafter, also referred to as a second range).

Hereinafter, specific examples of the method associated with the range outside the limited range (first range) and the method associated with the range within the limited range (second range) will be described. Note that the following method is merely an example, and the present invention is not limited to the following method.

Specific Example of a Method Associated with a Range Outside Limited Range (First Range)

First, a method of associated with a range outside the limited range (first range) will be described. When the limited range is the limited time range, the first determination unit 642A may determine the method based on the radio wave use time zone limiting information. Furthermore, when the limited range is the limited space range, the first determination unit 642A may determine the method based on the incident beam direction limiting information.

(Method 1-1: Outside Limited Time Range)

For example, when the time at which the communication device uses the radio wave is outside the limited time range, the first determination unit 642A determines to use the irregular permission method (hereinafter, referred to as a first irregular permission method) as the method of permitting the communication device to use the radio wave. The irregular permission method is a determination method including at least an irregular element in a determination element (also referred to as a discrimination element) for determining permission or non-permission. The irregular element is an element (information) in which it is difficult to find regularity, such as random information (for example, a random value or a random signal), hash information, and cryptographic information. The irregular element can also be rephrased as an element used to make it difficult for a user to find regularity (for example, regularity in which transmission of the radio wave is not permitted) of a predetermined event. The non-permission method (first irregular permission method) will be described in detail later.

(Method 1-2: Outside Limited Space Range)

For example, in a case where the communication device is located outside the limited space range (or in a case where the radio wave is emitted from the limited space (limited direction) toward the high priority radio system), the first determination unit 642A determines to use the irregular permission method (hereinafter, referred to as a second irregular permission method) as the method of permitting the communication device to use the radio wave. As described above, the irregular permission method is a determination method including at least an irregular element in a determination element (also referred to as a discrimination element) for determining permission or non-permission. The non-permission method (second irregular permission method) will be described in detail later.

Specific Example of Method Associated with a Range within Limited Range (Second Range)

Next, a method of associated with a range within the limited range (second range) will be described. When the limited range is the limited time range, the first determination unit 642A may determine the method based on the radio wave use time zone limiting information. Furthermore, when the limited range is the limited space range, the first determination unit 642A may determine the method based on the incident beam direction limiting information.

(Method 2-1: Within Limited Time Range)

For example, in a case where the time at which the communication device uses the radio wave is within the limited time range, the first determination unit 642A makes a determination by determination method (hereinafter, referred to as a first interference consideration method) including at least information about the amount of interference from the high priority radio system to the communication device in the determination element for determining permission or non-permission as the method of permitting the communication device to use the radio wave. At this time, the first determination unit 642A may use a permission method (hereinafter, referred to as a first bidirectional interference consideration method) in which bidirectional interference is considered as the first interference consideration method. Here, the "bidirectional interference" refers to both interference from the high priority radio system to the communication device and interference from the communication device to the high priority radio system. The bidirectional interference consideration method (first bidirectional interference consideration method) will be described in detail later.

(Method 2-2: Within Limited Space Range)

For example, in a case where the communication device is located within the limited space range (or in a case where the radio wave is emitted from the limited space (limited direction) toward the high priority radio system), the first determination unit 642A makes a determination by determination method (hereinafter, referred to as a second interference consideration method) including at least information about the amount of interference from the high priority radio system to the communication device in a determination element for determining permission or non-permission as a method of permitting the communication device to use the radio wave. At this time, the first determination unit 642A may use a permission method (hereinafter, referred to as a second bidirectional interference consideration method) in which bidirectional interference is considered as the second interference consideration method. As described above, the "bidirectional interference" refers to both interference from the high priority radio system to the communication device and interference from the communication device to the high priority radio system. The bidirectional interference consideration method (second bidirectional interference consideration method) will be described in detail later.

Next, the second determination unit 642B of the communication control device 60 determines the communication parameter of one or a plurality of communication devices (for example, the base station device 40) based on the method determined in step S103 (step S104). For example, the second determination unit 642B determines permission or non-permission of the radio wave shared use by the communication device based on the method determined in step S103, and determines the communication parameter of the communication device based on the determination. Hereinafter, the operation of the second determination unit 642B for each method described in step S103 will be described.

(Method 1-1: Outside Limited Time Range)

When the method determined by the first determination unit 642A is the first irregular permission method, the second determination unit 642B determines permission or non-permission of radio wave shared use by the communication device (for example, the base station device 40) based on the first irregular permission method. Then, the second determination unit 642B determines the communication parameter of the communication device based on the determination result. As described above, the irregular permission method (first irregular permission method) is a determination method including at least an irregular element in a determination element for determining permission or non-permission.

For example, the second determination unit 642B randomly sets the non-permission time outside the limited time range (outside the radio wave use time zone). For example, the second determination unit 642B sets the non-permission time based on the random value. Then, the second determination unit 642B does not permit the communication device to use the radio wave during the non-permission time, and permits the communication device to use the radio wave during a time other than the non-permission time.

Furthermore, for example, the second determination unit 642B randomly determines a communication device to be inhibited. For example, the second determination unit 642B determines a communication device to be inhibited based on random information.

Note that the decision of permission or non-permission may not be completely random. That is, the determination element for determining permission or non-permission may include a regular element in addition to an irregular element. For example, the second determination unit 642B may use time information as a determination element in addition to random information. At this time, the second determination unit 642B may be configured so that the longer the elapsed time after entering the limited time range for shared use, the more difficult or easier it is to be permitted. Furthermore, for example, the second determination unit 642B may use the position information about the communication device as a determination element in addition to the random information. At this time, the second determination unit 642B may be configured so that the farther the distance from the high priority radio system is, the more difficult or easier it is to be permitted.

Fixed permission or non-permission may identify position information and operation parameter information (such as a beam) of a high priority radio system, but irregular permission may reduce the possibility of identifying the information. In addition, by irregularly changing the communication device to be inhibited, a decrease in utility can be dispersed, and a decrease in utility per communication device can be alleviated.

(Method 1-2: Outside Limited Space Range)

When the method determined by the first determination unit 642A is the second irregular permission method, the second determination unit 642B determines permission or non-permission of radio wave shared use by the communication device (for example, the base station device 40) based on the second irregular permission method. Then, the second determination unit 642B determines the communication parameter of the communication device based on the determination result. As described above, the irregular permission method (second irregular permission method) is a determination method including at least an irregular element in a determination element for determining permission or non-permission.

For example, the second determination unit 642B does not permit shared use of the radio wave randomly outside the limited space range (for example, a direction other than the direction limited by the incident beam direction limiting information). For example, the second determination unit 642B sets the non-permission range to a range outside the limited space range (for example, a direction other than the limited direction limited by the incident beam direction limiting information) based on the random value. Then, the second determination unit 642B does not permit the communication device to use the radio wave in the non-permission range, and permits the communication device to use the radio wave in a range other than the non-permission range.

Furthermore, for example, the second determination unit 642B randomly determines a communication device to be inhibited. For example, the second determination unit 642B determines a communication device to be inhibited based on a random value.

Note that the decision of permission or non-permission may not be completely random. That is, the determination element for determining permission or non-permission may include a regular element in addition to an irregular element. For example, the second determination unit 642B may use time information as a determination element in addition to random information. At this time, the second determination unit 642B may be configured so that the longer the elapsed time after entering the limited time range for shared use, the more difficult or easier it is to be permitted. Furthermore, for example, the second determination unit 642B may use the position information about the communication device as a determination element in addition to the random information. At this time, the second determination unit 642B may be configured so that the farther the distance from the high priority radio system is, the more difficult or easier it is to be permitted.

Fixed permission or non-permission may identify the radio wave use status of the high priority radio system is specified, but irregular permission may reduce the possibility of identifying the radio wave use status of the high priority radio system. In addition, by irregularly changing the communication device to be inhibited, a decrease in utility can be dispersed, and a decrease in utility per communication device can be alleviated.

(Method 2-1: Within Limited Time Range)

When the method determined by the first determination unit 642A is the first interference consideration method, the second determination unit 642B determines permission or non-permission of radio wave shared use by the communication device (for example, the base station device 40) based on the first interference consideration method. For example, when the first interference consideration method is the first bidirectional interference consideration method, the second determination unit 642B determines permission or non-permission of radio wave shared use by the communication device based on the first bidirectional interference consideration method.

As described above, the bidirectional interference consideration method (first bidirectional interference consideration method) is a determination method of determining permission or non-permission in consideration of both interference from the high priority radio system to the communication device and interference from the communication device to the high priority radio system.

For example, the second determination unit 642B permits a communication device in a state (hereinafter, referred to as a first state) in which the amount of interference from the high priority radio system to the communication device is smaller than the allowable amount of interference of the communication device and the amount of interference from the communication device to the high priority radio system is smaller than the allowable amount of interference of the high priority radio system to share and use the radio wave.

More specifically, the second determination unit 642B calculates an amount of interference $I_{P-S}$ from the high priority radio system to the communication device and an amount of interference $I_{S-P}$ from the communication device to the high priority radio system within the limited time range (for example, within the radio wave use time zone of the high priority radio system). When the amount of interference $I_{P-S}$ is equal to or less than the allowable amount of interference of the communication device and the amount of interference $I_{S-P}$ is equal to or less than the allowable amount of interference of the high priority radio system (first state), the second determination unit 642B permits the communication device to share and use the radio wave. In other cases, the second determination unit 642B may prohibit the communication device from sharing and using the radio wave.

Even when the communication device is permitted to use the radio wave in this state (first state), the radio wave interference from the high priority radio system to the communication device is small, so that there is little possibility that the privacy protection information of the high priority radio system is inferred through detection of the radio wave interference by the communication device. By permitting the communication device to use the radio wave within a possible range within the radio wave use time zone of the high priority radio system, the possibility of identifying the radio wave use status of the high priority radio system can be reduced.

(Method 2-2: Within Limited Space Range)

When the method determined by the first determination unit 642A is the second interference consideration method, the second determination unit 642B determines permission or non-permission of radio wave shared use by the communication device (for example, the base station device 40) based on the second interference consideration method. For example, when the second interference consideration method is the second bidirectional interference consideration method, the second determination unit 642B determines permission or non-permission of the radio wave shared use by the communication device based on the second bidirectional interference consideration method.

As described above, the bidirectional interference consideration method (second bidirectional interference consideration method) is a determination method of determining permission or non-permission in consideration of both interference from the high priority radio system to the communication device and interference from the communication device to the high priority radio system.

For example, the second determination unit 642B permits a communication device in a state (first state) in which the amount of interference from the high priority radio system to the communication device is smaller than the allowable amount of interference of the communication device and the amount of interference from the communication device to the high priority radio system is smaller than the allowable amount of interference of the high priority radio system to share and use the radio wave.

More specifically, the second determination unit 642B calculates an amount of interference $I_{P-S}$ from the high priority radio system to the communication device and an amount of interference $I_{S-P}$ from the communication device to the high priority radio system within the limited space range (for example, the direction limited by the incident beam direction limiting information). Then, when the amount of interference $I_{P-S}$ is equal to or less than the allowable amount of interference of the communication device and the amount of interference $I_{S-P}$ is also equal to or less than the allowable amount of interference of the high priority radio system, the second determination unit 642B permits the communication device to share and use the radio wave. In other cases, the second determination unit 642B may prohibit the communication device from sharing and using the radio wave.

Even when the communication device is permitted to use the radio wave in this state (first state), the radio wave interference from the high priority radio system to the communication device is small, so that there is little possibility that the privacy protection information of the high priority radio system is inferred through detection of the radio wave interference by the communication device. By permitting the communication device to use the radio wave within a possible range within the radio wave use time zone of the high priority radio system, the possibility of identifying the radio wave use status of the high priority radio system can be reduced.

Next, the notification unit 643 of the communication control device 60 notifies the communication device (for example, the base station device 40) of the communication parameter determined in step S104 (step S105). When the notification is completed, the control unit 64 of the communication control device 60 ends the communication control process.

7. Modifications

The above-described embodiment illustrates an example, and various modifications and applications are possible.

<7-1. Modification Related to Permission or Non-Permission of Radio Wave Use>

For example, in the example of method 2-1 and method 2-2 in step S104 described above, when the communication device (for example, the base station device 40) is not in the first state, the communication control device 60 does not permit the communication device to use the radio wave. However, even when the communication device is not in the first state, the communication control device 60 may permit the communication device to use the radio wave by taking predetermined measures to implement privacy protection of the high priority radio system (for example, the radio wave utilization device 10).

For example, the communication control device 60 takes "predetermined measures" to implement privacy protection of the high priority radio system for a communication device in a state (hereinafter, referred to as a second state) in which the amount of interference from the high priority radio system is larger than the allowable amount of interference of communication and the amount of interference to the high priority radio system is smaller than the allowable amount of interference of the high priority radio system. The predetermined measures are, for example, measures for reducing the possibility that the position information or the operation parameter information (such as a beam) of the high priority radio system is characterized. As the predetermined measures, the following measures 1 and measures 2 can be assumed.

[Measures 1]

Measures 1 are measures to perform handling without changing the use spectrum and power of the communication device (for example, the base station device 40).

For example, the notification unit 643 of the communication control device 60 notifies the communication device (for example, the base station device 40) in the second state of the communication parameter determined in step S104, and makes predetermined notification for causing the second radio system to perform an operation for implementing privacy protection of the high priority radio system as "predetermined measures".

For example, the notification unit 643 notifies the communication device in the second state of the communication parameter determined in step S104, and makes a notification for controlling the data contents of the data transmission performed by the communication device as "predetermined measures" so as to make it difficult to detect interference from the high priority radio system due to the communication state. For example, the notification unit 643 performs notification for causing the communication device to set a frame such as an almost blank subframe (ABS) or a special subframe. Note that this measures 1 may be used for a communication device (for example, a communication device in a limited range) that is not in the second state.

By taking this measures, it is difficult to detect interference from the high priority radio system due to the communication state, and thus, it is possible to reduce the possibility that the position information or the operation parameter information (such as a beam) of the high priority radio system is identified.

[Measures 2]

The measures 2 are a method of performing handling without others recognizing that the interference from the high priority radio system is the cause even when it is necessary to change the use spectrum and power of the communication device (for example, the base station device 40).

For example, the notification unit 643 of the communication control device 60 notifies the communication device in the second state of the communication parameter using a predetermined notification method for implementing privacy protection of the high priority radio system.

In order to realize spectrum access, it is assumed that a notification method (hereinafter, referred to as a first notification method) for the purpose of protecting a high priority radio system and a notification method (hereinafter, referred to as a second notification method) for the purpose of coexistence between communication devices (for example, between the base station devices 40) are required as a method in which the communication control device 60 notifies the communication device (for example, the base station device 40) of a communication parameter.

The first notification method is a notification method including explicitly or implicitly notifying a communication device that use of this spectrum does not hinder the high priority radio system from using the radio wave (for example, it does not give fatal interference), or that this spectrum hinders the high priority radio system from using the radio wave (for example, it gives fatal interference). This notification method is, for example, a notification method in the case of making a notification of the available spectrum information described in (1) Example 1 or (2) Example 2 of <5-2. Available spectrum query procedure> described above. As described above, the available spectrum information may be information about an available channel described in Non Patent Literature 13. Note that this notification (notification of available spectrum) may be executed not only in the available spectrum query procedure but also in the above-described <5-3. Spectrum grant procedure> or <5-4. Spectrum use notification>.

The second notification method is a notification method including explicitly or implicitly notifying a communication device that use of this spectrum causes interference between communication devices (for example, between the base station devices 40) or that use of this spectrum does not cause interference between communication devices (for example, between the base station devices 40). This notification method is, for example, a notification method in a case of making a notification of the recommended spectrum information described in Example 3 of <5-2. Available spectrum query procedure> described above. As described above, the recommended spectrum information may be information about a recommended channel described in Non Patent Literature 13. Note that this notification (notification of the recommended spectrum) may be executed not only in the available spectrum query procedure but also in the above-described <5-3. Spectrum grant procedure> or <5-4. Spectrum use notification>.

It is assumed that a first notification method and a second notification method are prepared as communication parameter notification methods. Since making a notification of the available spectrum by using the first notification method is equivalent to making a notification that interference is given to the high priority radio system, privacy information of the high priority radio system may be inferred by the communication device. Therefore, the notification unit 643 notifies the communication device in the second state of the communication parameter using the second notification method. Note that the measures 2 may be used for a communication device (for example, a communication device in a limited range) that is not in the second state.

By taking the measures, the communication device can be made to determine that the predetermined spectrum cannot be used to avoid interference between the communication devices. As a result, the possibility that the position information or the operation parameter information (such as a beam) of the high priority radio system is identified can be reduced.

<7-2. Modification Related to Application of Embodiment>

The above-described embodiment is applicable not only to privacy protection of a high priority system but also to coexistence control between radio systems having the same priority. For example, the above-described embodiment is also applicable to coexistence control between the base station devices 40 or between the terminal devices 30. That is, the above-described embodiment is also applicable to not only a high priority system but also a radio system having the same priority as a radio system (second radio system) using the radio wave as the first radio system.

Furthermore, the communication devices (for example, the terminal device 30, the base station device 40, and the intermediate device 50) may have the functions (for example, the acquisition unit 641, the determination unit 642, and the notification unit 643) of the communication control device 60 described above. In this case, for example, the present embodiment can be applied to the determination of the communication parameter of the terminal device 30 and the slave communication device.

Furthermore, the transmission unit (for example, the transmission units 442 and 542) of the communication device (for example, the base station device 40 and the intermediate device 50) may transmit range information about privacy protection of the transmission unit itself or another communication device (for example, the terminal device 30 or another base station device 40) to the communication control device 60. Then, the acquisition unit (for example, the acquisition units 441 and 442) of the communication device (for example, the base station device 40 and the intermediate device 50) may acquire the communication parameter determined by the communication control device 60. At this time, the communication device is not limited to the base station device 40 and the intermediate device 50, and may be, for example, the terminal device 30. Furthermore, a device to which the communication device transmits the range information is not limited to the communication control device 60, and may be another information processing device that determines the communication parameter of the second radio system that shares and uses the radio wave used by the first radio system based on a method associated with the range identified based on the range information. In this case, the communication device may acquire the communication parameter from the information processing device.

Furthermore, in the above-described embodiment, two ranges of a range outside the limited range (first range) and a range within the limited range (second range) are exemplified as the range to be identified based on the range information, but the range to be identified based on the range information is not limited to these two ranges. For example, the range identified based on the range information may be a range obtained by further subdividing these ranges. For example, the communication control device 60 may add information about the distance from the high priority system to the range information, and set a range obtained by subdividing the first range or the second range as a "range identified based on the range information".

<7-3. Modification Related to System Configuration>

The communication control device 60 of the present embodiment is not limited to the device described in the above-described embodiment. For example, the communication control device 60 may be a device having a function other than a function of controlling the base station device 40 that secondarily uses a frequency band in which spectrum access is performed. For example, the network manager may have the function of the communication control device 60 of the present embodiment. At this time, the network manager may be, for example, a centralized base band unit (C-BBU) of a network configuration called a centralized radio access network (C-RAN) or a device including it. Further, a base station (including an access point) may have the function of the network manager. These devices (such as a network manager) can also be regarded as communication control devices.

Furthermore, in the above-described embodiment, the communication control device 60 is a device belonging to the communication system 2, but may not necessarily be a device belonging to the communication system 2. The communication control device 60 may be a device outside the communication system 2. The communication control device 60 may indirectly control the base station device 40 via a device constituting the communication system 2 without directly controlling the base station device 40. In addition, there may be a plurality of secondary systems (communication systems 2). At this time, the communication control device 60 may manage a plurality of secondary systems. In this case, each secondary system may be regarded as the second radio system.

In general, in spectrum access, an existing system using a target band is referred to as a primary system, and a secondary user is referred to as a secondary system. However, the primary system and the secondary system may be replaced with different terms. A macro cell in a heterogeneous network (HetNET) may be a primary system, and a small cell or a relay station may be a secondary system. In addition, the base station may be a primary system, and relay user equipment (Relay UE) or vehicle user equipment (Vehicle UE) that implements the D2D or the vehicle-to-everything (V2X) existing in the coverage may be a secondary system. The base station is not limited to a fixed type, and may be a portable/mobile type.

Furthermore, the interface between the entities may be wired or wireless. For example, the interface between the entities (communication device, communication control device, or terminal device) appearing in the present embodiment may be a wireless interface that does not depend on spectrum access. Examples of the wireless interface that does not depend on spectrum access include a wireless interface provided by a mobile network operator via a licensed band, radio LAN communication using an existing unlicensed band, and the like.

<7-4. Other Modifications>

The control device that controls the radio wave utilization device 10, the management device 20, the terminal device 30, the base station device 40, the intermediate device 50, or the communication control device 60 according to the present embodiment may be realized by a dedicated computer system or a general-purpose computer system.

For example, a program for executing the above operation is stored and distributed in a computer-readable recording medium such as an optical disk, a semiconductor memory, a magnetic tape, or a flexible disk. Then, for example, the control device is configured by installing the program in a computer and executing the above-mentioned process. At this time, the control device may be an external device (for example, a personal computer) of the radio wave utilization device 10, the management device 20, the terminal device 30, the base station device 40, the intermediate device 50, the communication control device 60, or the external device 70. Furthermore, the control device may be a device (for example, the control unit 13, the control unit 23, the control unit 34, the control unit 44, the control unit 54, the control unit 64, or the control unit 74) inside the radio wave utilization device 10, the management device 20, the terminal device 30, the base station device 40, the intermediate device 50, the communication control device 60, or the external device 70.

Further, the communication program may be stored in a disk device provided in a server device on a network such as the Internet so that it can be downloaded to a computer or the like. Further, the above-mentioned function may be realized by the operating system (OS) in conjunction with the application software. In this case, the part other than the OS may be stored in a medium and distributed, or the part other than the OS may be stored in the server device so that it can be downloaded to a computer or the like.

Further, in the above embodiment, it is also possible to manually perform all or part of the process described as being performed automatically of respective processes described, alternatively, it is also possible to automatically perform all or part of the process described as being performed manually by a known method. In addition, the processing procedure, specific name, and information including various pieces of data and parameters illustrated in the above document and drawings can be arbitrarily changed unless otherwise specified. For example, the various pieces of information illustrated in each figure are not limited to the illustrated information.

Further, each component of each of the illustrated devices is a functional concept, and does not necessarily have to be physically configured as illustrated in the figure. That is, the specific form of distribution/integration of each device is not limited to the one illustrated in the figure, and all or part of the device can be functionally or physically dispersed/integrated in any unit according to various loads and usage conditions.

Further, the above-described embodiments can be appropriately combined in an area where the processing contents do not contradict each other. Further, the order of each step illustrated in the sequence diagram or the flowchart of the present embodiment can be changed as appropriate.

Furthermore, for example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of part of the device).

Note that, in the present embodiment, the system means a set of a plurality of components (devices, modules (parts), etc), and it does not matter whether all the components are in the same housing. For example, a plurality of devices housed in separate housings and connected via a network or the like, and one device in which a plurality of modules is housed in one housing are each the system.

Furthermore, for example, the present embodiment can adopt a configuration of cloud computing in which one function is shared and processed by a plurality of devices in cooperation via a network.

8. Conclusion

As described above, according to an embodiment of the present disclosure, the communication control device 60 acquires the range information about privacy protection of the first radio system, and determines the communication parameter of the second radio system that shares and uses the radio wave used by the first radio system based on the method associated with the range identified based on the range information.

For example, the communication control device 60 determines permission or non-permission of the shared use of the radio wave by the second radio system in a range outside a limited range related to a request for the privacy protection of the first radio system, where the range is designated by the range information, by a determination method including at least an irregular element in a determination element for determining the permission or the non-permission, and determines the communication parameter of the second radio system based on a result of the determination.

This makes it difficult to estimate the privacy protection information of the first radio system. As a result, the user of the first radio system does not hesitate to use the cognitive radio technology, so that effective use of the radio wave resources is realized.

The embodiments of the present disclosure have been described above, the technical scope of the present disclosure is not limited to the above-described embodiments as they are, and various changes can be made without departing from the gist of the present disclosure. Moreover, the components in different embodiments and modifications may be suitably combined.

Further, the effects in each embodiment described in the present specification are merely examples and are not limited, and other effects may be present.

The present technology may also be configured as below.

(1)
A communication control device comprising:
an acquisition unit that acquires range information about privacy protection of a first radio system;
a determination unit that determines a communication parameter of a second radio system that shares and uses a radio wave used by the first radio system based on a method associated with a range identified based on the range information; and
a notification unit that notifies the second radio system of the determined communication parameter.

(2)
The communication control device according to (1), wherein
the range information is information about a range about at least one of a time and a space related to privacy protection of the first radio system.

(3)
The communication control device according to (1) or (2), wherein
the range information is information about a time zone in which the first radio system uses a radio wave.

(4)
The communication control device according to (1) or (2), wherein
the range information is information about a limited direction of radio wave output based on a position of the first radio system.

(5)
The communication control device according to any one of (1) to (4), wherein
the determination unit determines permission or non-permission of the shared use of the radio wave by the second radio system in a range outside a limited range related to a request for the privacy protection of the first radio system, the range being designated by the range information, by a determination method including at least an irregular element in a determination element for determining the permission or the non-permission, and determines the communication parameter of the second radio system based on a result of the determination.

(6)
The communication control device according to (5), wherein
the range information is information about a limited time range related to a request for privacy protection of the first radio system, and wherein
the determination unit determines permission or non-permission of the shared use of the radio wave by the second radio system in a range outside the limited time range by a determination method including at least an irregular element in a determination element for determining the permission or the non-permission.

(7)
The communication control device according to (6), wherein
the determination unit randomly determines permission or non-permission of the shared use of the radio wave by the second radio system in a range outside the limited time range.

(8)
The communication control device according to (5), wherein
the range information is information about a limited space range related to privacy protection of the first radio system, and wherein the determination unit determines permission or non-permission of the shared use of the radio wave by the second radio system in a range outside the limited space range by a determination method including at least an irregular element in a determination element for determining the permission or the non-permission.

(9)

The communication control device according to (8), wherein the determination unit randomly determines permission or non-permission of the shared use of the radio wave by the second radio system in a range outside the limited space range.

(10)

The communication control device according to (8) or (9), wherein the range information is information about a limited direction based on the first radio system, and wherein the determination unit determines permission or non-permission of the shared use of the radio wave by the second radio system located outside the limited direction by a determination method including at least an irregular element in a determination element for determining the permission or the non-permission.

(11)

The communication control device according to any one of (1) to (10), wherein the determination unit determines permission or non-permission of the shared use of the radio wave by the second radio system in a range within a limited range related to a request for the privacy protection of the first radio system, the range being designated by the range information, by a determination method including at least information about an amount of interference from the first radio system to the second radio system in a determination element for determining the permission or the non-permission, and determines the communication parameter of the second radio system based on a result of the determination.

(12)

The communication control device according to (11), wherein the determination unit permits the shared use of the radio wave by the second radio system that is in a first state in which an amount of interference from the first radio system is smaller than an allowable amount of interference of the second radio system and an amount of interference to the first radio system is smaller than an allowable amount of interference of the first radio system.

(13)

The communication control device according to (11) or (12), wherein the determination unit executes predetermined measures to implement privacy protection of the first radio system when controlling the shared use of the radio wave by the second radio system for the second radio system that is in a second state in which an amount of interference from the first radio system is larger than an allowable amount of interference of the second radio system and an amount of interference to the first radio system is smaller than an allowable amount of interference of the first radio system.

(14)

The communication control device according to (13), wherein the notification unit notifies the second radio system that is in the second state of the communication parameter, and makes a predetermined notification for causing the second radio system to perform an operation for implementing privacy protection of the first radio system as the predetermined measures.

(15)

The communication control device according to (14), wherein the notification unit notifies the second radio system that is in the second state of the communication parameter, and makes a notification for controlling data contents of data transmission performed by the second radio system as the predetermined measures.

(16)

The communication control device according to (13), wherein the notification unit notifies the second radio system that is in the second state of the communication parameter using a predetermined notification method for implementing privacy protection of the first radio system.

(17)

The communication control device according to (16), wherein a first notification method for a purpose of protecting the first radio system, and a second notification method for a purpose of coexistence between the second radio systems are prepared as a notification method of the communication parameter, and wherein the notification unit notifies the second radio system that is in the second state of the communication parameter using the second notification method.

(18)

A communication device comprising:

a transmission unit that acquires range information about privacy protection of a first radio system to transmit range information about privacy protection of the communication device itself or another communication device to an information processing device that determines a communication parameter of a second radio system that shares and uses a radio wave used by the first radio system based on a method associated with a range identified based on the range information; and an acquisition unit that acquires a communication parameter determined by the information processing device.

(19)

A communication control method comprising:

acquiring range information about privacy protection of a first radio system;

determining a communication parameter of a second radio system that shares and uses a radio wave used by the first radio system based on a method associated with a range identified based on the range information; and notifying the second radio system of the determined communication parameter.

(20)

A communication control program for causing a computer to function as an acquisition unit that acquires range information about privacy protection of a first radio system, a determination unit that determines a communication parameter of a second radio system that shares and uses the radio wave used by the first radio system based on a method associated with a range identified based on the range information, and a notification unit that notifies the second radio system of the determined communication parameter.

REFERENCE SIGNS LIST

1, 2, 1000 COMMUNICATION SYSTEM
10 RADIO WAVE UTILIZATION DEVICE

20 MANAGEMENT DEVICE
30 TERMINAL DEVICE
40 BASE STATION DEVICE
50 INTERMEDIATE DEVICE
60 COMMUNICATION CONTROL DEVICE
70 EXTERNAL DEVICE
11 PROCESSING UNIT
12, 22, 32, 42, 52, 62, 72 STORAGE UNIT
13, 23, 34, 44, 54, 64, 74 CONTROL UNIT
21, 71 COMMUNICATION UNIT
31, 41, 51, 61 RADIO COMMUNICATION UNIT
33, 73 INPUT/OUTPUT UNIT
43, 53, 63 NETWORK COMMUNICATION UNIT
311, 411 RECEPTION PROCESSING UNIT
312, 412 TRANSMISSION PROCESSING UNIT
313, 413 ANTENNA
441, 541, 641, 741 ACQUISITION UNIT
442, 542, 742 TRANSMISSION UNIT
443 COMMUNICATION CONTROL UNIT
641A FIRST ACQUISITION UNIT
641B SECOND ACQUISITION UNIT
642 DETERMINATION UNIT
642A FIRST DETERMINATION UNIT
642B SECOND DETERMINATION UNIT
643 NOTIFICATION UNIT

The invention claimed is:

1. A communication control device, comprising:
a processor configured to:
acquire, based on a registration procedure request, information specific to a communication device installed in a specific area;
acquire range information about a privacy protection of a first radio system based on the registration procedure request, wherein the range information includes information about a range related to the privacy protection or confidential information of the communication device;
determine a communication parameter of a second radio system that shares and uses a radio wave used by the first radio system based on a method associated with the range, wherein the range is identified based on the range information; and
notify, by a response, the second radio system of the determined communication parameter and registration information of the communication device, wherein the second radio system is notified based on the registration procedure request that includes information related to the acquisition of the range information in the specific area.

2. The communication control device according to claim 1, wherein
the range information is information about a range of at least one of a time or a space related to the privacy protection of the first radio system.

3. The communication control device according to claim 1, wherein
the range information is information about a time zone in which the first radio system uses the radio wave.

4. The communication control device according to claim 1, wherein
the range information is information about a limited direction of a radio wave output based on a position of the first radio system.

5. The communication control device according to claim 1, wherein
the processor is further configured to determine a permission or a non-permission of the shared use of the radio wave by the second radio system, in a first range outside a limited range related to a request for the privacy protection of the first radio system,
the permission or the non-permission of the shared use of the radio wave is determined based on random information, and
the determination of the communication parameter of the second radio system is based on the determination of the permission or the non-permission.

6. The communication control device according to claim 5, wherein
the range information is information about a limited time range related to a request for the privacy protection of the first radio system, and
the processor is further configured to determine the permission or the non-permission of the shared use of the radio wave by the second radio system, in a second range outside the limited time range.

7. The communication control device according to claim 6, wherein
the processor is further configured to randomly determine the permission or the non-permission of the shared use of the radio wave by the second radio system in the second range outside the limited time range, and
the non-permission identifies position information and operation parameter information of a high priority radio system.

8. The communication control device according to claim 5, wherein
the range information is information about a limited space range related to the privacy protection of the first radio system, and
the processor is further configured to determine the permission or the non-permission of the shared use of the radio wave by the second radio system in a third range outside the limited space range.

9. The communication control device according to claim 8, wherein
the processor is further configured to randomly determine the permission or the non-permission of the shared use of the radio wave by the second radio system in the third range outside the limited space range, and
the non-permission identifies position information and operation parameter information of a high priority radio system.

10. The communication control device according to claim 8, wherein
the range information is information about a limited direction based on the first radio system, and
the processor is further configured to determine the permission or the non-permission of the shared use of the radio wave by the second radio system located outside the limited direction.

11. The communication control device according to claim 1, wherein
the processor is further configured to determine a permission or a non-permission of the shared use of the radio wave by the second radio system, within a limited range related to a request for the privacy protection of the first radio system,
the permission or the non-permission is determined based at least on information about an amount of interference from the first radio system to the second radio system, and
the determination of the communication parameter of the second radio system is based on the determination of the permission or the non-permission.

12. The communication control device according to claim 11, wherein
the processor is further configured to permit the shared use of the radio wave by the second radio system, and
the permission of the shared use of the radio wave indicates a first state of the determined communication parameter, in which;
a first amount of interference from the first radio system is smaller than a first allowable amount of interference of the second radio system, and
a second amount of interference to the first radio system is smaller than a second allowable amount of interference of the first radio system.

13. The communication control device according to claim 11, wherein
the processor is further configured to execute specific measures to implement the privacy protection of the first radio system to control the shared use of the radio wave, and
the execution of the specific measures indicates a second state of the determined communication parameter, in which;
a first amount of interference from the first radio system is larger than a first allowable amount of interference of the second radio system, and
a second amount of interference to the first radio system is smaller than a second allowable amount of interference of the first radio system.

14. The communication control device according to claim 13, wherein
the processor is further configured to:
notify the second state of the determined communication parameter to the second radio system; and
generate a specific notification configured to cause the second radio system to perform an operation to implement the privacy protection of the first radio system as the specific measures.

15. The communication control device according to claim 14, wherein
the processor is further configured to:
notify the second state of the determined communication parameter to the second radio system; and
generate a notification configured to control contents of data transmission performed by the second radio system as the specific measures.

16. The communication control device according to claim 13, wherein
the processor is further configured to notify the second state of the determined communication parameter to the second radio system based on a specific notification method to implement the privacy protection of the first radio system.

17. The communication control device according to claim 16, wherein
the specific notification method includes:
a first notification method to protect the first radio system, and
a second notification method to coexist between the first radio system and the second radio system,
the second notification method is a notification method of the determined communication parameter, and
the processor is further configured to notify the second state of the determined communication parameter to the second radio system using the second notification method.

18. A first communication device, comprising:
a processor configured to:
acquire, based on a registration procedure request, information specific to a second communication device installed in a specific area;
acquire range information about a privacy protection of a first radio system based on the registration procedure request, wherein the range information includes information about a range related to the privacy protection or confidential information of the first communication device or the second communication device;
transmit the acquired range information about the privacy protection to an information processing device;
determine, based on the information processing device, a communication parameter of a second radio system that shares and uses a radio wave used by the first radio system based on a method associated with the range, wherein the range is identified based on the range information;
acquire the determined communication parameter; and
notify, by a response, the second radio system of the determined communication parameter and registration information of the second communication device, wherein the second radio system is notified based on the registration procedure request that includes information related to the acquisition of the range information in the specific area.

19. A communication control method, comprising:
in a communication control device including a processor:
acquiring, based on a registration procedure request, information specific to a communication device installed in a specific area;
acquiring range information about privacy protection of a first radio system based on the registration procedure request, wherein the range information includes information about a range related to the privacy protection or confidential information of the communication device;
determining a communication parameter of a second radio system that shares and uses a radio wave used by the first radio system based on a method associated with the range, wherein the range is identified based on the range information; and
notifying, by a response, the second radio system of the determined communication parameter and registration information of the communication device, wherein the second radio system is notified based on the registration procedure request that includes information related to the acquisition of the range information in the specific area.

* * * * *